(12) United States Patent
Sakamoto et al.

(10) Patent No.: US 7,286,080 B2
(45) Date of Patent: Oct. 23, 2007

(54) HIGH-FREQUENCY TRANSMITTING/RECEIVING APPARATUS, RADAR SYSTEM HAVING THE SAME, AND VEHICLE AND SMALL BOAT EQUIPPED WITH THE RADAR SYSTEM

(75) Inventors: Yoshihiro Sakamoto, Kyoto (JP); Yuji Kishida, Kyoto (JP); Kazuki Hayata, Kyoto (JP); Yoshiko Oya, Kyoto (JP)

(73) Assignee: Kyocera Corporation, Kyoto (JP)

( * ) Notice: Subject to any disclaimer, the term of this patent is extended or adjusted under 35 U.S.C. 154(b) by 293 days.

(21) Appl. No.: 10/929,363

(22) Filed: Aug. 27, 2004

(65) Prior Publication Data

US 2005/0088336 A1  Apr. 28, 2005

(30) Foreign Application Priority Data

| Aug. 27, 2003 | (JP) | ............................ P2003-303752 |
| Aug. 27, 2003 | (JP) | ............................ P2003-303757 |
| Aug. 27, 2003 | (JP) | ............................ P2003-303759 |
| Oct. 23, 2003 | (JP) | ............................ P2003-363732 |
| Nov. 26, 2003 | (JP) | ............................ P2003-395645 |
| Apr. 16, 2004 | (JP) | ............................ P2004-121920 |

(51) Int. Cl.
  *G01S 7/28* (2006.01)
  *G01S 13/10* (2006.01)
  *G01S 13/00* (2006.01)

(52) U.S. Cl. .................. 342/175; 342/82; 342/89; 342/118; 342/135; 342/159; 342/195

(58) Field of Classification Search ......... 342/82–103, 342/118, 134–145, 159, 175, 195–197, 21, 342/23, 41, 70–72, 128, 130–132, 165–174
See application file for complete search history.

(56) References Cited

U.S. PATENT DOCUMENTS 2,935,743 A * 5/1960 Glegg ........................ 342/84
4,292,638 A * 9/1981 Lazarchik et al. ............ 342/88
4,698,634 A * 10/1987 Alongi et al. ............... 342/159
6,664,920 B1 * 12/2003 Mott et al. .................. 342/196

FOREIGN PATENT DOCUMENTS

| JP | 2000-258525 A | 9/2000 |
| JP | 2002-328161 A | 11/2002 |
| JP | 2003-198421 A | 7/2003 |

* cited by examiner

*Primary Examiner*—Bernarr E. Gregory
(74) *Attorney, Agent, or Firm*—Hogan & Hartson LLP

(57) ABSTRACT

Provided is a millimeter-wave transmitting/receiving apparatus of pulse-modulation type in which pulse-modulated millimeter-wave signals for transmission are prevented from being outputted to a reception system due to inner reflection or other causes. Included are: an NRD guide (basic structure) formed of a dielectric line sandwiched between parallel plate conductors; a millimeter-wave signal oscillator; a pulse modulator; a circulator; a transmitting/receiving antenna; and a mixer. At the output end of the mixer is disposed a switching device which interrupts intermediate-frequency signals in an opened state, and, when a millimeter-wave signal for transmission from the pulse modulator enters a non-output state and the condition is stabilized, changes into a closed state to pass intermediate-frequency signals. The intermediate-frequency signal containing noise resulting from the millimeter-wave signal for transmission entering the mixer can be prevented from leaking toward downstream side of the mixer; wherefore a desired intermediate-frequency signal can be outputted.

52 Claims, 19 Drawing Sheets

INTERMEDIATE-FREQUENCY WAVE OUTPUT

ONE EXAMPLE OF MEASUREMENT RESULT ON OUTPUT
VOLTAGE WAVEFORM OF INTERMEDIATE-FREQUENCY SIGNAL

DEPENDENCE OF RANGE OF FLUCTUATION IN OUTPUT VOLTAGE OF
INTERMEDIATE-FREQUENCY SIGNAL $\Delta V_{IF}$
WITH RESPECT TO CORRECTION CAPACITANCE VALUE $C_0$.

INTERMEDIATE-FREQUENCY WAVE OUTPUT

SWITCHING CONTROL SIGNAL

DATA ON DISTANCE TO TARGET OBJECT

HIGH-FREQUENCY TRANSMITTING/RECEIVING APPARATUS, RADAR SYSTEM HAVING THE SAME, AND VEHICLE AND SMALL BOAT EQUIPPED WITH THE RADAR SYSTEM

BACKGROUND OF THE INVENTION

1. Field of the Invention

The present invention relates to a high-frequency transmitting/receiving apparatus employing a nonradiative dielectric waveguide (an NRD guide) for use in a millimeter-wave radar module, a millimeter-wave wireless radio communication apparatus, or the like, and more particularly to a high-frequency transmitting/receiving apparatus having a switching device for avoiding that a pulse-modulated millimeter-wave signal for transmission is outputted to a reception system due to inner reflection or other causes, wherein the influence of switching noise occurring in the switching device can be reduced. The invention also relates to a radar system having the high-frequency transmitting/receiving apparatus, a vehicle equipped with the radar system, and a small boat equipped with the radar system.

2. Description of the Related Art

Conventionally, some types of high-frequency transmitting/receiving apparatuses have been proposed that are expected to find applications in a millimeter-wave radar module, a millimeter-wave wireless radio communication apparatus, or the like. For example, Japanese Unexamined Patent Publication JP-A 2000-258525 discloses a high-frequency transmitting/receiving apparatus adopting a pulse modulation method.

However, in the pulse modulation method, part of a pulse-modulated millimeter-wave signal for transmission is outputted to a reception system, as an unwanted signal, due to reflection or other phenomena occurring within the high-frequency transmitting/receiving apparatus. This gives rise to a problem of the reception capability being degraded.

In this respect, the inventors of the present application have already come up with a solution to the aforementioned problem (refer to Japanese Unexamined Patent Publication JP-A 2002-328161). FIGS. 16 and 17 are plan views showing embodiments of the construction disclosed therein. Note that the NRD guide employed in the embodiments has such a basic structure as shown in a partly cutaway perspective view of FIG. 18. That is, a dielectric line 43 is interposed between a pair of parallel plate conductors 41 and 42.

FIG. 16 shows one embodiment of the high-frequency transmitting/receiving apparatus in which a transmitting antenna and a receiving antenna are integrated with each other. The high-frequency transmitting/receiving apparatus comprises a pair of parallel plate conductors 51; a first dielectric line 53; a millimeter-wave signal oscillator 52; a pulse modulator (not shown); a second dielectric line 58; a circulator 54; a third dielectric line 55; a fourth dielectric line 57; and a mixer 59. The pair of parallel plate conductors 51 are disposed at an interval equal to or less than one half of the wavelength of a millimeter-wave signal. The first dielectric line 53 is provided between the parallel plate conductors 51. The millimeter-wave signal oscillator 52 is provided between the parallel plate conductors 51 and attached to the first dielectric line 53. The millimeter-wave signal oscillator 52 converts a high-frequency signal outputted from a high-frequency diode to a frequency-modulated millimeter-wave signal, and allows the millimeter-wave signal to propagate through the first dielectric line 53. The pulse modulator is provided between the parallel plate conductors 51 and disposed at a midway position of the first dielectric line 53. The pulse modulator puts the millimeter-wave signal out, as a pulsed millimeter-wave signal for transmission, from the first dielectric line 53. The second dielectric line 58 is provided between the parallel plate conductors 51, disposed in proximity to the first dielectric line 53 in such a way that one end thereof is electromagnetically coupled with the first dielectric line 53, or coupled at one end thereof with the first dielectric line 53, and allows a part of the millimeter-wave signal to propagate toward the mixer 59. The circulator 54 is provided between the parallel plate conductors 51 and has a first connection portion 54a, a second connection portion 54b, and a third connection portion 54c. These connection portions, which are arranged at predetermined intervals about the periphery of a ferrite plate disposed in parallel with the parallel plate conductors 51, respectively act as millimeter-wave signal input and output ends. In the circulator 54, a millimeter-wave signal inputted from one of the connection portions is outputted from the other connection portion adjoining in a clockwise or counterclockwise direction within the plane of the ferrite plate. The first connection portion 54a is connected to the millimeter-wave signal output end of the first dielectric line 53. The third dielectric line 55 is provided between the parallel plate conductors 51 and connected to the second connection portion 54b of the circulator 54, allows a millimeter-wave signal to propagate therethrough and has a transmitting/receiving antenna 56 at the front end thereof. The fourth dielectric line 57 is provided between the parallel plate conductors 51 and connected to the third connection portion 54c of the circulator 54. The fourth dielectric line 57 allows a reception wave, which has been received by a transmitting/receiving antenna 56, propagated through the third dielectric line 55, passed through the second connection portion 54b, and outputted from the third connection portion 54c, to propagate toward the mixer 59. The mixer 59 is provided between the parallel plate conductors 51 and constructed by proximately placing or coupling a mid-portion of the second dielectric line 58 and a mid-portion of the fourth dielectric line 57 so as to achieve electromagnetic coupling therebetween. The mixer 59 mixes a part of a millimeter-wave signal and a reception wave to generate an intermediate-frequency signal. Besides, in this example, a switching control section (not shown) is disposed at the output end of the mixer 59. The switching control section turns the output end into an opened state at the time when a pulse-modulated millimeter-wave signal for transmission is outputted from the pulse modulator. Thereby, it is possible to prevent an unwanted signal from being outputted to a reception system located downstream of the mixer 59 substantially concurrently with inputting of a pulsed signal for starting a pulsing operation in the pulse modulator to the pulse modulator.

FIG. 17 shows another embodiment of the high-frequency transmitting/receiving apparatus in which a transmitting antenna and a receiving antenna are provided separately. The high-frequency transmitting/receiving apparatus comprises a pair of parallel plate conductors 61; a first dielectric line 63; a millimeter-wave signal oscillator 62; a pulse modulator (not shown); a second dielectric line 68; a circulator 64; a third dielectric line 65; a fourth dielectric line 69; a fifth dielectric line 67; and a mixer 71. The pair of parallel plate conductors 61 are disposed at an interval equal to or less than one half of the wavelength of a millimeter-wave signal. The first dielectric line 63 is provided between the parallel plate conductors 61. The millimeter-wave signal oscillator 62 is provided between the parallel plate conductors 61 and attached to the first dielectric line 63. The millimeter-wave signal oscillator 62 converts a high-frequency signal outputted from a high-frequency diode into a frequency-modulated millimeter-wave signal, and allows the millimeter-wave signal to propagate through the first dielectric line 63. The pulse modulator is provided between the parallel plate conductors 61 and disposed at a midway position of the first dielectric line 63. The pulse modulator puts the millimeter-wave signal out, as a pulsed millimeter-wave signal for transmission, from the first dielectric line 63. The second dielectric line 68 is provided between the parallel plate conductors 61, disposed in proximity to the first dielectric line 63 in such a way that one end thereof is electromagnetically coupled with the first dielectric line 63, or coupled at one end thereof with the first dielectric line 63, and allows a part of the millimeter-wave signal to propagate toward the mixer 71. The circulator 64 is provided between the parallel plate conductors 61 and has a first connection portion 64a, a second connection portion 64b, and a third connection portion 64c. These connection portions, which are arranged at predetermined intervals about the periphery of a ferrite plate disposed in parallel with the parallel plate conductors 61, respectively act as millimeter-wave signal input and output ends. In the circulator 64, a millimeter-wave signal inputted from one of the connection portions is outputted from the other connection portion adjoining in a clockwise or counterclockwise direction within the plane of the ferrite plate. The first connection portion 64a is connected to the millimeter-wave signal output end of the first dielectric line 63. The third dielectric line 65 is provided between the parallel plate conductors 61, connected to the second connection portion 64b of the circulator 64, allows a millimeter-wave signal to propagate therethrough and has a transmitting antenna 66 at the front end thereof. The fourth dielectric line 69 is provided between the parallel plate conductors 61 and has a receiving antenna 70 at the front end thereof, and has the mixer 71 at the other end thereof. The fifth dielectric line 67 is provided between the parallel plate conductors 61 and connected to the third connection portion 64c of the circulator 64, and has a reflectionless terminator 67a disposed at the front end thereof. The reflectionless terminator 67a acts to attenuate a millimeter-wave signal which has been intrusively received at the transmitting antenna 66. The mixer 71 is provided between the parallel plate conductors 61 and constructed by proximately placing or coupling a mid-portion of the second dielectric line 68 and a mid-portion of the fourth dielectric line 69 so as to achieve electromagnetic coupling therebetween. The mixer 71 mixes a part of a millimeter-wave signal and a reception wave to generate an intermediate-frequency signal. Besides, in this example, a switching control section (not shown) is disposed at the output end of the mixer 71. The switching control section turns the output end into an opened state at the time when a pulse-modulated millimeter-wave signal for transmission is outputted from the pulse modulator. Thereby, it is possible to prevent an unwanted signal, which directly intruded from the transmitting antenna 66 into the receiving antenna 70, from being outputted to a reception system located downstream of the mixer 71 substantially concurrently with inputting of a pulsed signal for starting a pulsing operation in the pulse modulator to the pulse modulator.

Next, FIG. 19 is a block circuit diagram showing the structure of each constituent component of the high-frequency transmitting/receiving apparatus shown in FIG. 16, which is implemented as a millimeter-wave radar.

In FIG. 19, reference numeral 111 represents a VCO equipped with a Gunn diode and a varactor diode. The VCO 111 is activated by inputting a signal to its IN-2 terminal for doing input of a modulation signal. A signal outputted from the VCO 111 and a pulsed signal inputted to an IN-1 terminal are inputted to a pulse modulator 112, thereby achieving pulse modulation. The pulse modulator 112, which is disposed at a midway position of the first dielectric line 53 in FIG. 16, is built as a switch (RF switch) having such a structure as perspectively illustrated in FIG. 20.

The pulse modulator shown in FIG. 20 is constructed as follows. A choke-type bias supply line 90 is formed on one main surface of a wiring board 88. In the midway thereof are formed connection electrodes 81. A beam-lead type PIN diode or a Schottky-barrier diode 80 is mounted by soldering midway between the connection electrodes 81. The PIN diode or the Schottky-barrier diode 80 is placed midway between the end faces of the first dielectric line 53 in such a way that the bias voltage applying direction coincides with the lateral direction. Such a switch is used as the pulse modulator 112.

Reference numeral 113 represents a circulator for transmitting a millimeter-wave signal toward an antenna 114 during transmission, while transmitting a reception wave toward a mixer 115 during reception. Reference numeral 114 represents a millimeter-wave signal transmitting/receiving antenna. The antenna 114 is connected to the circulator 113 via a metal waveguide or a dielectric waveguide composed of a dielectric-filled metal waveguide. For example, the antenna 114 may be built as a horn antenna. Reference numeral 115 represents a mixer for mixing a millimeter-wave signal outputted from the VCO 111 and a reception signal received at the antenna 114 to generate an intermediate-frequency signal required to detect the distance to a target object.

Reference numeral 116 represents a switch for interrupting and passing alternately the intermediate-frequency signal outputted from the mixer 115. Reference numeral 119 represents a control section for controlling switching timing of the switch 116 (ON-OFF timing). The switch 116 and the control section 119 constitute a switching control section.

The control section 119 controls the ON-OFF timing as follows. When a pulsed signal is inputted to the IN-1 terminal in synchronization with the pulse modulator 112, a millimeter-wave signal for transmission that has been pulse-modulated by the pulse modulator 112 may be reflected from the connection between the NRD guide and the dielectric waveguide, or may leak from the circulator 113, with the result that the millimeter-wave signal is outputted as an unwanted signal through the mixer 115. Before the unwanted signal is directed to an amplifier 118, the control section 119 drives the switch 116 to interrupt the unwanted signal.

Note that reference numeral 117 represents a capacitor for achieving alternating-current coupling between the switch 116 and the amplifier 118.

According to the constructions such as shown hereinabove, it is possible to avoid that a pulse-modulated millimeter-wave signal for transmission enters the mixer 115 and resultantly leaks into a downstream-side reception system. As a result, the millimeter-wave radar system will succeed in providing enhanced detection accuracy.

On the other hand, another conventional example of a high-frequency transmitting/receiving apparatus adopting a pulse modulation method is disclosed in Japanese Unexamined Patent Publication JP-A 2003-198421. The high-frequency transmitting/receiving apparatus is provided with reception inhibitory means which is analogous to the switching control section as described above. In this construction, millimeter-wave signals for transmission are intermittently transmitted by an RF switch or the like means. During a pause in transmission of the millimeter-wave signals for transmission, intermediate-frequency signals are interrupted to suspend reception.

However, in order to achieve further enhancement of the performance of the high-frequency transmitting/receiving apparatus disclosed in JP-A 2002-328161, the inventors of the present application have conducted diligent, extensive research and study, and resultantly found the following problems to be addressed.

At first, in the switch 116, the timing of switching, at least the closing (ON) timing needs to be controlled with high accuracy.

In general, the pulse modulator 112 using a high-frequency diode possesses characteristics inherent in high-frequency diodes such as a zero bias capacitance. Therefore, even if a pulse signal ideal for driving is inputted, a distortion such as ringing noise may appear in modulation current to a greater or lesser degree. Furthermore, the pulse signal for driving itself may suffer from a similar distortion in varying degrees. In view of this, a certain period of time is required to stabilize the output intensity of the millimeter-wave signal outputted from the pulse modulator 112 in 1 signal period. As a result, if the switch 116 is turned into a closed (ON) state after the signal at the IN-1 terminal is made to be an opened (OFF)-state signal so that the millimeter-wave signal may enter a state of an output-OFF state, depending upon the ON-OFF timing, there is a possibility that variation in the output intensity of the millimeter-wave signal still remains at that time, with the result that an unwanted signal (noise) may be outputted to the mixer 115 and mixed with proper signals to be detected. This leads to degradation in the radar detection performance.

Next, in the millimeter radar shown in FIG. 19, a timing signal indicating switching timing of the switch 116 is generated under the control of the control section 119. At this time, if the switching timing signal is generated by using only the signal at the IN-1 terminal, there is a possibility that the ON-OFF timing cannot be controlled with high accuracy, or that the circuit for generating the timing signal is undesirably complicated.

In the millimeter radar shown in FIG. 19, switching of the switch 116 with use of the signal at the IN-1 terminal is performed as follows. At first, an output of the millimeter-wave signal from the pulse modulator 112 is controlled on the basis of the signal at the IN-1 terminal (the millimeter-wave signal is outputted while the IN-1 terminal is kept in a closed (ON) state). Thereby, the switch 116 can be turned into a closed (ON) state by exploiting the timing with which the signal at the IN-1 terminal changes from a closed (ON) state to an opened (OFF) state. Next, timing to turn the switch 116 into an opened (OFF) state will be described. In the case of using the signal at the IN-1 terminal, the switch 116 needs to be turned into an opened (OFF) state before the signal at the IN-1 terminal, now changed from a closed (ON) state to an opened (OFF) state, changes from an opened (OFF) state to a closed (ON) state once again. Therefore, as a timing signal indicating timing to turn the switch 116 into an opened (OFF) state, a signal obtained by delaying the signal at the IN-1 terminal by a certain time interval is required. Such a signal cannot be generated without using a time-delay circuit or the like. For example, a CR delay circuit is desirable from the standpoint of convenience.

However, the millimeter radar shown in FIG. 19 poses the following problems. In a pulse signal which is applied to the IN-1 terminal and is then inputted to the pulse modulator 112, the pulse cycle is longer relative to the pulse width. This requires much delay time in the CR delay circuit, with the result that the timing may be greatly varied even if variation in the circuit constant is slight. Furthermore, with the addition of the CR delay circuit, the entire circuit configuration is undesirably complicated.

Moreover, in order to achieve further enhancement of the performance of the high-frequency transmitting/receiving apparatus disclosed in JP-A 2002-328161, the inventors of the present application have conducted diligent, extensive research and study, and resultantly found the following problems to be addressed.

One of the problems is that switching noise is produced in accompaniment with switching of the switch 116. The influence of the switching noise exerted on the other circuit systems has to be minimized.

In general, the switch 116 is required to operate at high speed in response to control signals. In view of this, an analog switch such as a CMOS is employed. However, because of its property, the switch 116 incurs switching noise, though slight, during switching operations. Inconveniently, the switching noise is amplified by the amplifier 118 located on the downstream side, and finally finds its way into the other circuit systems nearby as an unwanted signal so as to have adverse effect thereon.

Next, it is preferable that, when applied to a millimeter-wave radar, the high-frequency transmitting/receiving apparatus is provided with a self-monitoring function for detecting and notifying abnormality occurring in the circuit system. By doing so, for example, in the case of applying the high-frequency transmitting/receiving apparatus to a vehicle-mounted collision avoidance radar, it is possible to notify in advance an operator about a malfunction occurring in the circuit system of the high-frequency transmitting/receiving apparatus. This makes it possible to avoid the danger of causing an accident due to unawareness of a malfunction occurring in the vehicle-mounted collision avoidance radar. Note that the self-monitoring function should preferably be constituted without complicating the circuits, without having any adverse effect on the basic performance of the high-frequency transmitting/receiving apparatus, and without any difficulty.

Another problem is that, while the switch 116 is kept in an opened (OFF) state, a load impedance appears to be infinite in terms of an output from the mixer 115 (corresponding to an extremely-low-capacity open end), and thus the high-frequency component of the output from the mixer 115 is substantially totally reflected toward the mixer 115. As a result, the mixer 115 is brought into malfunction, and besides, a part of a multiple-reflected central frequency signal may find its way into the circuits located downstream of the switch 116, which ends in failure of proper outputting of intermediate-frequency signals.

Moreover, in the technique disclosed in JP-A 2003-198421, timing to suspend a reception operation needs to be controlled with high accuracy in the reception inhibitory means. If the reception inhibition timing is not controlled with high accuracy, the following problem arises. Since a certain period of time is required for a millimeter-wave signal for transmission to be returned from a to-be-detected target object through reflection, it follows that a millimeter-wave signal to be received may be inputted, even during a pause in transmission of the millimeter-wave signal for transmission. If the reception operation is suspended at this time, there is a possibility that important information to be received is missed.

SUMMARY OF THE INVENTION

The invention has been devised in view of the above-described problems with the conventional art. Accordingly, one object of the invention is to provide a high-frequency transmitting/receiving apparatus provided with a switching device for avoiding that a pulse-modulated millimeter-wave signal for transmission is outputted to a reception system due to inner reflection or other causes; and a self-monitoring circuit of simple configuration, wherein the influence of switching noise occurring in the switching device can be reduced.

Another object of the invention is to provide a high-frequency transmitting/receiving apparatus provided further with a function for monitoring troubles of a transmission circuit, wherein, in addition to a pulse modulation signal outputted from a pulse modulation signal source, as a transmission-circuit operation test signal (for trouble monitoring), a signal outputted from a DC voltage source or the like can be inputted to a pulse modulator through switching operation.

Still another object of the invention is to provide a high-frequency transmitting/receiving apparatus having said transmission-circuit trouble monitoring function, wherein a parasitic capacitance arising is corrected so that a pulse waveform distortion which is caused by the parasitic capacitance may be suppressed.

Still another object of the invention is to provide a high-frequency transmitting/receiving apparatus wherein it can be avoided that a pulse-modulated millimeter-wave signal for transmission is outputted to a reception system due to inner reflection or other causes, and wherein, at the time of the interruption of the millimeter-wave signal for transmission, a load impedance in an output from a mixer can be matched properly so that the detection accuracy of the high-frequency transmitting/receiving apparatus may be enhanced, when applied to a millimeter-wave radar.

Further object of the invention is to provide a high-frequency transmitting/receiving apparatus provided with an RF switch and a switching control section, wherein, even if the high-frequency transmitting/receiving apparatus is so designed that a reception operation is kept suspended during a pause in outputting of a high-frequency signal (millimeter-wave signal) by the RF switch, the reception operation can be arbitrarily suspended with appropriate timing.

Still further object of the invention is to provide a high-performance radar system employing the high-frequency transmitting/receiving apparatus of the invention, a vehicle equipped with the radar system, and a small boat equipped with the radar system.

Summing up the above-stated objectives of the invention, a main object of the invention is to provide a high-frequency transmitting/receiving apparatus of outstanding reception performance that is capable of properly interrupting an intermediate-frequency signal containing noise and of properly outputting an intermediate-frequency signal which is effective in detecting distance information; a high-performance radar system employing the high-frequency transmitting/receiving apparatus that is capable of swiftly detecting a target object to be detected with reliability; a vehicle equipped with the high-performance radar system; and a small boat equipped with the high-performance radar system.

The invention provides a high-frequency transmitting/receiving apparatus comprising:

a high-frequency oscillator for generating a high-frequency signal;

a branching device connected to the high-frequency oscillator, for branching the high-frequency signal into high-frequency branch signals so that the high-frequency branch signals may be outputted to one output end and another output end of the branching device, respectively;

a modulator connected to the one output end of the branching device, for modulating the high-frequency branch signal branched to the one output end so as to output a high-frequency signal for transmission;

a circulator formed of a magnetic substance, and having a first terminal, a second terminal, and a third terminal that are arranged about a periphery of the magnetic substance, of which the first terminal receives an output from the modulator, wherein a high-frequency signal inputted from one of the terminals is outputted from the other adjoining terminal in turn, in order from the first through third terminals;

a transmitting/receiving antenna connected to the second terminal of the circulator;

a mixer connected between the other output end of the branching device and the third terminal of the circulator, for mixing the high-frequency branch signal branched to the other output end and a high-frequency signal received by the transmitting/receiving antenna so as to generate an intermediate-frequency signal; and a switching device connected to an output end of the mixer, which interrupts the intermediate-frequency signal in an opened state, and, when the high-frequency signal for transmission from the modulator is in a non-output state and the condition is stabilized, changes from the opened state to a closed state to allow passage of the intermediate-frequency signal.

According to the invention, the high-frequency transmitting/receiving apparatus comprises a high-frequency oscillator for generating a high-frequency signal; a branching device connected to the high-frequency oscillator, for branching the high-frequency signal into high frequency branch signals so that the high-frequency branch signals may be outputted to one output end and another output end of the branching device, respectively; a modulator connected to the one output end of the branching device, for modulating the high-frequency branch signal branched to one output end so as to output a high-frequency signal for transmission; a circulator formed of a magnetic substance, and having a first terminal, a second terminal, and a third terminal that are arranged about a periphery of the magnetic substance, of which the first terminal receives an output from the modulator, wherein a high-frequency signal inputted from one of the terminals is outputted from the other adjoining terminal in turn, in order from the first through third terminals; a transmitting/receiving antenna connected to the second terminal of the circulator; a mixer connected between the other output end of the branching device and the third terminal of the circulator, for mixing the high-frequency branch signal branched to the other output end and a high-frequency signal received by the transmitting/receiving antenna so as to generate an intermediate-frequency signal; and a switching device connected to an output end of the mixer, which interrupts the intermediate-frequency signal in an opened state, and, when the high-frequency signal for transmission from the modulator is in a non-output state and the condition is stabilized, changes from the opened state to a closed state to allow passage of the intermediate-frequency signal. In this construction, on the occasion of transmitting a pulsed high-frequency signal for transmission, when the high-frequency signal for transmission is unstable in intensity, the switching device is turned into a closed state so as to interrupt the intermediate-frequency signal. If a modulation signal to be inputted to the modulator contains noise such as a pulse waveform distortion, and the noise finds its way into the high-frequency signal for transmission, there is a possibility that a part of the high-frequency signal for transmission including the noise leaks toward the mixer. Hereupon, even if the signal leakage occurs, the switching device acts to interrupt the intermediate-frequency signal resulting from the part of the high-frequency signal for transmission including the noise. Therefore, the S/N (signal to noise) ratio can be increased. As a result, the high-frequency transmitting/receiving apparatus will succeed in providing enhanced reception performance.

The invention provides a high-frequency transmitting/receiving apparatus comprising:

a high-frequency oscillator for generating a high-frequency signal;

a branching device connected to the high-frequency oscillator, for branching the high-frequency signal into high-frequency branch signals so that the high-frequency branch signals may be outputted to one output end and another output end of the branching device, respectively;

a modulator connected to the one output end of the branching device, for modulating the high-frequency branch signal branched to the one output end so as to output a high-frequency signal for transmission;

an isolator having its one end connected to an output end of the modulator, for passing the high-frequency signal for transmission from the one end to the other end thereof;

a transmitting antenna connected to the isolator;

a receiving antenna connected to the other output end of the branching device;

a mixer connected between the other output end of the branching device and the receiving antenna, for mixing the high-frequency branch signal branched to the other output end and a high-frequency signal received by the receiving antenna so as to generate an intermediate-frequency signal; and a switching device connected to an output end of the mixer, which interrupts the intermediate-frequency signal in an opened state, and, when the high-frequency signal for transmission from the modulator is in a non-output state and the condition is stabilized, changes from the opened state to a closed state to allow passage of the intermediate-frequency signal.

According to the invention, the high-frequency transmitting/receiving apparatus comprises a high-frequency oscillator for generating a high-frequency signal; a branching device connected to the high-frequency oscillator, for branching the high-frequency signal into high-frequency branch signals so that the high-frequency branch signals may be outputted to one output end and another output end of the branching device, respectively; a modulator connected to the one output end of the branching device, for modulating the high-frequency branch signal branched to the one output end so as to output a high-frequency signal for transmission; an isolator having its one end connected to the output end of the modulator, for passing the high-frequency signal for transmission from one end to the other end thereof; a transmitting antenna connected to the isolator; a receiving antenna connected to the other output end of the branching device; a mixer connected between the other output end of the branching device and the receiving antenna, for mixing the high-frequency branch signal branched to the other output end and a high-frequency signal received by the receiving antenna so as to generate an intermediate-frequency signal; and a switching device connected to the output end of the mixer, which interrupts the intermediate-frequency signal in an opened state, and, when the high-frequency signal for transmission from the modulator is in a non-output state and the condition is stabilized, changes from the opened state to a closed state to allow passage of the intermediate-frequency signal. Also in the high-frequency transmitting/receiving apparatus in which the transmitting antenna and the receiving antenna are provided separately, on the occasion of transmitting a pulsed high-frequency signal for transmission, when the high-frequency signal for transmission is unstable in intensity, the switching device is turned into a closed state so as to interrupt the intermediate-frequency signal. If a modulation signal to be inputted to the modulator contains noise such as a pulse waveform distortion, and the noise finds its way into the high-frequency signal for transmission, there is a possibility that a part of the high-frequency signal for transmission including the noise leaks toward the mixer. Hereupon, even if the signal leakage occurs, the switching device acts to interrupt the intermediate-frequency signal resulting from the part of the high-frequency signal for transmission including the noise. Therefore, the S/N ratio can be increased. As a result, the high-frequency transmitting/receiving apparatus will succeed in providing enhanced reception performance.

In the invention, it is preferable that the switching device, now kept in a closed state, changes from the closed state to an opened state before the modulator outputs the following high-frequency signal for transmission.

According to the invention, the switching device, now kept in a closed state, changes from the closed state to an opened state before the modulator outputs the following high-frequency signal for transmission. In this construction, before the following intermediate-frequency signal is outputted, it is possible to avoid that the pulsed high-frequency signal for transmission containing noise enters the mixer and resultantly an intermediate-frequency signal containing noise leaks into a reception system connected downstream of the mixer. As a result, the S/N ratio can further be increased, and the high-frequency transmitting/receiving apparatus will accordingly succeed in providing enhanced reception performance.

In the invention, it is preferable that the modulator is composed of a semiconductor device made of a material including a III-V compound semiconductor element.

According to invention, the modulator is preferably composed of a semiconductor device made of a material including a III-V compound semiconductor element. The semiconductor device made of a material including a III-V compound semiconductor element is characterized by high carrier mobility and short carrier life time. Therefore, in the modulator composed of such a semiconductor device, when modulation current is fed through the semiconductor device, the modulation current can swiftly be converged from a transient state to a steady state. Therefore, a pulsed high-frequency signal for transmission corresponding to the modulation current can swiftly be settled into a steady state. In this way, even if the switching device is turned into a closed (ON) state with quick timing after the pulsed high-frequency signal for transmission is outputted, it never occurs that an intermediate-frequency signal, which results from the high-frequency signal for transmission mixed with an unwanted signal produced immediately after leading edge of a pulse, is outputted to the component located downstream of the mixer. As a result, the high-frequency transmitting/receiving apparatus will succeed in reducing the time taken to intermit transmission/reception operations, which is accompanied by interruption of the intermediate-frequency signal.

In the invention, it is preferable that on the downstream side of the switching device is disposed a filter for blocking intrusion of noise into the intermediate-frequency signal during switching of the switching device, while allowing passage of the intermediate-frequency signal.

According to the invention, on the downstream side of the switching device is disposed a filter for blocking intrusion of noise into the intermediate-frequency signal during switching of the switching device, while allowing passage of the intermediate-frequency signal. By adding such a filter on the downstream side, it is possible to remove such switching noise as may arise in accompaniment with switching of the switching device and find its way into the intermediate-frequency signal, and thereby prevent an unwanted noise signal from entering the other circuit system nearby, without fail, in the high-frequency transmitting/receiving apparatus. Moreover, since an unwanted noise signal is removed by the filter, it follows that the intermediate-frequency signal to be received can be identified with ease and with reliability.

In the invention, it is preferable that between the output end of the mixer and the switching device is inputted a test signal having a frequency lower than a 3 dB cutoff frequency of the filter.

According to the invention, between the output end of the mixer and the switching device is inputted a test signal having a frequency lower than the 3 dB cutoff frequency of the filter. The test signal is lower in frequency than the intermediate-frequency signal. Meanwhile, such noise as may find its way into the intermediate-frequency signal in accompaniment with switching of the switching device is higher in frequency than the intermediate-frequency signal. Thus, the test signal is allowed to pass through the switching device independently of the intermediate-frequency signal and noise, and is then outputted properly without being removed by the filter. As a result, the high-frequency transmitting/receiving apparatus is able to perform self-monitoring effectively (self-monitoring function) simply by making sure that the test signal is outputted properly through the switching device and the filter, without hindering removal of switching noise.

In the invention, it is preferable that the switching device receives a test switching signal for generating switching noise, and, between the switching device and the filter is disposed a switching noise detection terminal.

According to the invention, the switching device receives a test switching signal for generating switching noise, and, between the switching device and the filter is disposed a switching noise detection terminal. By the input of the test switching signal, the switching device generates weak switching noise. This eliminates the need to attenuate a test signal by an attenuator or the like device to obtain an attenuated test signal. That is, the weak switching noise can be utilized as an attenuated test signal. The switching noise is inputted to the downstream-side circuit, so that it may be detected by the detection terminal disposed between the switching device and the filter without causing saturation in an active circuit, such as an amplifier, connected to the downstream-side circuit. As a result, the high-frequency transmitting/receiving apparatus possesses a simple self-monitoring function.

In the invention, it is preferable that the modulator is provided with a signal selector switch for switching input of modulation signals and DC signals different from the modulation signals.

According to the invention, the modulator is provided with a signal selector switch for switching input of modulation signals and DC signals different from the modulation signals. By operating the signal selector switch in such a way as to change the signal path for input signals to be used in the modulator, apart from a pulsed modulation signal, a DC signal produced by an operation-test signal source such as a DC power source can be inputted to the modulator. Hence, in addition to a pulsed modulation signal, a DC signal such as a DC voltage can be inputted to the modulator as an operation-test signal for the transmission system of the high-frequency transmitting/receiving apparatus. In response to the inputted signal, the modulator produces an output in the downstream-side transmission circuit, whereby making it possible to carry out an operation test (trouble monitoring) on the transmission circuit. As a result, the high-frequency transmitting/receiving apparatus further possesses a function for monitoring troubles of the transmission circuit.

In the invention, it is preferable that a capacitor is connected in parallel with the signal selector switch.

According to the invention, a capacitor is connected in parallel with the signal selector switch. The capacitor acts to cancel out a parasitic capacitance existing within the signal selector switch to minimize reflection of high-frequency components of a pulse signal which is caused by the parasitic capacitance in the signal selector switch. Thereby, a low-distortion pulse signal can be inputted to the modulator. Moreover, in this case, the pulsed high-frequency signal for transmission sent out from the modulator is stabilized in signal level. Therefore, even if the switching device, which serves to avoid that part of the high-frequency signal for transmission enters the mixer and resultantly leaks into the downstream-side reception system, is turned into a closed (ON) state immediately after the pulsed high-frequency signal for transmission is sent out, no unwanted intermediate-frequency signal is outputted. As a result, the high-frequency transmitting/receiving apparatus is able to perform a reception operation immediately after the high-frequency signal for transmission is sent out.

The invention provides a high-frequency transmitting/receiving apparatus comprising:

a high-frequency oscillator for generating a high-frequency signal;

a branching device connected to the high-frequency oscillator, for branching the high-frequency signal into high-frequency branch signals so that the high-frequency branch signals may be outputted to one output end and another output end of the branching device, respectively;

a modulator connected to the one output end of the branching device, for modulating the high-frequency branch signal branched to the one output end so as to output a high-frequency signal for transmission;

a circulator formed of a magnetic substance, and having a first terminal, a second terminal, and a third terminal that are arranged about a periphery of the magnetic substance, of which the first terminal receives an output from the modulator, wherein a high-frequency signal inputted from one of the terminals is outputted from the other adjoining terminal in turn, in order from the first through third terminals;

a transmitting/receiving antenna connected to the second terminal of the circulator;

a mixer connected between the other output end of the branching device and the third terminal of the circulator, for mixing the high-frequency branch signal branched to the other output end and a high-frequency signal received by the transmitting/receiving antenna so as to generate an intermediate-frequency signal; and a switch connected to an output end of the mixer, for switching back and forth between a first system which outputs the intermediate-frequency signal to a downstream side and a second system to which a termination circuit for terminating the intermediate-frequency signal is connected.

According to the invention, the high-frequency transmitting/receiving apparatus comprises a high-frequency oscillator for generating a high-frequency signal; a branching device connected to the high-frequency oscillator, for branching the high-frequency signal into high-frequency branch signals so that the high-frequency branch signals may be outputted to one output end and another output end of the branching device, respectively; a modulator connected to the one output end of the branching device, for modulating the high-frequency branch signal branched to the one output end so as to output a high-frequency signal for transmission; a circulator formed of a magnetic substance, and having a first terminal, a second terminal, and a third terminal that are arranged about a periphery of the magnetic substance, of which the first terminal receives an output from the modulator, wherein a high-frequency signal inputted from one of the terminals is outputted from the other adjoining terminal in turn, in order from the first through third terminals; a transmitting/receiving antenna connected to the second terminal of the circulator; a mixer connected between the other output end of the branching device and the third terminal of the circulator, for mixing the high-frequency branch signal branched to the other output end and a high-frequency signal received by the transmitting/receiving antenna so as to generate an intermediate-frequency signal; and a switch connected to the output end of the mixer, for switching back and forth between a first system which outputs the intermediate-frequency signal to the downstream side and a second system to which a termination circuit for terminating the intermediate-frequency signal is connected. In this construction, at the time when outputting of the intermediate-frequency signal to the downstream side comes to rest, instead of being turned into an opened state, the output end of the mixer is connected to the second system to make connection with the termination circuit. Thereby, when the switch is viewed as from the output end of the mixer, the input impedance is reduced, thus suppressing reflection of the intermediate-frequency signal from the switch to the mixer. As a result, of the intermediate-frequency signals generated in the mixer, the one which is outputted to the downstream side to be received can be detected in good condition, with its waveform kept invariant. The high-frequency transmitting/receiving apparatus will accordingly succeed in providing enhanced transmission/reception performance.

The invention provides a high-frequency transmitting/receiving apparatus comprising:

a high-frequency oscillator for generating a high-frequency signal;

a branching device connected to the high-frequency oscillator, for branching the high-frequency signal into high-frequency branch signals so that the high-frequency branch signals may be outputted to one output end and another output end of the branching device, respectively;

a modulator connected to the one output end of the branching device, for modulating the high-frequency branch signal branched to the one output end so as to output a high-frequency signal for transmission;

an isolator having its one end connected to an output end of the modulator, for passing the high-frequency signal for transmission from one end to the other end thereof;

a transmitting antenna connected to the isolator;

a receiving antenna connected to the other output end of the branching device;

a mixer connected between the other output end of the branching device and the receiving antenna, for mixing the high-frequency branch signal branched to the other output end and a high-frequency signal received by the receiving antenna so as to generate an intermediate-frequency signal; and a switch connected to an output end of the mixer, for switching back and forth between a first system which outputs the intermediate-frequency signal to a downstream side and a second system to which a termination circuit for terminating the intermediate-frequency signal is connected.

According to the invention, the high-frequency transmitting/receiving apparatus comprises a high-frequency oscillator for generating a high-frequency signal; a branching device connected to the high-frequency oscillator, for branching the high-frequency signal into high-frequency branch signals so that the high-frequency branch signals may be outputted to one output end and another output end of the branching device, respectively; a modulator connected to the one output end of the branching device, for modulating the high-frequency branch signal branched to the one output end so as to output a high-frequency signal for transmission; an isolator having its one end connected to the output end of the modulator, for passing the high-frequency signal for transmission from one end to the other end thereof; a transmitting antenna connected to the isolator; a receiving antenna connected to the other output end of the branching device; a mixer connected between the other output end of the branching device and the receiving antenna, for mixing the high-frequency branch signal branched to the other output end and a high-frequency signal received by the receiving antenna so as to generate an intermediate-frequency signal; and a switch connected to the output end of the mixer, for switching back and forth between a first system which outputs the intermediate-frequency signal to the downstream side and a second system to which a termination circuit for terminating the intermediate-frequency signal is connected. Also in the high-frequency transmitting/receiving apparatus in which the transmitting antenna and the receiving antenna are provided separately, at the time when outputting of the intermediate-frequency signal to the downstream side comes to rest, instead of being turned into an opened state, the output end of the mixer is connected to the second system to make connection with the termination circuit. Thereby, when the switch is viewed as from the output end of the mixer, the input impedance is reduced, thus suppressing reflection of the intermediate-frequency signal from the switch to the mixer. As a result, of the intermediate-frequency signals generated in the mixer, the one which is outputted to the downstream side to be received can be detected in good condition, with its waveform kept invariant. The high-frequency transmitting/receiving apparatus will accordingly succeed in providing enhanced transmission/reception performance.

In the invention, it is preferable that impedance matching is achieved between the output end of the mixer and the termination circuit.

According to the invention, impedance matching is achieved between the output end of the mixer and the termination circuit. Thereby, while the switch is placed in the second system mode, reflection of the intermediate-frequency signal toward the mixer can be reduced to a minimum. As a result, of the intermediate-frequency signals generated in the mixer, the one which is outputted to the downstream side to be received can be detected in best condition, with its waveform changed little. The high-frequency transmitting/receiving apparatus will accordingly succeed in providing remarkably enhanced transmission/reception performance.

In the invention, it is preferable that a resistance is connected between the output end of the mixer and the first system, and in parallel with the switch.

According to the invention, a resistance is connected between the output end of the mixer and the first system, and in parallel with the switch. Through the resistance, the DC level at the first system can be stabilized. Thus, of the intermediate-frequency signals generated in the mixer, the one which is outputted to the downstream side to be received can be stabilized in signal level; wherefore a detection error can be reduced. The high-frequency transmitting/receiving apparatus will accordingly succeed in providing remarkably enhanced transmission/reception performance.

The invention provides a high-frequency transmitting/receiving apparatus comprising:

a pair of parallel plate conductors disposed at an interval equal to or less than one half of a wavelength of a millimeter-wave signal;

a first dielectric line provided between the parallel plate conductors;

a millimeter-wave signal oscillator provided between the parallel plate conductors and attached to the first dielectric line, for converting a high-frequency signal outputted from a high-frequency diode to a frequency-modulated millimeter-wave signal, and allowing the millimeter-wave signal to propagate through the first dielectric line;

a pulse modulator provided between the parallel plate conductors and disposed at a midway position of the first dielectric line, for outputting the millimeter-wave signal from the first dielectric line as a pulsed millimeter-wave signal for transmission;

a second dielectric line provided between the parallel plate conductors and disposed in proximity to the first dielectric line in such a way that one end thereof is electromagnetically coupled with the first dielectric line, or coupled at one end thereof with the first dielectric line;

a circulator provided between the parallel plate conductors and formed of a ferrite plate disposed in parallel with the parallel plate conductors, the circulator having a first connection portion, a second connection portion, and a third connection portion that are arranged at predetermined intervals about a periphery of the ferrite plate and respectively act as millimeter-wave signal input and output ends, of which the first connection portion is connected to a millimeter-wave signal output end of the first dielectric line, wherein the millimeter-wave signal inputted from one of the connection portions is outputted from the other connection portion adjoining in a clockwise or counterclockwise direction within a plane of the ferrite plate;

a third dielectric line, provided between the parallel plate conductors and connected to the second connection portion of the circulator, for allowing the millimeter-wave signal to propagate therethrough, the third dielectric line having a transmitting/receiving antenna at its front end;

a fourth dielectric line provided between the parallel plate conductors and connected to the third connection portion of the circulator, for allowing a reception wave, which has been received by the transmitting/receiving antenna, propagated through the third dielectric line, and outputted from the third connection portion, to propagate therethrough;

a mixer provided between the parallel plate conductors and constructed by proximately placing or coupling a mid-portion of the second dielectric line and a mid-portion of the fourth dielectric line so as to achieve electromagnetic coupling therebetween, for mixing a part of the millimeter-wave signal propagated from the second dielectric line and the reception wave propagated from the fourth dielectric line to generate an intermediate-frequency signal; and a switching device disposed at an output end of the mixer, the switching device interrupting the intermediate-frequency signal in an opened state, and, when the high-frequency signal for transmission from the pulse modulator is in a non-output state and the condition is stabilized, changing from the opened state to a closed state to allow passage of the intermediate-frequency signal.

According to the invention, at the output end of the mixer is disposed a switching device which interrupts the intermediate-frequency signal in an opened state, and, when the high-frequency signal for transmission from the pulse modulator is in a non-output state and the condition is stabilized, changes from the opened state to a closed state to allow passage of the intermediate-frequency signal. In this construction, on the occasion of outputting the intermediate-frequency signal on the basis of the reception wave received by the transmitting/receiving antenna, it is possible to avoid that the pulsed high-frequency signal for transmission containing noise enters the mixer and resultantly an intermediate-frequency signal containing noise leaks into a reception system connected downstream of the mixer. As a result, a millimeter-wave radar system incorporating the high-frequency transmitting/receiving apparatus is capable of achieving close-range detection with high accuracy.

In the invention, it is preferable that the switching device, now kept in a closed state, changes from the closed state to an opened state before the pulse modulator outputs the following millimeter-wave signal for transmission.

According to the invention, the switching device, now kept in a closed state, changes from the closed state to an opened state before the pulse modulator outputs the following millimeter-wave signal for transmission. In this construction, before the following intermediate-frequency signal is outputted, it is possible to avoid that the pulsed high-frequency signal for transmission containing noise enters the mixer and resultantly an intermediate-frequency signal containing noise leaks into a reception system connected downstream of the mixer. As a result, a millimeter-wave radar system incorporating the high-frequency transmitting/receiving apparatus is capable of achieving long-range detection with high accuracy.

Switching of the switching device is done on the basis of appropriate signals selected in consideration of switching timing. For example, a modulation signal for controlling the pulse modulator, and in addition a control signal for controlling the gain of the amplifier connected downstream of the high-frequency transmitting/receiving apparatus are preferably assigned. In this way, the switching device can be switched with high accuracy in a simple configuration. By adjusting the switching timing of the switching device, it is possible to increase the time to perform millimeter-wave transmission and reception in terms of 1 signal period of the millimeter-wave signal for transmission. Thereby, in the case of applying the high-frequency transmitting/receiving apparatus to a millimeter-wave radar, the millimeter-wave radar is capable of performing detection in a wider range, and also the radar detection range can be determined elaborately.

In the invention, it is preferable that the pulse modulator is composed of a Schottky-barrier diode.

According to the invention, the pulse modulator is preferably composed of a Schottky-barrier diode. In this case, a modulation current of the pulse modulator can swiftly be converged from a transient state to a steady state. Thus a pulsed millimeter-wave signal for transmission corresponding to the modulation current can swiftly be settled into a steady state. Thus, even if the switching device is turned into a closed (ON) state with quick timing after the pulsed millimeter-wave signal is outputted, no intermediate-frequency signal resulting from the millimeter-wave signal for transmission mixed with an unwanted signal produced immediately after leading edge of a pulse is outputted to the component located downstream of the mixer. As a result, in the case of applying the high-frequency transmitting/receiving apparatus to a millimeter-wave radar, the radar is capable of conducting detection at close range.

The invention provides a high-frequency transmitting/receiving apparatus comprising:

a pair of parallel plate conductors disposed at an interval equal to or less than one half of a wavelength of a millimeter-wave signal;

a first dielectric line provided between the parallel plate conductors;

a millimeter-wave signal oscillator provided between the parallel plate conductors and attached to the first dielectric line, for converting a high-frequency signal outputted from a high-frequency diode to a frequency-modulated millimeter-wave signal, and allowing the millimeter-wave signal to propagate through the first dielectric line;

a pulse modulator provided between the parallel plate conductors and disposed at a midway position of the first dielectric line, for outputting the millimeter-wave signal from the first dielectric line as a pulsed millimeter-wave signal for transmission;

a second dielectric line provided between the parallel plate conductors and disposed in proximity to the first dielectric line in such a way that one end thereof is electromagnetically coupled with the first dielectric line, or coupled at one end thereof with the first dielectric line;

a circulator provided between the parallel plate conductors and formed of a ferrite plate disposed in parallel with the parallel plate conductors, the circulator having a first connection portion, a second connection portion, and a third connection portion that are arranged at predetermined intervals about a periphery of the ferrite plate and respectively act as millimeter-wave signal input and output ends, of which the first connection portion is connected to a millimeter-wave signal output end of the first dielectric line, wherein the millimeter-wave signal inputted from one of the connection portions is outputted from the other connection portion adjoining in a clockwise or counterclockwise direction within a plane of the ferrite plate;

a third dielectric line, provided between the parallel plate conductors and connected to the second connection portion of the circulator, for allowing the millimeter-wave signal to propagate therethrough, the third dielectric line having a transmitting antenna at its front end;

a fourth dielectric line provided between the parallel plate conductors and having a receiving antenna at its front end;

a fifth dielectric line, provided between the parallel plate conductors and connected to the third connection portion of the circulator, for allowing a millimeter-wave signal which has been intrusively received at the transmitting antenna, to propagate therethrough, the fifth dielectric line having a reflectionless terminator disposed at its front end, for attenuating the millimeter-wave signal;

a mixer provided between the parallel plate conductors and at the other ends of the fourth dielectric line, and constructed by proximately placing or coupling a mid-portion of the second dielectric line and a mid-portion of the fourth dielectric line so as to achieve electromagnetic coupling therebetween, for mixing a part of the millimeter-wave signal propagated from the second dielectric line and the reception wave propagated from the fourth dielectric line to generate an intermediate-frequency signal; and a switching device disposed at an output end of the mixer, the switching device interrupting the intermediate-frequency signal in an opened state, and, when the millimeter-wave signal for transmission from the pulse modulator is in a non-output state and the condition is stabilized, changing from the opened state to a closed state to allow passage of the intermediate-frequency signal.

According to the invention, like the above-mentioned high-frequency transmitting/receiving apparatus, at the output end of the mixer is disposed a switching device which interrupts the intermediate-frequency signal in an opened state, and, when the millimeter-wave signal for transmission from the pulse modulator is in a non-output state and the condition is stabilized, changes from the opened state to a closed state to allow passage of the intermediate-frequency signal. In this construction, on the occasion of outputting the intermediate-frequency signal on the basis of the reception wave received by the receiving antenna, it is possible to avoid that the pulsed high-frequency signal for transmission containing noise enters the mixer and resultantly an intermediate-frequency signal containing noise leaks into a reception system connected downstream of the mixer. As a result, a millimeter-wave radar system incorporating the high-frequency transmitting/receiving apparatus is capable of achieving close-range detection with high accuracy.

In the invention, it is preferable that the switching device, now kept in a closed state, changes from the closed state to an opened state before the pulse modulator outputs the following millimeter-wave signal for transmission.

According to the invention, the switching device, now kept in a closed state, changes from the closed state to an opened state before the pulse modulator outputs the following millimeter-wave signal for transmission. In this construction, like the above-mentioned high-frequency transmitting/receiving apparatus, before the following intermediate-frequency signal is outputted, it is possible to avoid that the pulsed high-frequency signal for transmission containing noise enters the mixer and resultantly an intermediate-frequency signal containing noise leaks into a reception system connected downstream of the mixer. As a result, a millimeter-wave radar system incorporating the high-frequency transmitting/receiving apparatus is capable of achieving long-range detection with high accuracy.

In the invention, it is preferable that the pulse modulator is composed of a Schottky-barrier diode.

According to the invention, the pulse modulator is preferably composed of a Schottky-barrier diode. In this case, a modulation current of the pulse modulator can swiftly be converged from a transient state to a steady state. Thus a pulsed millimeter-wave signal for transmission corresponding to the modulation current can swiftly be settled into a steady state. Thus, even if the switching device is turned into a closed (ON) state with quick timing after the pulsed millimeter-wave signal is outputted, no intermediate-frequency signal resulting from the millimeter-wave signal for transmission mixed with an unwanted signal produced immediately after leading edge of a pulse is outputted to the component located downstream of the mixer. Hence, transmission and reception of millimeter-wave signals can be achieved satisfactorily. As a result, in the case of applying the high-frequency transmitting/receiving apparatus to a millimeter-wave radar, the radar is capable of conducting detection at close range.

As described heretofore, according to the invention, it is possible to avoid, with a simple structure, that the pulse-modulated millimeter-wave signal for transmission is outputted to the reception system due to inner reflection or other causes. The high-frequency transmitting/receiving apparatus will accordingly succeed in providing enhanced millimeter-wave reception characteristics.

The invention provides a high-frequency transmitting/receiving apparatus comprising:

a pair of parallel plate conductors disposed at an interval equal to or less than one half of a wavelength of a millimeter-wave signal;

a first dielectric line provided between the parallel plate conductors;

a millimeter-wave signal oscillator provided between the parallel plate conductors and attached to the first dielectric line, for converting a high-frequency signal outputted from a high-frequency diode to a frequency-modulated millimeter-wave signal, and allowing the millimeter-wave signal to propagate through the first dielectric line;

a pulse modulator provided between the parallel plate conductors and disposed at a midway position of the first dielectric line, for outputting the millimeter-wave signal from the first dielectric line as a pulsed millimeter-wave signal for transmission;

a second dielectric line provided between the parallel plate conductors and disposed in proximity to the first dielectric line in such a way that one end thereof is electromagnetically coupled with the first dielectric line, or coupled at one end thereof with the first dielectric line;

a circulator provided between the parallel plate conductors and formed of a ferrite plate disposed in parallel with the parallel plate conductors, the circulator having a first connection portion, a second connection portion, and a third connection portion that are arranged at predetermined intervals about a periphery of the ferrite plate and respectively act as millimeter-wave signal input and output ends, of which the first connection portion is connected to a millimeter-wave signal output end of the first dielectric line, wherein the millimeter-wave signal inputted from one of the connection portions is outputted from the other connection portion adjoining in a clockwise or counterclockwise direction within a plane of the ferrite plate;

a third dielectric line, provided between the parallel plate conductors and connected to the second connection portion of the circulator, for allowing the millimeter-wave signal to propagate therethrough, the third dielectric line having a transmitting/receiving antenna at its front end;

a fourth dielectric line provided between the parallel plate conductors and connected to the third connection portion of the circulator, for allowing a reception wave, which has been received by the transmitting/receiving antenna, propagated through the third dielectric line, and outputted from the third connection portion, to propagate therethrough;

a mixer provided between the parallel plate conductors and constructed by proximately placing or coupling a mid-portion of the second dielectric line and a mid-portion of the fourth dielectric line so as to achieve electromagnetic coupling therebetween, for mixing a part of the millimeter-wave signal propagated from the second dielectric line and the reception wave propagated from the fourth dielectric line to generate an intermediate-frequency signal;

a switching device, disposed at an output end of the mixer, for allowing and interrupting passage of the intermediate-frequency signal; and a filter, disposed on a downstream side of the switching device, for blocking such noise as may find its way into the intermediate-frequency signal in accompaniment with switching of the switching device, while passing the intermediate-frequency signal.

According to the invention, at the output end of the mixer is disposed a switching device for allowing and interrupting passage of the intermediate-frequency signal. Moreover, on the downstream side of the switching device is disposed a filter for blocking such noise as may find its way into the intermediate-frequency signal in accompaniment with switching of the switching device, while passing the intermediate-frequency signal. By switching the switching device in synchronization with the timing to output the desired intermediate-frequency signal, it is possible to avoid that the pulsed high-frequency signal for transmission containing noise, the noise occurring within the circuit of the high-frequency transmitting/receiving apparatus, enters the mixer and resultantly an intermediate-frequency signal containing noise leaks into a reception system connected downstream of the mixer. Moreover, it is possible to remove, by the filter disposed on the downstream side, such switching noise as may arise in accompaniment with switching of the switching device and then find its way into the intermediate-frequency signal. Hence, an unwanted noise signal can be prevented from entering the other circuit system nearby without fail. Further, since an unwanted noise signal is removed by the filter, it follows that the intermediate-frequency signal to be received can be identified with ease and with reliability.

In the invention, it is preferable that between the output end of the mixer and the switching device is inputted a test signal having a frequency lower than a 3 dB cutoff frequency of the filter.

According to the invention, between the output end of the mixer and the switching device is inputted a test signal having a frequency lower than the 3 dB cutoff frequency of the filter. The test signal is lower in frequency than the intermediate-frequency signal. Meanwhile, such noise as may find its way into the intermediate-frequency signal in accompaniment with switching of the switching device is higher in frequency than the intermediate-frequency signal. Thus, the test signal is allowed to pass through the switching device independently of the intermediate-frequency signal and noise, and is then outputted properly without being removed by the filter. As a result, the high-frequency transmitting/receiving apparatus is able to perform self-monitoring effectively (self-monitoring function) simply by making sure that the test signal is outputted properly through the switching device and the filter, without hindering removal of switching noise.

In the invention, it is preferable that the switching device receives a test switching signal for generating switching noise, and, between the switching device and the filter is disposed a switching noise detection terminal.

According to the invention, the switching device receives a test switching signal for generating switching noise, and, between the switching device and the filter is disposed a switching noise detection terminal. By the input of the test switching signal, the switching device generates weak switching noise. This eliminates the need to attenuate a test signal by an attenuator or the like device to obtain an attenuated test signal. That is, the weak switching noise can be utilized as an attenuated test signal. The switching noise is inputted to the downstream-side circuit, so that it may be detected by the detection terminal disposed between the switching device and the filter without causing saturation in an active circuit, such as an amplifier, connected to the downstream-side circuit. As a result, the high-frequency transmitting/receiving apparatus possesses a simple self-monitoring function.

In the invention, it is preferable that the pulse modulator is provided with a signal selector switch for switching input of pulse modulation signals and DC signals different from the pulse modulation signals.

According to the invention, the pulse modulator is provided with a signal selector switch for switching input of pulse modulation signals and DC signals different from the pulse modulation signals. The pulse modulation signal is produced by a pulse modulation signal source of the pulse modulator, whereas the DC signal is produced by an operation-test signal source such as a DC power source. By operating the signal selector switch in such a way as to change the signal path for input signals to be used in the pulse modulator, apart from a pulsed pulse modulation signal, a DC signal produced by the operation-test signal source such as a DC power source can be inputted to the pulse modulator. Hence, in addition to a pulsed pulse modulation signal, a DC signal such as a DC voltage can be inputted to the pulse modulator as an operation-test signal for the millimeter-wave transmission system of the high-frequency transmitting/receiving apparatus. In response to the inputted signal, the pulse modulator produces an output in the downstream-side transmission circuit, whereby making it possible to carry out an operation test (trouble monitoring) on the transmission circuit. As a result, the high-frequency transmitting/receiving apparatus further possesses a function for monitoring troubles of the transmission circuit.

In the invention, it is preferable that a capacitor is connected in parallel with the signal selector switch.

According to the invention, a capacitor is connected in parallel with the signal selector switch. The capacitor acts to cancel out a parasitic capacitance existing within the signal selector switch to minimize reflection of high-frequency components of a pulse signal which is caused by the parasitic capacitance in the signal selector switch. Thereby, a low-distortion pulse signal can be inputted to the pulse modulator. Moreover, in this case, the pulsed millimeter-wave signal for transmission sent out from the pulse modulator is stabilized in signal level. Thus, even if the switching device, which serves to avoid that the pulse-modulated millimeter-wave signal for transmission enters the mixer and resultantly leaks into the downstream-side reception system, is turned into a closed (ON) state immediately after the pulsed millimeter-wave signal for transmission is sent out, no unwanted intermediate-frequency signal is outputted. As a result, the high-frequency transmitting/receiving apparatus is able to perform a reception operation immediately after the millimeter-wave signal for transmission is sent out.

The invention provides a high-frequency transmitting/receiving apparatus comprising:

a pair of parallel plate conductors disposed at an interval equal to or less than one half of a wavelength of a millimeter-wave signal;

a first dielectric line provided between the parallel plate conductors;

a millimeter-wave signal oscillator provided between the parallel plate conductors and attached to the first dielectric line, for converting a high-frequency signal outputted from a high-frequency diode to a frequency-modulated millimeter-wave signal, and allowing the millimeter-wave signal to propagate through the first dielectric line;

a pulse modulator provided between the parallel plate conductors and disposed at a midway position of the first dielectric line, for outputting the millimeter-wave signal from the first dielectric line as a pulsed millimeter-wave signal for transmission;

a second dielectric line provided between the parallel plate conductors and disposed in proximity to the first dielectric line in such a way that one end thereof is electromagnetically coupled with the first dielectric line, or coupled at one end thereof with the first dielectric line;

a circulator provided between the parallel plate conductors and formed of a ferrite plate disposed in parallel with the parallel plate conductors, the circulator having a first connection portion, a second connection portion, and a third connection portion that are arranged at predetermined intervals about a periphery of the ferrite plate and respectively act as millimeter-wave signal input and output ends, of which the first connection portion is connected to a millimeter-wave signal output end of the first dielectric line, wherein the millimeter-wave signal inputted from one of the connection portions is outputted from the other connection portion adjoining in a clockwise or counterclockwise direction within a plane of the ferrite plate;

a third dielectric line, provided between the parallel plate conductors and connected to the second connection portion of the circulator, for allowing the millimeter-wave signal to propagate therethrough, the third dielectric line having a transmitting antenna at its front end;

a fourth dielectric line provided between the parallel plate conductors and having a receiving antenna at its front end;

a fifth dielectric line, provided between the parallel plate conductors and connected to the third connection portion of the circulator, for allowing a millimeter-wave signal which has been intrusively received at the transmitting antenna, to propagate therethrough, the fifth dielectric line having a reflectionless terminator disposed at its front end, for attenuating the millimeter-wave signal;

a mixer provided between the parallel plate conductors and constructed by proximately placing or coupling a mid-portion of the second dielectric line and a mid-portion of the fourth dielectric line so as to achieve electromagnetic coupling therebetween, for mixing a part of the millimeter-wave signal propagated from the second dielectric line and the reception wave propagated from the fourth dielectric line to generate an intermediate-frequency signal;

a switching device disposed at an output end of the mixer, for allowing and interrupting passage of the intermediate-frequency signal; and a filter disposed on a downstream side of the switching device, for blocking such noise as may find its way into the intermediate-frequency signal in accompaniment with switching of the switching device, while passing the intermediate-frequency signal.

According to the invention, like the above-mentioned high-frequency transmitting/receiving apparatus, at the output end of the mixer is disposed a switching device for allowing and interrupting passage of the intermediate-frequency signal. Moreover, on the downstream side of the switching device is disposed a filter for blocking such noise as may find its way into the intermediate-frequency signal in accompaniment with switching of the switching device, while passing the intermediate-frequency signal. By switching the switching device in synchronization with the timing to output the desired intermediate-frequency signal, it is possible to avoid that the pulsed high-frequency signal for transmission containing noise, the noise occurring within the circuit of the high-frequency transmitting/receiving apparatus, enters the mixer and resultantly an intermediate-frequency signal containing noise leaks into a reception system connected downstream of the mixer. Moreover, it is possible to remove such switching noise as may arise in accompaniment with switching of the switching device and find its way into the intermediate-frequency signal by the filter disposed on the downstream side. Hence, an unwanted noise signal can be prevented from entering the other circuit system nearby without fail. Further, since an unwanted noise signal is removed by the filter, it follows that the intermediate-frequency signal to be received can be identified with ease and with reliability.

In the invention, it is preferable that between the output end of the mixer and the switching device is inputted a test signal having a frequency lower than a 3 dB cutoff frequency of the filter.

According to the invention, between the output end of the mixer and the switching device is inputted a test signal having a frequency lower than the 3 dB cutoff frequency of the filter. The test signal is lower in frequency than the intermediate-frequency signal. Meanwhile, such noise as may find its way into the intermediate-frequency signal in accompaniment with switching of the switching device is higher in frequency than the intermediate-frequency signal. Thus, the test signal is allowed to pass through the switching device independently of the intermediate-frequency signal and noise, and is then outputted properly without being removed by the filter. As a result, the high-frequency transmitting/receiving apparatus is able to perform self-monitoring effectively (self-monitoring function) simply by making sure that the test signal is outputted properly through the switching device and the filter, without hindering removal of switching noise.

In the invention, it is preferable that the switching device receives a test switching signal for generating switching noise, and, between the switching device and the filter is disposed a switching noise detection terminal.

According to the invention, the switching device receives a test switching signal for generating switching noise, and, between the switching device and the filter is disposed a switching noise detection terminal. By the input of the test switching signal, the switching device generates weak switching noise. This eliminates the need to attenuate a test signal by an attenuator or the like device to obtain an attenuated test signal. That is, the weak switching noise can be utilized as an attenuated test signal. The switching noise is inputted to the downstream-side circuit, so that it may be detected by the detection terminal disposed between the switching device and the filter without causing saturation in an active circuit, such as an amplifier, connected to the downstream-side circuit. As a result, the high-frequency transmitting/receiving apparatus possesses a simple self-monitoring function.

In the invention, it is preferable that the pulse modulator is provided with a signal selector switch for switching input of pulse modulation signals and DC signals different from the pulse modulation signals.

According to the invention, the pulse modulator is provided with a signal selector switch for switching input of pulse modulation signals and DC signals different from the pulse modulation signals. The pulse modulation signal is produced by a pulse modulation signal source of the pulse modulator, whereas the DC signal is produced by an operation-test signal source such as a DC power source. By operating the signal selector switch in such a way as to change the signal path for input signals to be used in the pulse modulator, apart from a pulsed pulse modulation signal, a DC signal produced by the operation-test signal source such as a DC power source can be inputted to the pulse modulator. Hence, in addition to a pulsed pulse modulation signal, a DC signal such as a DC voltage can be inputted to the pulse modulator as an operation-test signal for the millimeter-wave transmission system of the high-frequency transmitting/receiving apparatus. In response to the inputted signal, the pulse modulator produces an output in the downstream-side transmission circuit, whereby making it possible to carry out an operation test (trouble monitoring) on the transmission circuit. As a result, the high-frequency transmitting/receiving apparatus further possesses a function for monitoring troubles of the transmission circuit.

In the invention, it is preferable that a capacitor is connected in parallel with the signal selector switch.

According to the invention, a capacitor is connected in parallel with the signal selector switch. The capacitor acts to cancel out a parasitic capacitance existing within the signal selector switch to minimize reflection of high-frequency components of a pulse signal which is caused by the parasitic capacitance in the signal selector switch. Thereby, a low-distortion pulse signal can be inputted to the pulse modulator. Moreover, in this case, the pulsed millimeter-wave signal for transmission sent out from the pulse modulator is stabilized in signal level. Thus, even if the switching device, which serves to avoid that the pulse-modulated millimeter-wave signal for transmission enters the mixer and resultantly leaks into the downstream-side reception system, is turned into a closed (ON) state immediately after the pulsed millimeter-wave signal for transmission is sent out, no unwanted intermediate-frequency signal is outputted. As a result, the high-frequency transmitting/receiving apparatus is able to perform a reception operation immediately after the millimeter-wave signal for transmission is sent out.

As described heretofore, according to the invention, it is possible to avoid that the pulse-modulated millimeter-wave signal for transmission is outputted to the reception system due to inner reflection or other causes. Moreover, the influence of switching noise occurring in the switching device can be reduced without fail. Hence, it is possible to realize a high-performance high-frequency transmitting/receiving apparatus that is excellent in millimeter-wave reception characteristics.

Moreover, according to the invention, the self-monitoring function can be constructed with ease, or the self-monitoring function can be constructed in a simple structure. Hence, it is possible to realize a high-performance high-frequency transmitting/receiving apparatus having a self-monitoring function without any difficulty.

The invention provides a high-frequency transmitting/receiving apparatus comprising:

a pair of parallel plate conductors disposed at an interval equal to or less than one half of a wavelength of a millimeter-wave signal;

a first dielectric line provided between the parallel plate conductors;

a millimeter-wave signal oscillator provided between the parallel plate conductors and attached to the first dielectric line, for converting a high-frequency signal outputted from a high-frequency diode to a frequency-modulated millimeter-wave signal, and allowing the millimeter-wave signal to propagate through the first dielectric line;

a pulse modulator provided between the parallel plate conductors and disposed at a midway position of the first dielectric line, for outputting the millimeter-wave signal from the first dielectric line as a pulsed millimeter-wave signal for transmission;

a second dielectric line provided between the parallel plate conductors and disposed in proximity to the first dielectric line in such a way that one end thereof is electromagnetically coupled with the first dielectric line, or coupled at one end thereof with the first dielectric line;

a circulator provided between the parallel plate conductors and formed of a ferrite plate disposed in parallel with the parallel plate conductors, the circulator having a first connection portion, a second connection portion, and a third connection portion that are arranged at predetermined intervals about a periphery of the ferrite plate and respectively act as millimeter-wave signal input and output ends, of which the first connection portion is connected to a millimeter-wave signal output end of the first dielectric line, wherein the millimeter-wave signal inputted from one of the connection portions is outputted from the other connection portion adjoining in a clockwise or counterclockwise direction within a plane of the ferrite plate;

a third dielectric line, provided between the parallel plate conductors and connected to the second connection portion of the circulator, for allowing the millimeter-wave signal to propagate therethrough, the third dielectric line having a transmitting/receiving antenna at its front end;

a fourth dielectric line provided between the parallel plate conductors and connected to the third connection portion of the circulator, for allowing a reception wave, which has been received by the transmitting/receiving antenna, propagated through the third dielectric line, and outputted from the third connection portion, to propagate therethrough;

a mixer provided between the parallel plate conductors and constructed by proximately placing or coupling a mid-portion of the second dielectric line and a mid-portion of the fourth dielectric line so as to achieve electromagnetic coupling therebetween, for mixing a part of the millimeter-wave signal propagated from the second dielectric line and the reception wave propagated from the fourth dielectric line to generate an intermediate-frequency signal; and a switch disposed at an output end of the mixer, for switching back and forth between a first system which outputs the intermediate-frequency signal to a downstream side and a second system to which a termination circuit for terminating the intermediate-frequency signal is connected.

According to the invention, at the output end of the mixer is disposed a switch for switching back and forth between a first system which outputs the intermediate-frequency signal to the downstream side and a second system to which a termination circuit for terminating the intermediate-frequency signal is connected. In this construction, at the time when outputting of the intermediate-frequency signal to the downstream side comes to rest, instead of being turned into an opened state, the output end of the mixer is connected to the second system to make connection with the termination circuit. Thereby, when the switch is viewed as from the output end of the mixer, the input impedance is reduced, thus suppressing reflection of the intermediate-frequency signal from the switch to the mixer. As a result, of the intermediate-frequency signals generated in the mixer, the one which is outputted to the downstream side to be received can be detected in good condition, with its waveform kept invariant. The high-frequency transmitting/receiving apparatus will accordingly succeed in providing enhanced millimeter-wave transmission/reception performance.

In the invention, it is preferable that impedance matching is achieved between the output end of the mixer and the termination circuit.

According to the invention, impedance matching is achieved between the output end of the mixer and the termination circuit. Thereby, while the switch is placed in the second system mode, reflection of the intermediate-frequency signal toward the mixer can be reduced to a minimum. As a result, of the intermediate-frequency signals generated in the mixer, the one which is outputted to the downstream side to be received can be detected in best condition, with its waveform changed little. The high-frequency transmitting/receiving apparatus will accordingly succeed in providing remarkably enhanced millimeter-wave transmission/reception performance.

In the invention, it is preferable that a resistance is connected between the output end of the mixer and the first system, and in parallel with the switch.

According to the invention, a resistance is connected between the output end of the mixer and the first system, and in parallel with the switch. Through the resistance, the DC level at the first system can be stabilized, and thus, of the intermediate-frequency signals generated in the mixer, the one which is outputted to the downstream side to be received can be stabilized in signal level; wherefore a detection error can be reduced. The high-frequency transmitting/receiving apparatus will accordingly succeed in providing remarkably enhanced millimeter-wave transmission/reception performance.

The invention provides a high-frequency transmitting/receiving apparatus comprising:

a pair of parallel plate conductors disposed at an interval equal to or less than one half of a wavelength of a millimeter-wave signal;

a first dielectric line provided between the parallel plate conductors;

a millimeter-wave signal oscillator provided between the parallel plate conductors and attached to the first dielectric line, for converting a high-frequency signal outputted from a high-frequency diode to a frequency-modulated millimeter-wave signal, and allowing the millimeter-wave signal to propagate through the first dielectric line;

a pulse modulator provided between the parallel plate conductors and disposed at a midway position of the first dielectric line, for outputting the millimeter-wave signal from the first dielectric line as a pulsed millimeter-wave signal for transmission;

a second dielectric line provided between the parallel plate conductors and disposed in proximity to the first dielectric line in such a way that one end thereof is electromagnetically coupled with the first dielectric line, or coupled at one end thereof with the first dielectric line;

a circulator provided between the parallel plate conductors and formed of a ferrite plate disposed in parallel with the parallel plate conductors, the circulator having a first connection portion, a second connection portion, and a third connection portion that are arranged at predetermined intervals about a periphery of the ferrite plate and respectively act as millimeter-wave signal input and output ends, of which the first connection portion is connected to a millimeter-wave signal output end of the first dielectric line, wherein the millimeter-wave signal inputted from one of the connection portions is outputted from the other connection portion adjoining in a clockwise or counterclockwise direction within a plane of the ferrite plate;

a third dielectric line, provided between the parallel plate conductors and connected to the second connection portion of the circulators, for allowing the millimeter-wave signal to propagate therethrough, the third dielectric line having a transmitting antenna at its front end;

a fourth dielectric line provided between the parallel plate conductors and having a receiving antenna at its front end;

a fifth dielectric line, provided between the parallel plate conductors and connected to the third connection portion of the circulator, for allowing a millimeter-wave signal which has been intrusively received at the transmitting antenna, to propagate therethrough, the fifth dielectric line having a reflectionless terminator disposed at its front end, for attenuating the millimeter-wave signal;

a mixer provided between the parallel plate conductors and constructed by proximately placing or coupling a mid-portion of the second dielectric line and a mid-portion of the fourth dielectric line so as to achieve electromagnetic coupling therebetween, for mixing a part of the millimeter-wave signal propagated from the second dielectric line and the reception wave propagated from the fourth dielectric line to generate an intermediate-frequency signal; and a switch disposed at an output end of the mixer, for switching back and forth between a first system which outputs the intermediate-frequency signal to a downstream side and a second system to which a termination circuit for terminating the intermediate-frequency signal is connected.

According to the invention, at the output end of the mixer is disposed a switch for switching back and forth between a first system which outputs the intermediate-frequency signal to the downstream side and a second system to which a termination circuit for terminating the intermediate-frequency signal is connected. In this construction, like the above-mentioned high-frequency transmitting/receiving apparatus, at the time when outputting of the intermediate-frequency signal to the downstream side comes to rest, instead of being turned into an opened state, the output end of the mixer is connected to the second system to make connection with the termination circuit. Thereby, when the switch is viewed as from the output end of the mixer, the input impedance is reduced, thus suppressing reflection of the intermediate-frequency signal from the switch to the mixer. As a result, of the intermediate-frequency signals generated in the mixer, the one which is outputted to the downstream side to be received can be detected in good condition, with its waveform kept invariant. The high-frequency transmitting/receiving apparatus will accordingly succeed in providing enhanced millimeter-wave transmission/reception performance.

In the invention, it is preferable that impedance matching is achieved between the output end of the mixer and the termination circuit.

According to the invention, impedance matching is achieved between the output end of the mixer and the termination circuit. Thereby, while the switch is placed in the second system mode, reflection of the intermediate-frequency signal toward the mixer can be reduced to a minimum. As a result, of the intermediate-frequency signals generated in the mixer, the one which is outputted to the downstream side to be received can be detected in best condition, with its waveform changed little. The high-frequency transmitting/receiving apparatus will accordingly succeed in providing remarkably enhanced millimeter-wave transmission/reception performance.

In the invention, it is preferable that a resistance is connected between the output end of the mixer and the first system, and in parallel with the switch.

According to the invention, a resistance is connected between the output end of the mixer and the first system, and in parallel with the switch. Through the resistance, the DC level at the first system can be stabilized, and thus, of the intermediate-frequency signals generated in the mixer, the one which is outputted to the downstream side to be received can be stabilized in signal level; wherefore a detection error can be reduced. The high-frequency transmitting/receiving apparatus will accordingly succeed in providing remarkably enhanced millimeter-wave transmission/reception performance.

As described heretofore, according to the invention, the pulse-modulated millimeter-wave signal for transmission can successfully be prevented from being outputted to the reception system due to inner reflection or other causes. Moreover, during the interruption, the load impedance in the output of the mixer can be matched; wherefore the intermediate-frequency signal is free from distortion. Hence, it is possible to realize a high-performance high-frequency transmitting/receiving apparatus which is capable of achieving reception satisfactorily. As a result, in the case of applying the high-frequency transmitting/receiving apparatus to a millimeter-wave radar, the millimeter-wave radar system will succeed in providing enhanced detection performance.

The invention provides a high-frequency transmitting/receiving apparatus comprising:

a high-frequency oscillator for generating a high-frequency signal;

a branching device connected to the high-frequency oscillator, for branching the high-frequency signal into high-frequency branch signals so that the high-frequency branch signals may be outputted to one output end and another output end of the branching device, respectively;

an RF switch connected to the one output end of the branching device, for outputting a high-frequency signal for transmission by allowing passage of the high-frequency branch signal branched to the one output end intermittently, in a cycle of T, for a duration of time t (wherein T>t) in a closed state;

a circulator formed of a magnetic substance, and having a first terminal, a second terminal, and a third terminal that are arranged about a periphery of the magnetic substance, of which the first terminal receives an output from the RF switch, wherein a high-frequency signal inputted from one of the terminals is outputted from the other adjoining terminal in turn, in order from the first through third terminals;

a transmitting/receiving antenna connected to the second terminal of the circulator;

a mixer connected between the other output end of the branching device and the third terminal of the circulator, for mixing the high-frequency branch signal branched to the other output end and a high-frequency signal received by the transmitting/receiving antenna so as to generate an intermediate-frequency signal;

a switching device connected to an output end of the mixer, for allowing passage of the intermediate-frequency signal in a closed state, whereas interrupting the intermediate-frequency signal in an opened state;

switching control signal lines connected to the RF switch and the switching device, respectively, for inputting signals to the RF switch and the switching device, respectively, which signals control switching of the RF switch and the switching device; and a delay line or a delay circuit element connected to one of the switching control signal lines, for turning the switching device into an opened state in synchronization with unmaking of the RF switch, whereas turning the switching device into a closed state in synchronization with making of the RF switch.

According to the invention, the high-frequency transmitting/receiving apparatus comprises a high-frequency oscillator for generating a high-frequency signal; a branching device connected to the high-frequency oscillator, for branching the high-frequency signal into high-frequency branch signals so that the high-frequency branch signals may be outputted to one output end and another output end of the branching device, respectively; an RF switch connected to the one output end of the branching device, for outputting a high-frequency signal for transmission by allowing passage of the high-frequency branch signal branched to the one output end intermittently, in a cycle of T, for a duration of time t (wherein T>t) in a closed state; a circulator formed of a magnetic substance, and having a first terminal, a second terminal, and a third terminal that are arranged about a periphery of the magnetic substance, of which the first terminal receives an output from the RF switch, wherein a high-frequency signal inputted from one of the terminals is outputted from the other adjoining terminal in turn, in order from the first through third terminals; a transmitting/receiving antenna connected to the second terminal of the circulator; a mixer connected between the other output end of the branching device and the third terminal of the circulator, for mixing the high-frequency branch signal branched to the other output end and a high-frequency signal received by the transmitting/receiving antenna so as to generate an intermediate-frequency signal; a switching device connected to the output end of the mixer, for allowing passage of the intermediate-frequency signal in a closed state, whereas interrupting the intermediate-frequency signal in an opened state; switching control signal lines connected to the RF switch and the switching device, respectively, for inputting signals to the RF switch and the switching device, respectively, which signals control switching of the RF switch and the switching device; and a delay line or a delay circuit element connected to one of the switching control signal lines, for turning the switching device into an opened state in synchronization with unmaking of the RF switch, whereas turning the switching device into a closed state in synchronization with making of the RF switch. In this construction, by actuating the delay line or delay circuit, the switching device is driven in synchronization with the RF switch. Specifically, the switching device can be opened and closed alternately ahead of or behind the actuation of the RF switch with appropriate timing. Thus, reception-operation inhibition time can selectively be adjusted; wherefore the high-frequency transmitting/receiving apparatus is impervious to adverse effects of extraneous noise, etc., and is thus capable of receiving to-be-received high-frequency signals with reliability.

The invention provides a high-frequency transmitting/receiving apparatus comprising:

a high-frequency oscillator for generating a high-frequency signal;

a branching device connected to the high-frequency oscillator, for branching the high-frequency signal into high-frequency branch signals so that the high-frequency branch signals may be outputted to one output end and another output end of the branching device, respectively;

an RF switch connected to the one output end of the branching device, for outputting a high-frequency signal for transmission by allowing passage of the high-frequency branch signal branched to the one output end intermittently, in a cycle of T, for a duration of time t (wherein T>t) in a closed state;

an isolator having its one end connected to an output end of the RF switch, for passing the high-frequency signal for transmission from one end to the other end thereof;

a transmitting antenna connected to the isolator;

a receiving antenna connected to the other output end of the branching device;

a mixer connected between the other output end of the branching device and the receiving antenna, for mixing the high-frequency branch signal branched to the other output end and a high-frequency signal received by the receiving antenna so as to generate an intermediate-frequency signal;

a switching device connected to an output end of the mixer, for allowing passage of the intermediate-frequency signal in a closed state, whereas interrupting the intermediate-frequency signal in an opened state;

switching control signal lines connected to the RF switch and the switching device, respectively, for inputting signals to the RF switch and the switching device, respectively, which signals control switching of the RF switch and the switching device; and a delay line or a delay circuit element connected to one of the switching control signal lines, for turning the switching device into an opened state in synchronization with unmaking of the RF switch, whereas turning the switching device into a closed state in synchronization with making of the RF switch.

According to the invention, the high-frequency transmitting/receiving apparatus is composed of: a high-frequency oscillator for generating a high-frequency signal; a branching device connected to the high-frequency oscillator, for branching the high-frequency signal into high-frequency branch signals so that the high-frequency branch signals may be outputted to one output end and another output end of the branching device, respectively; an RF switch connected to the one output end of the branching device, for outputting a high-frequency signal for transmission by allowing passage of the high-frequency branch signal branched to the one output end intermittently, in a cycle of T, for a duration of time t (wherein T>t) in a closed state; an isolator having its one end connected to the output end of the RF switch, for passing the high-frequency signal for transmission from one end to the other end thereof; a transmitting antenna connected to the isolator; a receiving antenna connected to the other output end of the branching device; a mixer connected between the other output end of the branching device and the receiving antenna, for mixing the high-frequency branch signal branched to the other output end and a high-frequency signal received by the receiving antenna so as to generate an intermediate-frequency signal; a switching device connected to the output end of the mixer, for allowing passage of the intermediate-frequency signal in a closed state, whereas interrupting the intermediate-frequency signal in an opened state; switching control signal lines connected to the RF switch and the switching device, respectively, for inputting signals to the RF switch and the switching device, respectively, which signals control switching of the RF switch and the switching device; and a delay line or a delay circuit element connected to one of the switching control signal lines, for turning the switching device into an opened state in synchronization with unmaking of the RF switch, whereas turning the switching device into a closed state in synchronization with making of the RF switch. Also in the high-frequency transmitting/receiving apparatus in which the transmitting antenna and the receiving antenna are provided separately, by actuating the delay line or delay circuit, the switching device is driven in synchronization with the RF switch. Specifically, the switching device can be opened and closed alternately ahead of or behind the actuation of the RF switch with appropriate timing. Thus, reception-operation inhibition time can selectively be adjusted; wherefore the high-frequency transmitting/receiving apparatus is impervious to adverse effects of extraneous noise, etc., and is thus capable of receiving to-be-received high-frequency signals with reliability.

The invention provides a radar system comprising:

the high-frequency transmitting/receiving apparatus mentioned above; and a distance information detector for detecting data on a distance to a target object to be detected by processing the intermediate-frequency signal outputted from the high-frequency transmitting/receiving apparatus.

According to the invention, the radar system comprises the high-frequency transmitting/receiving apparatus mentioned-above; and a distance information detector for detecting data on the distance to a to-be-detected target object by processing the intermediate-frequency signal outputted from the high-frequency transmitting/receiving apparatus. In this construction, since the high-frequency transmitting/receiving apparatus is excellent in reception performance, it follows that the to-be-detected target object can swiftly be detected without fail. Moreover, the radar system is also capable of detecting nearby and far-off target objects to be detected.

The invention provides a vehicle equipped with the radar system comprising:

mentioned above, wherein the radar system is used to detect a target object to be detected.

According to the invention, the vehicle comprises the radar system mentioned above. The radar system is used to detect a target object to be detected. Since the radar system is capable of swiftly detecting a to-be-detected-target object such as another vehicle without fail, it is possible to control the vehicle and to give a driver a warning properly without causing abrupt actions in the vehicle.

The invention provides a small boat equipped with the radar system comprising:

the radar system mentioned above, wherein the radar system is used to detect a target object to be detected.

According to the invention, the small boat equipped with the radar system comprises the radar system mentioned above. The radar system is used to detect a target object to be detected. Since the radar system is capable of swiftly detecting a to-be-detected target object such as another small boat without fail, it is possible to control the small boat and to give an operator a warning properly without causing abrupt actions in the small boat.

BRIEF DESCRIPTION OF THE DRAWINGS

Other and further objects, features, and advantages of the invention will be more explicit from the following detailed description taken with reference to the drawings wherein.

DETAILED DESCRIPTION

Figure 1:
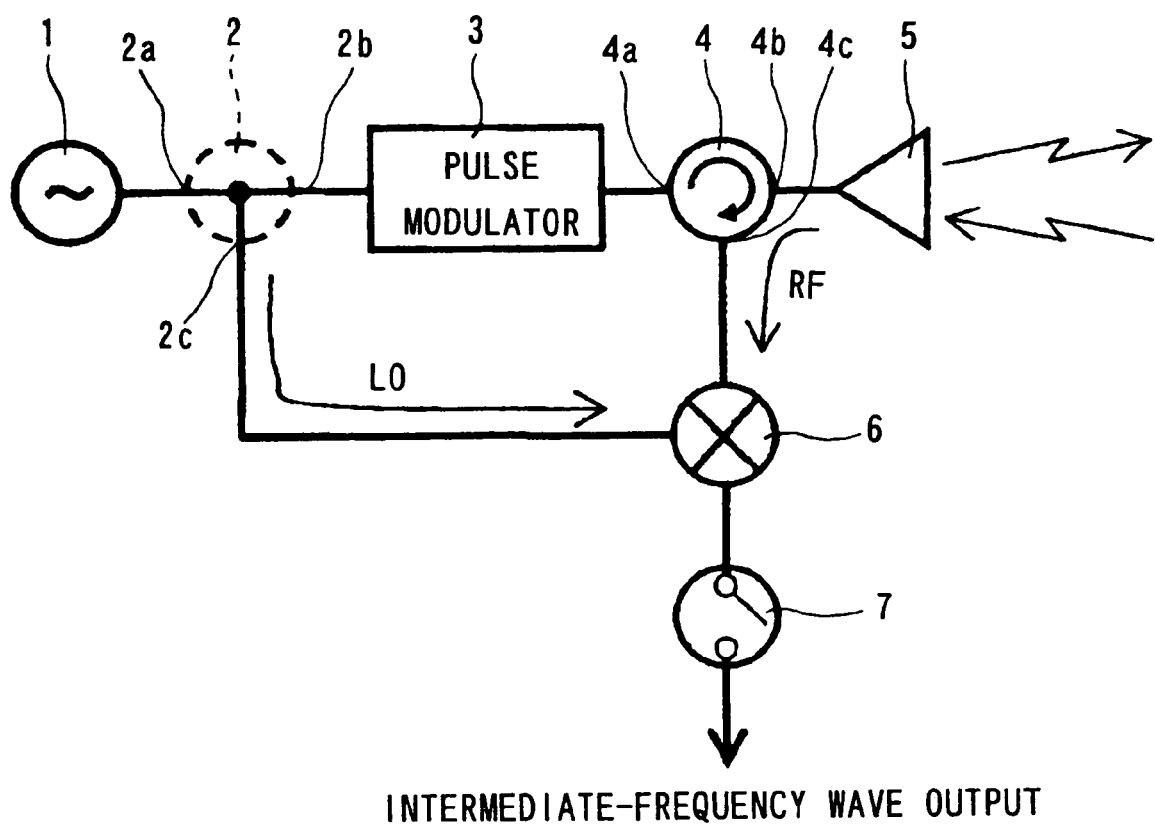
FIG. 1 is a block circuit diagram schematically showing a high-frequency transmitting/receiving apparatus according to a first embodiment of the invention.

Now referring to the drawings, preferred embodiments of the invention are described below.

Hereinafter, a detailed description will be given as to high-frequency transmitting/receiving apparatuses according to first to twelfth embodiments of the invention, a radar system having the high-frequency transmitting/receiving apparatus, a vehicle equipped with the radar system, and a small boat equipped with the radar system.

Figure 5A:
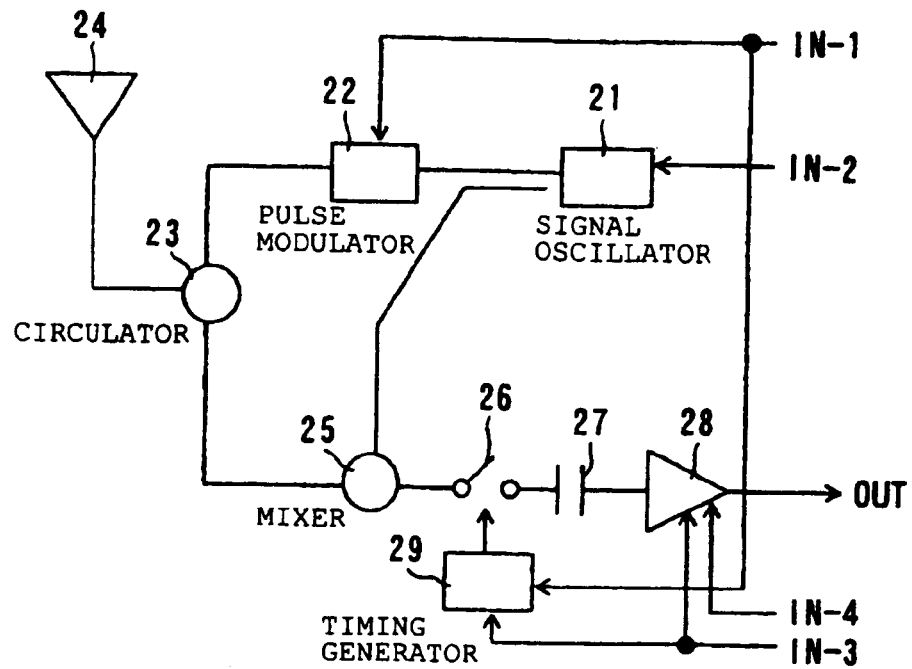
FIGS. 5A and 5B are block circuit diagrams associated with a case where high-frequency transmitting/receiving apparatuses according to fifth and sixth embodiments of the invention are each applied to a millimeter-wave radar, showing the configuration of the millimeter-wave signal transmitting section and intermediate-frequency signal transmitting section thereof.
Figure 5B:
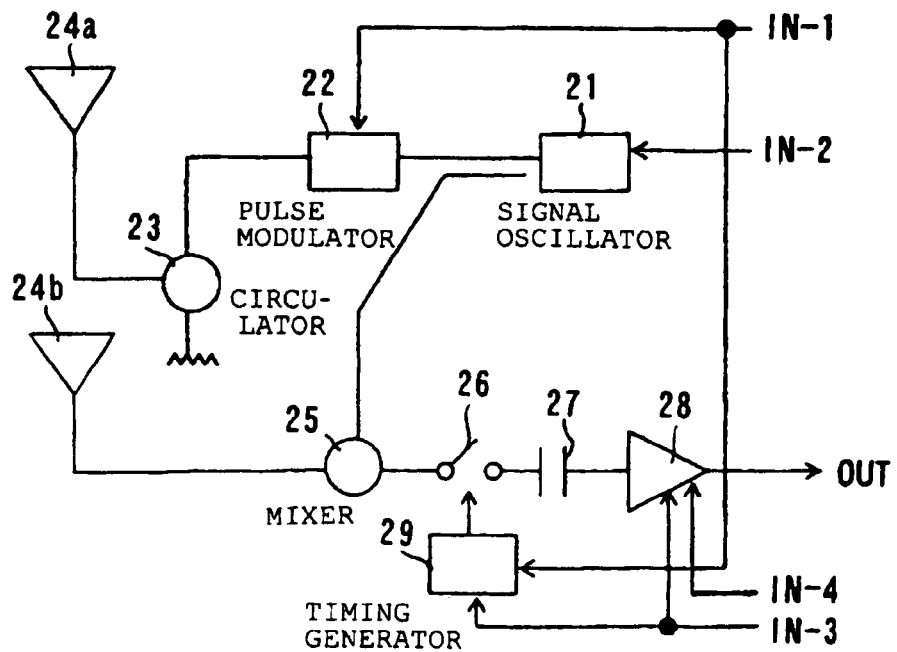
Figure 6:
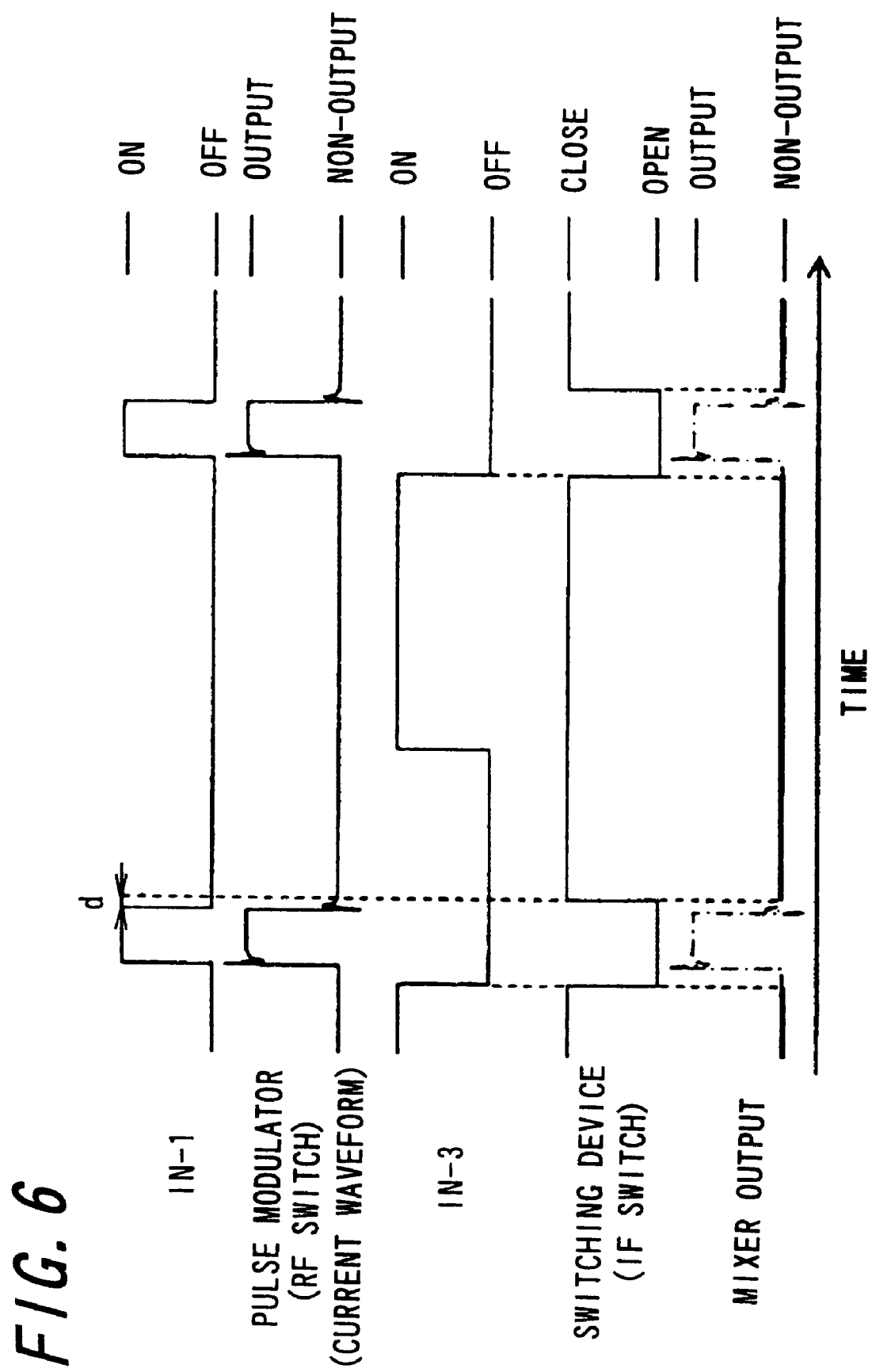
FIG. 6 is a diagram schematically showing voltage waveforms of a pulsed signal at an IN-1 terminal, a pulse signal at an IN-3 terminal, a switching signal at a switching device, and an output from a mixer; a current waveform of a pulse modulator; and relative timing among the aforementioned signals, as seen in the high-frequency transmitting/receiving apparatus according to the fifth embodiment of the invention.
Figure 7A:
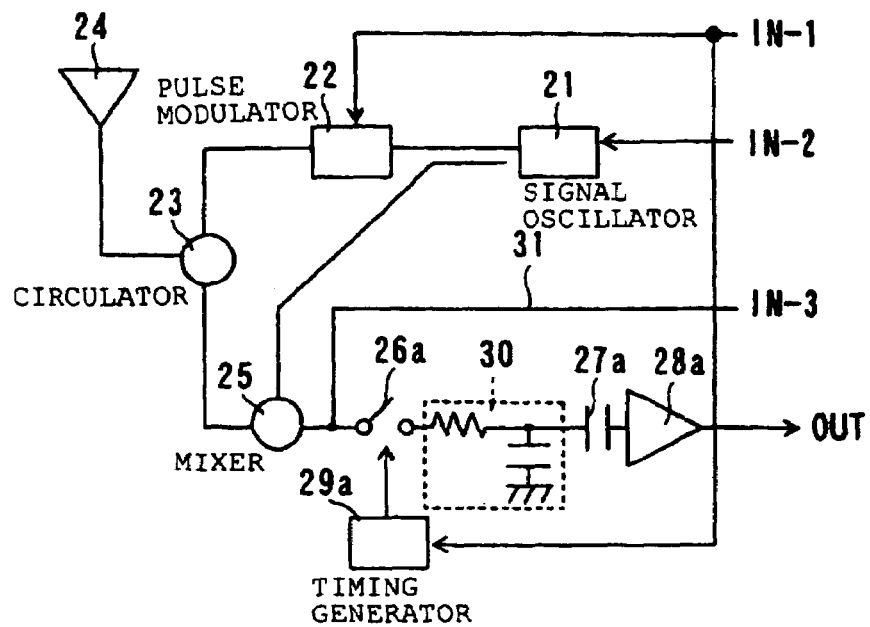
FIGS. 7A and 7B are block circuit diagrams of one example associated with a case where high-frequency transmitting/receiving apparatuses according to seventh and eighth embodiments of the invention are each applied to a millimeter-wave radar, showing the configuration of the millimeter-wave signal transmitting section and intermediate-frequency signal transmitting section thereof.
Figure 7B:
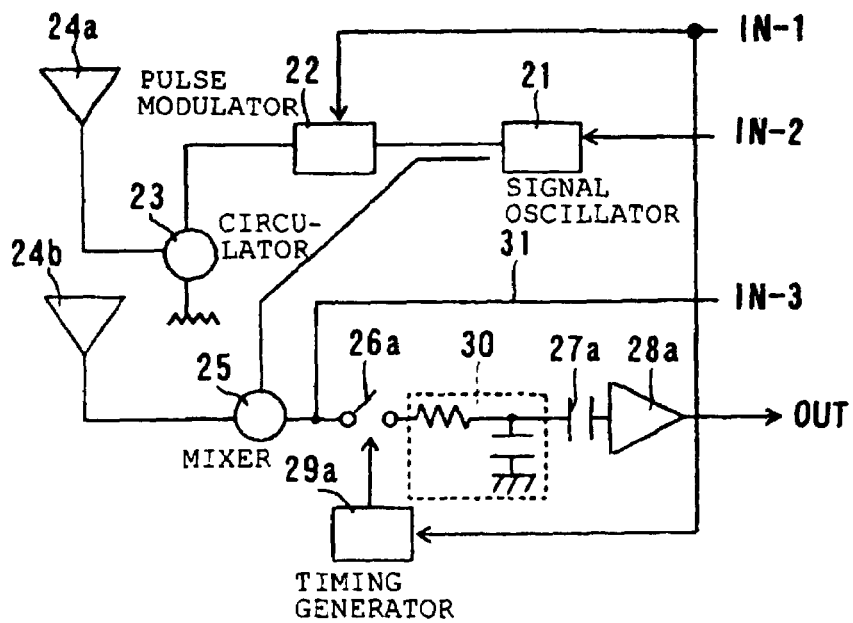
Figure 8A:
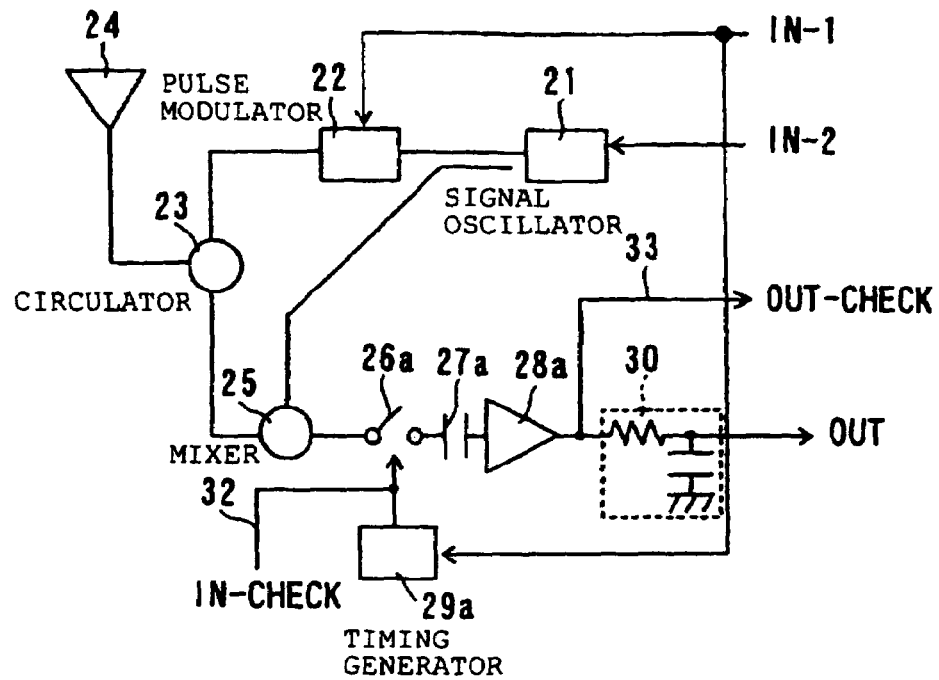
FIGS. 8A and 8B are block circuit diagrams of another example associated with a case where the high-frequency transmitting/receiving apparatuses according to the seventh and eighth embodiments of the invention are each applied to a millimeter-wave radar, showing the configuration of the millimeter-wave signal transmitting section and intermediate-frequency signal transmitting section thereof.
Figure 8B:
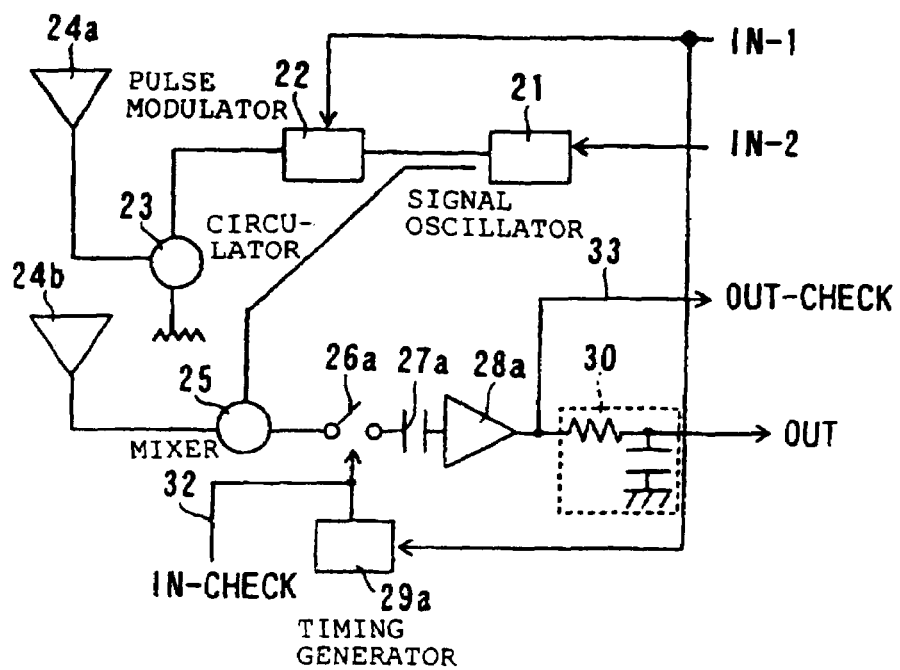
Figure 9:
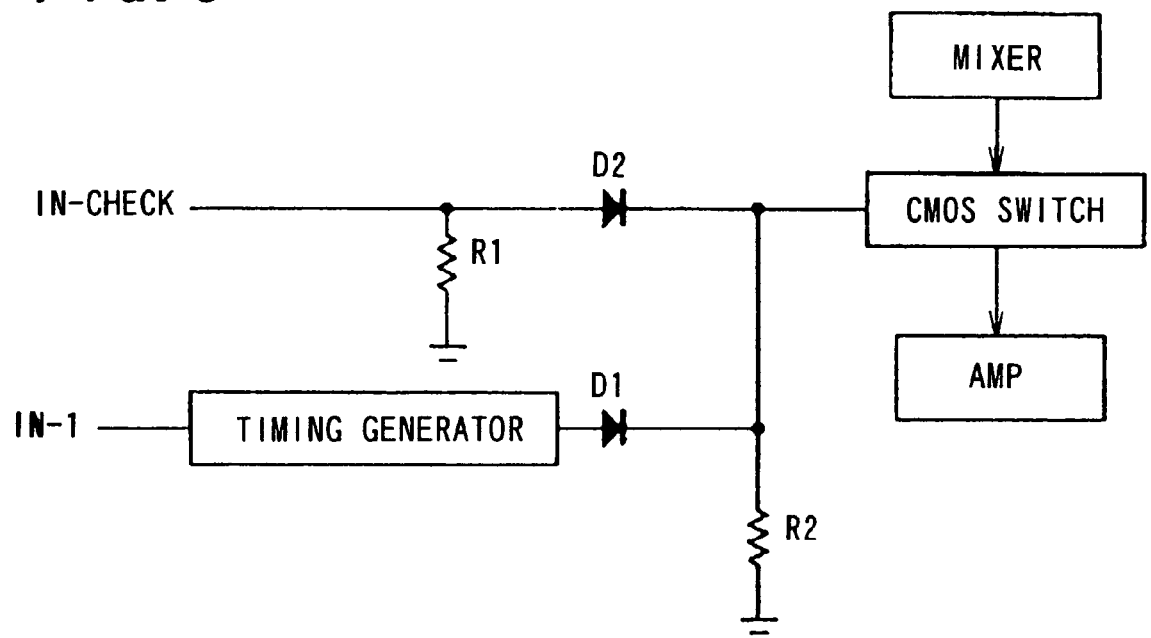
FIG. 9 is a block circuit diagram showing one example associated with a case where a test signal is inputted to the switching device in a high-frequency transmitting/receiving apparatuses according to the seventh and eighth embodiments of the invention.
Figure 10A:
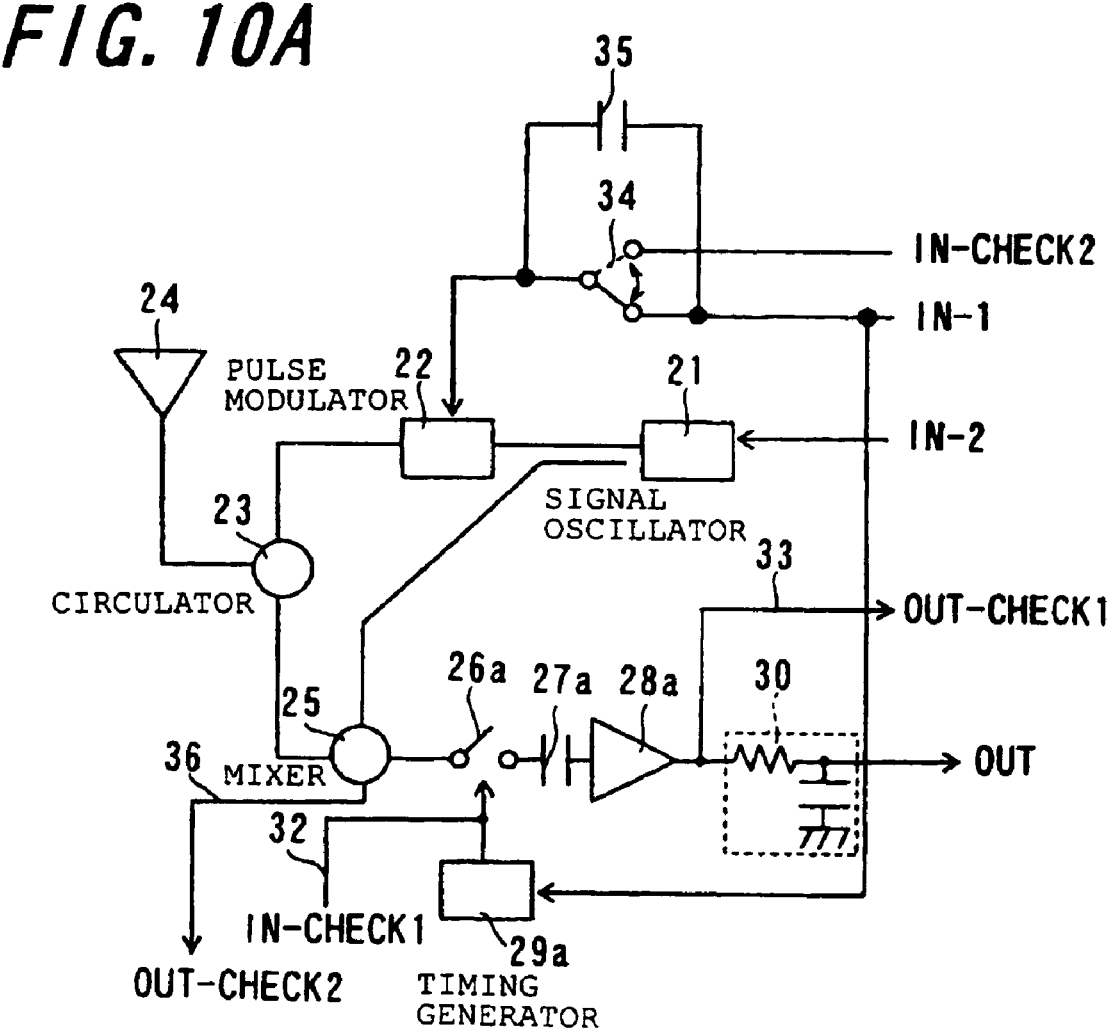
FIGS. 10A and 10B are block circuit diagrams of still another example associated with a case where the high-frequency transmitting/receiving apparatus according to the seventh and eighth embodiments of the invention are each applied to a millimeter-wave radar, showing the configuration of the millimeter-wave signal transmitting section and intermediate-frequency signal transmitting section thereof.
Figure 10B:
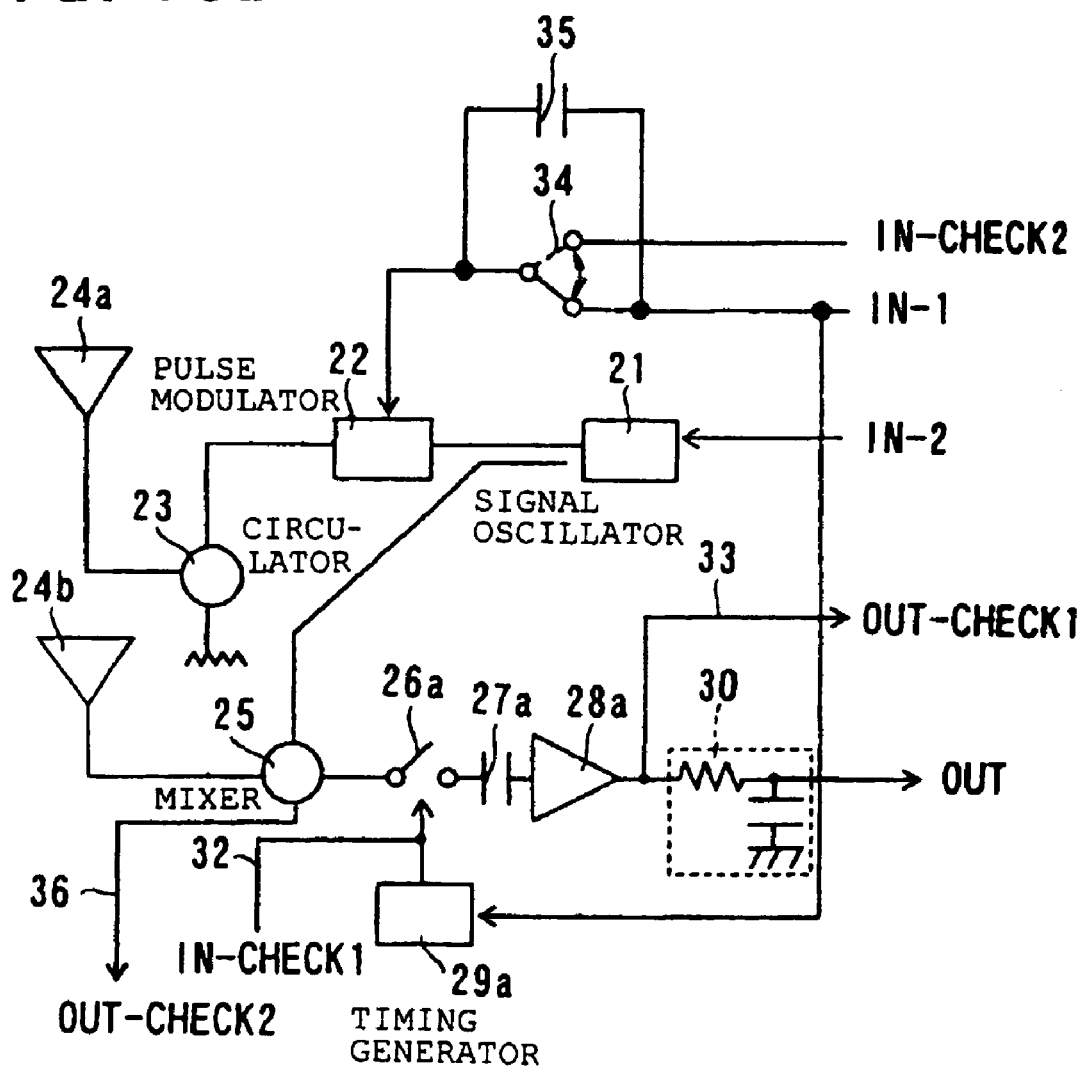
Figure 11A:
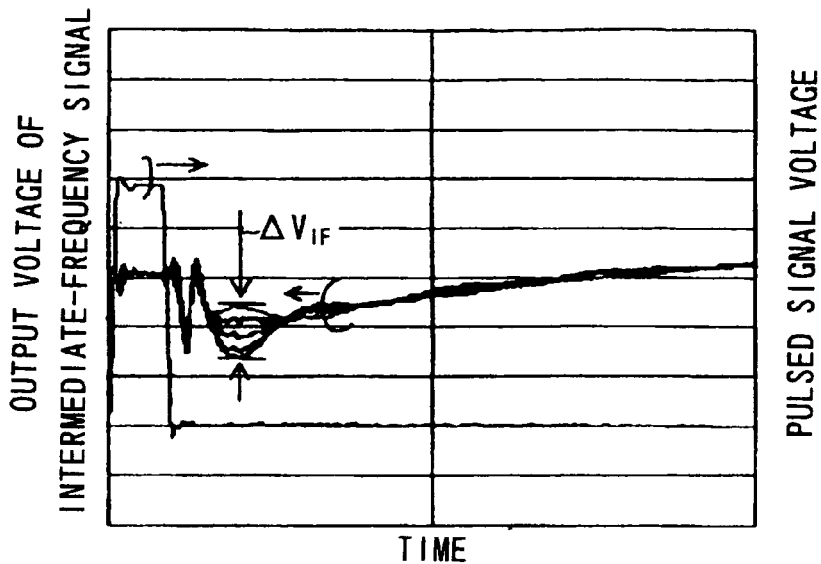
FIGS. 11A and 11B are diagrams of examples of measurement results on an output voltage of an intermediate-frequency signal associated with a case where the high-frequency transmitting/receiving apparatus according to the seventh embodiment of the invention is implemented as a millimeter-wave radar, with FIG. 11A showing one example of measurement results on the output voltage waveform of the intermediate-frequency signal, and FIG. 11B showing the dependence of fluctuation in the output voltage of the intermediate-frequency signal $\Delta V_{IF}$ with respect to a correction capacitance value $C_0$.
Figure 11B:
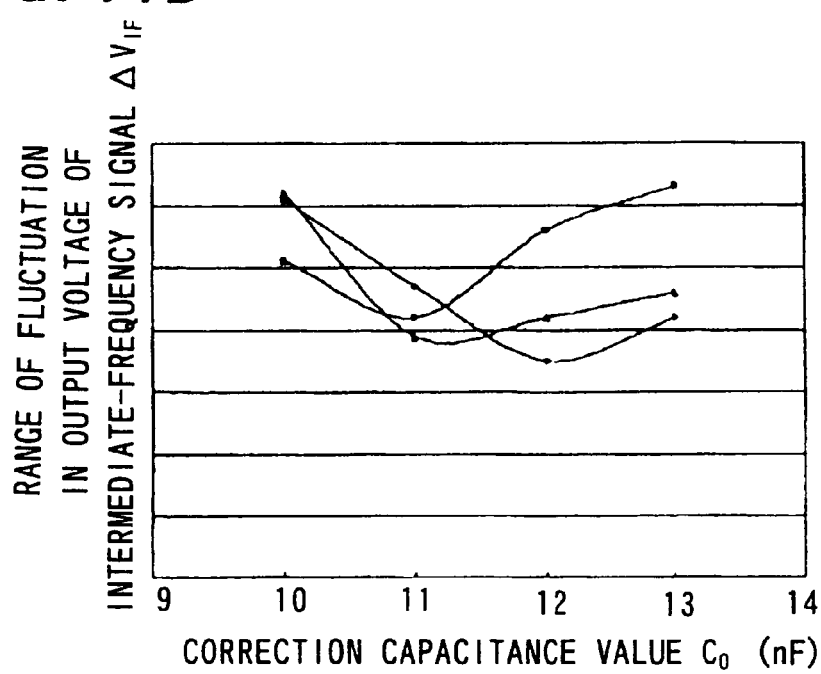
Figure 12A:
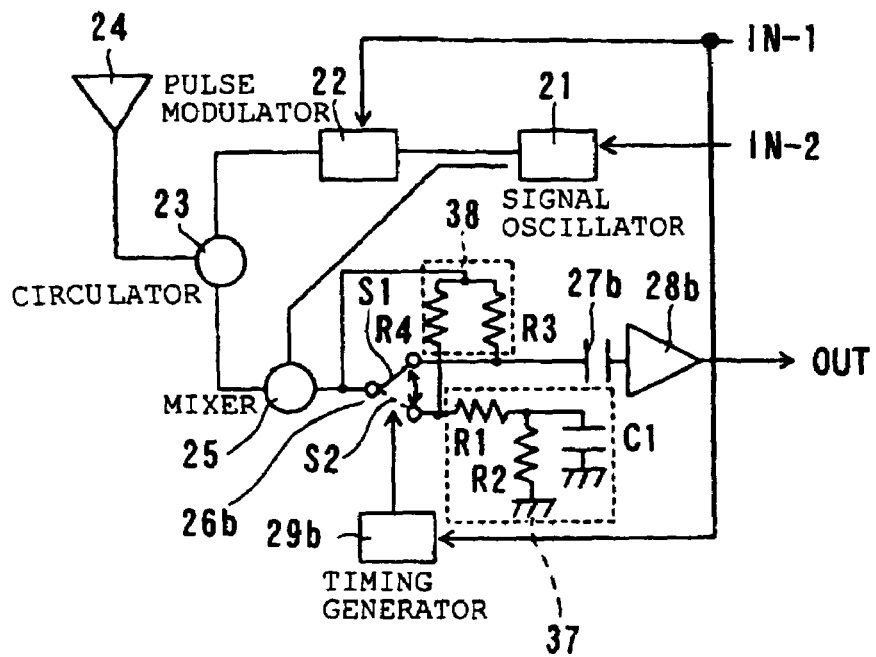
FIGS. 12A and 12B are block circuit diagrams associated with a case where high-frequency transmitting/receiving apparatuses according to ninth and tenth embodiments of the invention are each applied to a millimeter-wave radar, showing the configuration of the millimeter-wave signal transmitting section and intermediate-frequency signal transmitting section thereof.
Figure 12B:
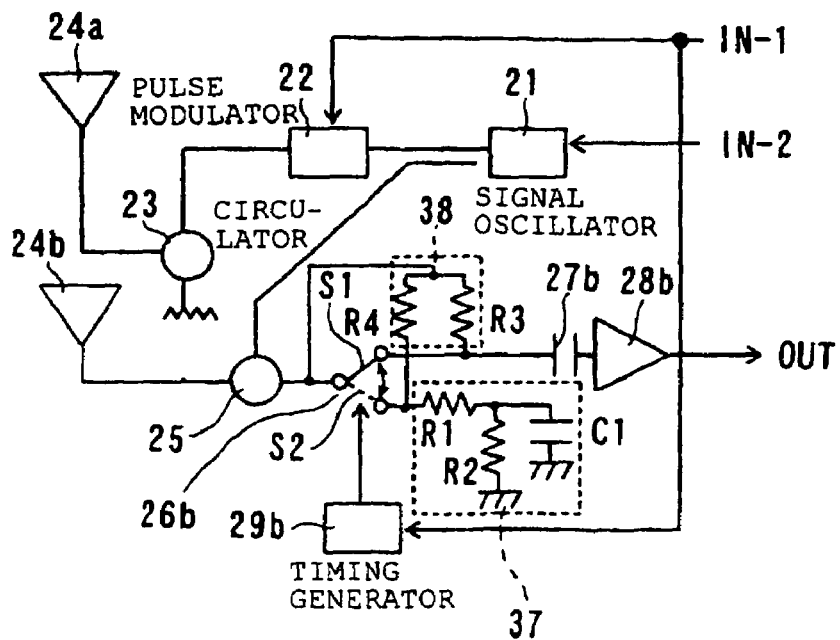
Figure 13:
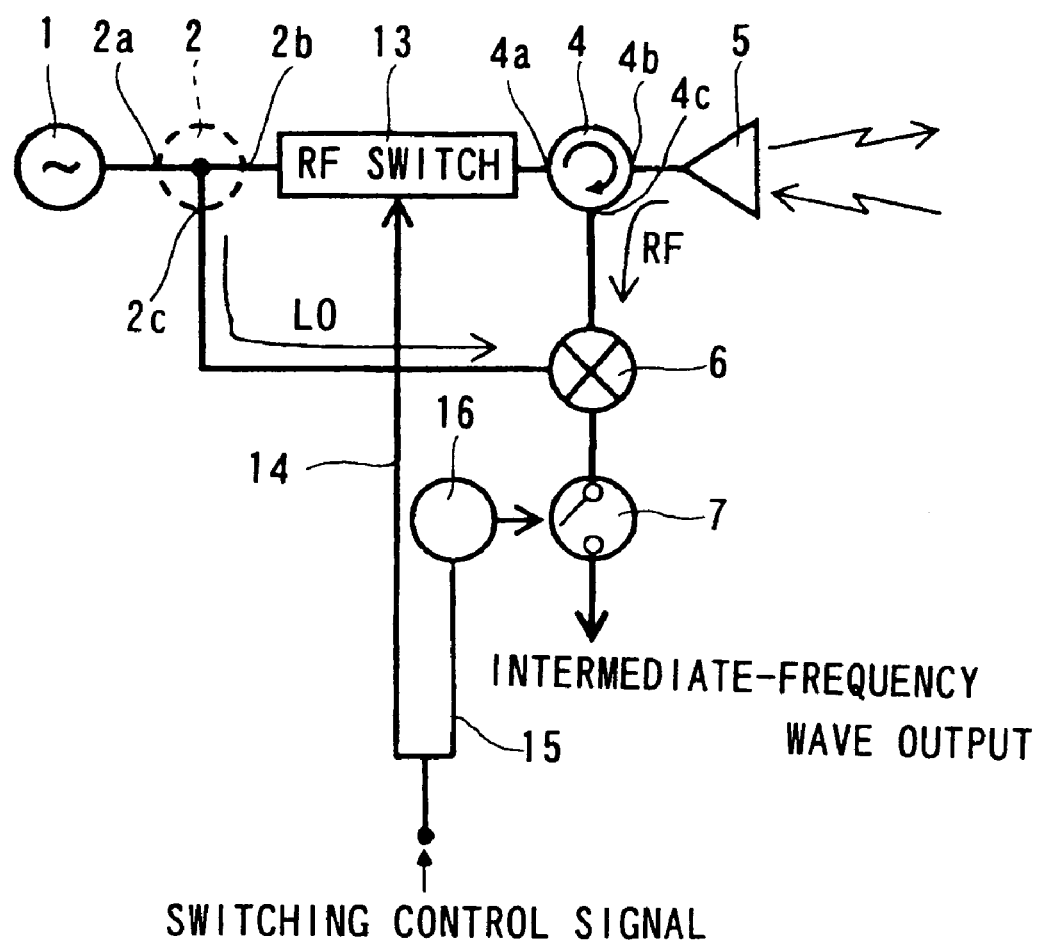
FIG. 13 is a block circuit diagram schematically showing a high-frequency transmitting/receiving apparatus according to an eleventh embodiment of the invention.
Figure 14:
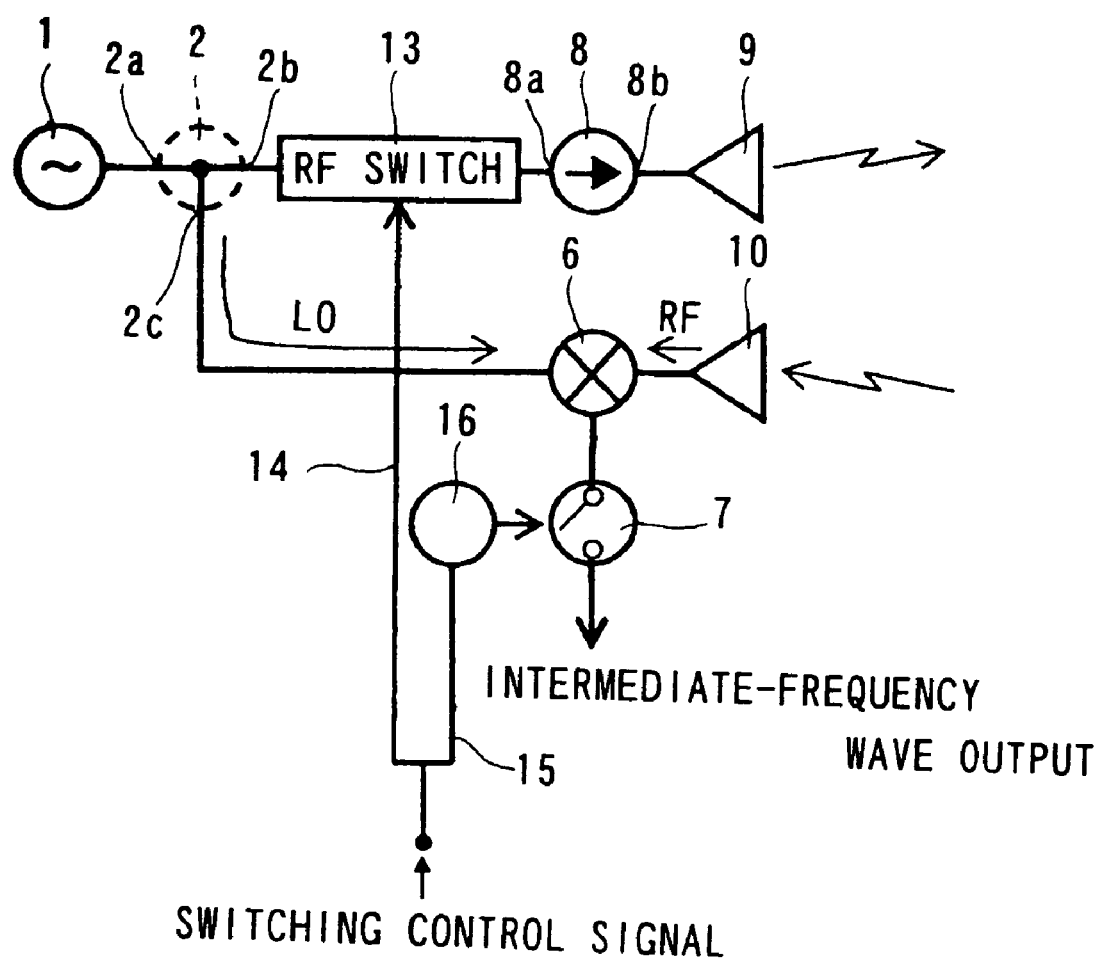
FIG. 14 is a block circuit diagram schematically showing a high-frequency transmitting/receiving apparatus according to a twelfth embodiment of the invention.
Figure 15:
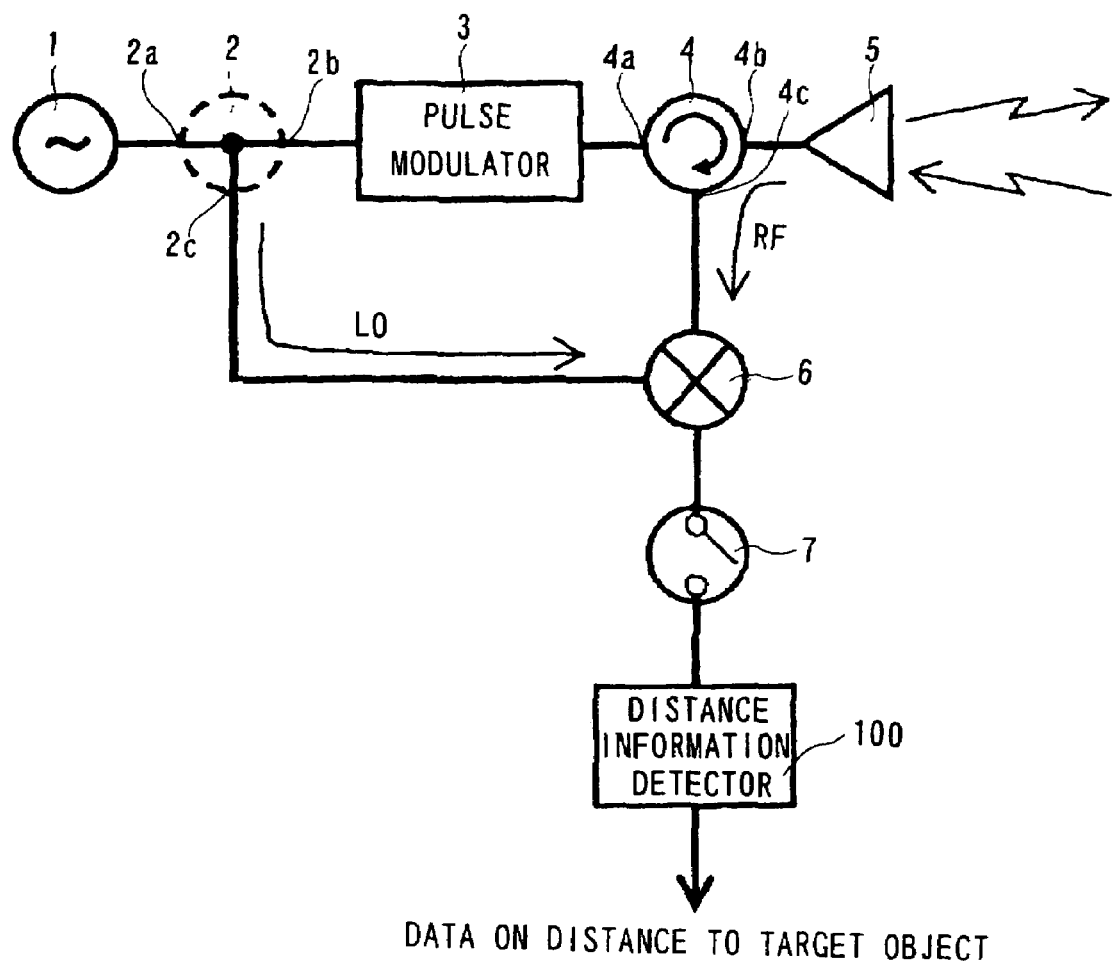
FIG. 15 is a block circuit diagram schematically showing a radar system according to an embodiment of the invention.

FIGS. 1 through 4 are block circuit diagrams schematically showing high-frequency transmitting/receiving apparatuses according to the first to fourth embodiments of the invention. FIGS. 5A and 5B are block circuit diagrams associated with a case where the high-frequency transmitting/receiving apparatuses according to the fifth and sixth embodiments of the invention are each applied to a millimeter-wave radar, showing the configuration of the millimeter-wave signal transmitting section and intermediate-frequency signal transmitting section thereof. FIG. 6 is a diagram schematically showing voltage waveforms of a pulsed signal at an IN-1 terminal, a pulse signal at an IN-3 terminal, a switching signal at a switching-device, and an output from a mixer; a current waveform of a pulse modulator; and relative timing among the aforementioned signals, as seen in the high-frequency transmitting/receiving apparatus according to the fifth embodiment of the invention. FIGS. 7A and 7B are block circuit diagrams of one example associated with a case where the high-frequency transmitting/receiving apparatuses according to seventh and eighth embodiments of the invention are each applied to a millimeter-wave radar, showing the configuration of the millimeter-wave signal transmitting section and intermediate-frequency signal transmitting section thereof. FIGS. 8A and 8B are block circuit diagrams of another example associated with the case where the high-frequency transmitting/receiving apparatuses according to the seventh and eighth embodiments of the invention are each applied to a millimeter-wave radar, showing the configuration of the millimeter-wave signal transmitting section and intermediate-frequency signal transmitting section thereof. FIG. 9 is a block circuit diagram showing one example associated with a case where a test signal is inputted to the switching device in the high-frequency transmitting/receiving apparatuses according to the seventh and eighth embodiments of the invention. FIGS. 10A and 10B are block circuit diagrams of still another example associated with the case where the high-frequency transmitting/receiving apparatuses according to the seventh and eighth embodiments of the invention are each applied to a millimeter-wave radar, showing the configuration of the millimeter-wave signal transmitting section and intermediate-frequency signal transmitting section thereof. FIGS. 11A and 11B are diagrams of examples of measurement results on an output voltage of an intermediate-frequency signal associated with the case where the high-frequency transmitting/receiving apparatus according to the seventh embodiment of the invention implemented as a millimeter-wave radar, with FIG. 11A showing one example of measurement results on the output voltage waveform of the intermediate-frequency signal, and FIG. 11B showing the dependence of fluctuation in the output voltage of the intermediate-frequency signal $\Delta V_{IF}$ with respect to a correction capacitance value $C_0$. FIGS. 12A and 12B are block circuit diagrams of one example associated with a case where high-frequency transmitting/receiving apparatuses according to ninth and tenth embodiments of the invention are each applied to a millimeter-wave radar, showing the configuration of the millimeter-wave signal transmitting section and intermediate-frequency signal transmitting section thereof. FIGS. 13 and 14 are block circuit diagrams schematically showing high-frequency transmitting/receiving apparatuses according to eleventh and twelfth embodiments of the invention. FIG. 15 is a block circuit diagram schematically showing a radar system according to an embodiment of the invention.

In FIGS. 1 through 4 and 13 through 15, reference numeral 1 represents a high-frequency oscillator; reference numeral 2 represents a branching device; reference numeral 3 represents a modulator; reference numeral 4 represents a circulator; reference numeral 5 represents a transmitting/receiving antenna; reference-numeral 6 represents a mixer; reference numeral 7 represents a switching device (IF switch); reference numeral 8 represents an isolator; reference numeral 9 represents a transmitting antenna; reference numeral 10 represents a receiving antenna; reference numeral 11 represents a termination circuit; and reference numeral 100 represents a distance information detector.

Moreover, in FIGS. 5A and 5B, 7A and 7B, 8A and 8B, 10A and 10B, and 12A and 12B, reference numeral 21 represents a millimeter-wave signal oscillator; reference numeral 22 represents a pulse modulator (RF switch); reference numeral 23 represents a circulator; reference numeral 24 represents a transmitting/receiving antenna; reference numeral 24a represents a transmitting antenna; reference numeral 24b represents a receiving antenna; reference numeral 25 represents a mixer; reference numeral 26 represents a switching device (IF switch); reference numeral 30 represents a filter; reference numeral 31 represents an input wiring line for a test signal; reference numeral 32 represents an input wiring line for a test switching signal; reference numeral 33 represents an output wiring line for a test signal (switching noise detection terminal); reference numeral 34 represents a signal selector switch; reference numeral 35 represents a capacitor; reference numeral 36 represents an output wiring line for a transmission-circuit test signal (detection terminal for detecting a millimeter-wave signal during transmission-circuit operation tests); reference numeral 37 represents a termination circuit; reference numerals 38, $R_3$, and $R_4$ represent resistance; reference symbol S1 represents a first system; and reference symbol S2 represents a second system.

Figure 16:
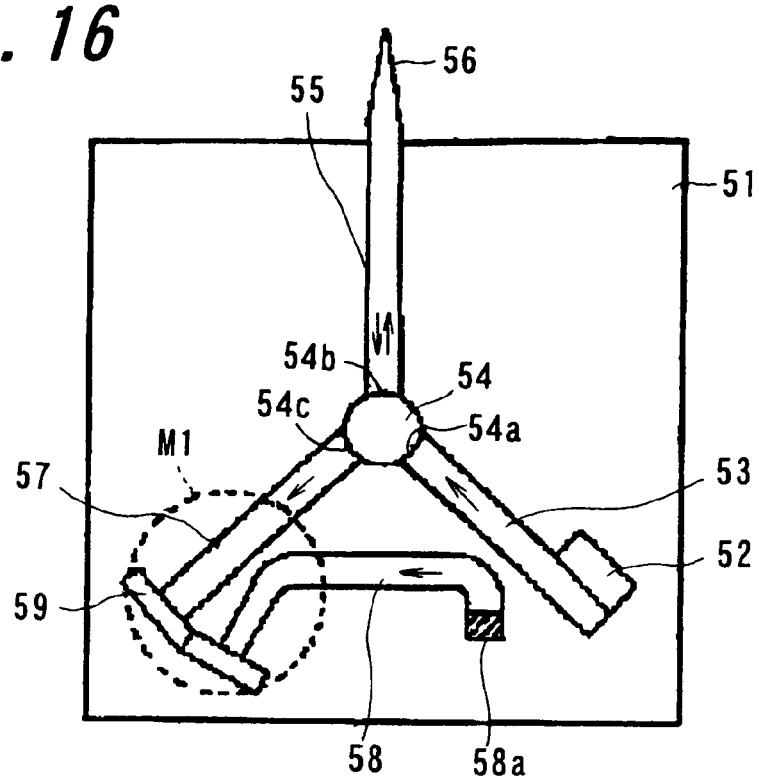
FIG. 16 is a plan view of the high-frequency transmitting/receiving apparatus having a transmitting/receiving antenna.
Figure 17:
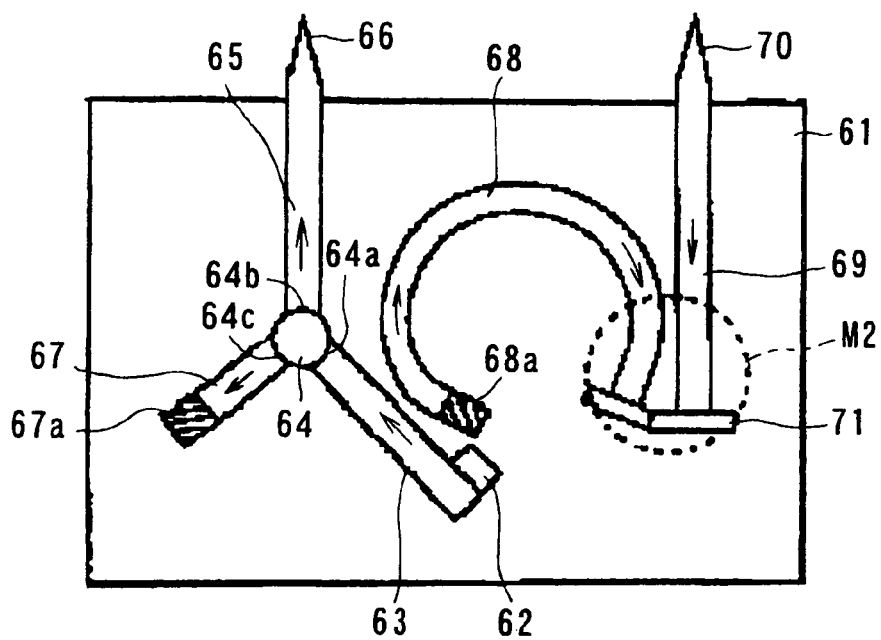
FIG. 17 is a plan view of the high-frequency transmitting/receiving apparatus having a transmitting antenna and a receiving antenna.

Further, in FIGS. 16 and 17, reference numerals 51 and 61 represent parallel plate conductors; reference numerals 52 and 62 represent a millimeter-wave signal oscillator; reference numerals 53 and 63 represent a first dielectric line; reference numerals 54 and 64 represent a circulator; reference numerals 55 and 65 represent a third dielectric line; reference numeral 56 represents a transmitting/receiving antenna; reference numerals 57 and 69 represent a fourth dielectric line; reference numerals 58 and 68 represent a second dielectric line; reference numerals 59 and 71 represent a mixer; reference numeral 67 represents a fifth dielectric line; reference numeral 66 represents a transmitting antenna; and reference numeral 70 represents a receiving antenna.

The high-frequency transmitting/receiving apparatus according to the first embodiment of the invention shown in FIG. 1 includes a high-frequency oscillator 1, a branching device 2, a modulator 3, a circulator 4, a transmitting/receiving antenna 5, a mixer 6 and a switching device 7. The high-frequency oscillator 1 generates a high-frequency signal. The branching device 2 is connected to the high-frequency oscillator 1, and branches the high-frequency signal into high-frequency branch signals so that the high-frequency branch signals may be outputted to one output end 2b and another output end 2c of the branching device 2, respectively. The modulator 3 is connected to the one output end 2b of the branching device 2, and modulates a part of the high-frequency signal, i.e., the high-frequency branch signal branched to the one output end 2b, so as to output it as a high-frequency signal for transmission. The circulator 4 is formed of a magnetic substance, and has a first terminal 4a, a second terminal 4b, and a third terminal 4c that are arranged about the periphery of the magnetic substance, of which the first terminal 4a is connected to the output end of the modulator 3, wherein a high-frequency signal inputted from one of the terminals is outputted from the other adjoining terminal in turn, in order from the first through third terminals. The transmitting/receiving antenna 5 is connected to the second terminal 4b of the circulator 4, transmits the high-frequency signal for transmission and receives a high-frequency signal returned from a target object to be detected through reflection. The mixer 6 is connected between the other output end 2c of the branching device 2 and the third terminal 4c of the circulator 4. The mixer 6 mixes the high-frequency branch signal outputted to the other output end 2c and a high-frequency signal received by the transmitting/receiving antenna 5 so as to generate an intermediate-frequency signal. The switching device 7 is connected to the output end of the mixer 6. The switching device 7 interrupts the intermediate-frequency signal in an opened state, and, when the high-frequency signal for transmission from the modulator 3 is in a non-output state and the condition is stabilized, changes from the opened state to a closed state to allow passage of the intermediate-frequency signal.

Figure 2:
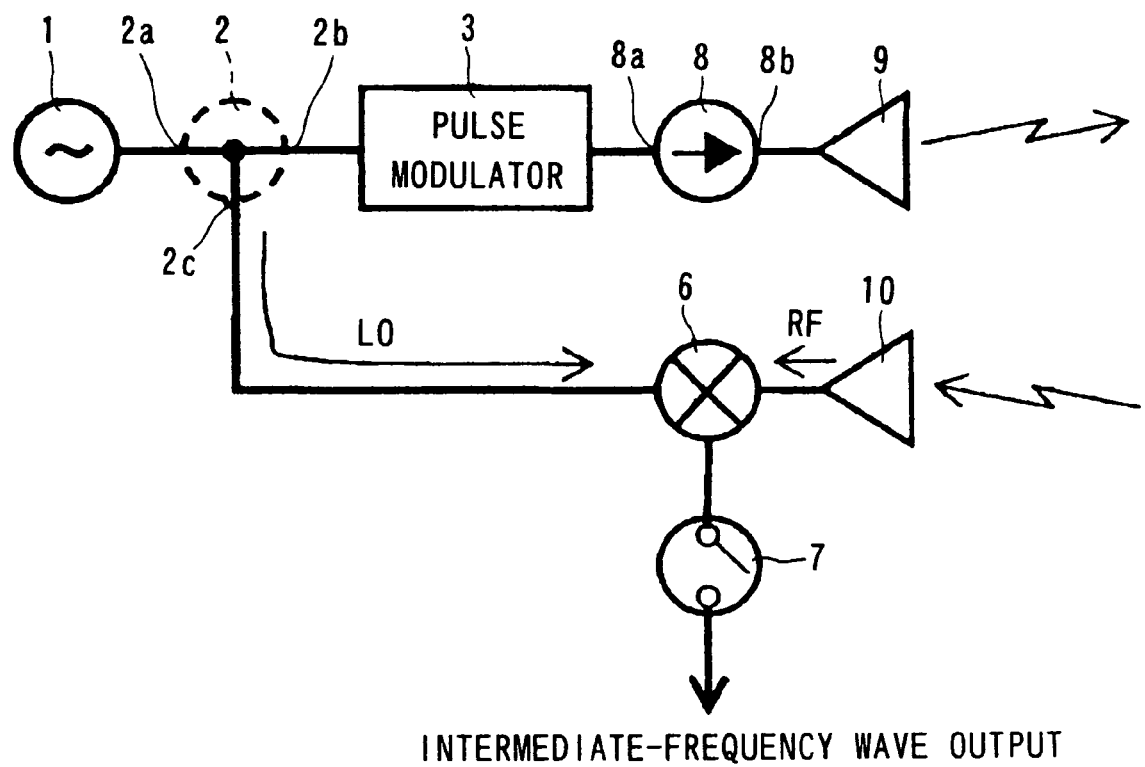
FIG. 2 is a block circuit diagram schematically showing a high-frequency transmitting/receiving apparatus according to a second embodiment of the invention.

The high-frequency transmitting/receiving apparatus according to the second embodiment of the invention shown in FIG. 2 includes a high-frequency oscillator 1, a branching device 2, a modulator 3, an isolator 8, a transmitting antenna 9, a receiving antenna 10, a mixer 6 and a switching device 7. The high-frequency oscillator 1 generates a high-frequency signal. The branching device 2 is connected to the high-frequency oscillator 1, and branches the high-frequency signal into high-frequency branch signals so that the high-frequency branch signals may be outputted to one output end 2b and another output end 2c of the branching device 2, respectively. The modulator 3 is connected to the one output end 2b of the branching device 2, and modulates a part of the high-frequency signal, i.e., the high-frequency branch signal branched to the one output end 2b, so as to output it as a high-frequency signal for transmission. The isolator 8 has its one end 8a connected to the output end of the modulator 3, and passes the high-frequency signal for transmission from one end 8a to the other end 8b thereof. The transmitting antenna 9 is connected to the other end 8b of the isolator 8, and transmits the high-frequency signal for transmission. The receiving antenna 10 is connected to the other output end 2c of the branching device 2. The mixer 6 is connected between the other output end 2c of the branching device 2 and the receiving antenna 10. The mixer 6 mixes the high-frequency branch signal outputted to the other output end 2c and a high-frequency signal received by the receiving antenna 10 so as to generate an intermediate-frequency signal. The switching device 7 is connected to the output end of the mixer 6. The switching device 7 interrupts the intermediate-frequency signal in an opened state, and, when the high-frequency signal for transmission from the modulator 3 is in a non-output state and the condition is stabilized, changes from the opened state to a closed state to allow passage of the intermediate-frequency signal.

In the constructions described just above, the switching device 7 is operated as follows before and after transmission of pulsed high-frequency signals for transmission. When the high-frequency signal for transmission is unstable in output condition, the switching device 7 is turned into an opened state to interrupt the intermediate-frequency signal. Then, after the high-frequency signal for transmission is stabilized in output condition, the switching device 7 changes from the opened state to the closed state to allow passage of the intermediate-frequency signal. In order to operate the switching device 7 in that way, specifically, in a switching control section (not shown) for controlling switching of the switching device 7 is disposed a delay line or a delay circuit element, which produces a signal for controlling switching of the switching device 7 in the switching control section at timing delayed with respect to a modulation signal from the modulator 3 by a fixed time interval. Moreover, concrete examples of the switching device 7 include: a semiconductor logic element such as CMOS and TTL; an analog IC; a bipolar transistor; a field-effect transistor (FET); a mechanical switch; and MEMS (Micro-electro Mechanical Systems) switch.

In the embodiments of the high-frequency transmitting/receiving apparatuses according to the first and second embodiments of the invention shown in the block circuit diagrams of FIGS. 1 and 2, respectively, if a modulation signal to be inputted to the modulator 3 contains noise such as a pulse waveform distortion, and the noise finds its way into the high-frequency signal for transmission, there is a possibility that a part of the high-frequency signal for transmission including the noise leaks toward the mixer 6. Hereupon, even if the signal leakage occurs, the switching device 7 acts to interrupt the intermediate-frequency signal resulting from the part of the high-frequency signal for transmission including the noise. Therefore, the S/N ratio can be increased. As a result, the reception performance can be enhanced.

The high-frequency transmitting/receiving apparatuses according to the first and second embodiments of the invention should preferably be composed as follows.

It is preferable that the switching device 7, now kept in a closed state, changes from the closed state to an opened state before the modulator 3 outputs the following high-frequency signal for transmission. Such a control can be exercised by disposing, in addition to the above-described delay line or delay circuit element, another delay line or delay circuit element analogous thereto in the switching control section, or by doing input of another switching control signal. Thereby, before the following intermediate-frequency signal is outputted, the switching device 7 acts to avoid that the pulsed high-frequency signal for transmission containing noise enters the mixer 6 and resultantly an intermediate-frequency signal containing noise leaks into a reception system connected downstream of the mixer 6. As a result, the S/N ratio can further be increased, and the reception performance will accordingly be enhanced.

The modulator 3 is preferably formed of a semiconductor device made of a material which is predominantly composed of a III-V compound semiconductor element. Examples of the material including the III-V compound semiconductor element include: gallium arsenide (GaAs); indium phosphide (InP); indium antimonide (InSb); indium gallium arsenide (InGaAs: gallium arsenide (GaAs) containing indium (In)); gallium aluminum arsenide (GaAlAs: gallium arsenide (GaAs) containing aluminum (Al)); indium gallium aluminum arsenide (InGaAlAs); indium aluminum gallium arsenide (InAlGaAs); and mixed crystal or multiple-quantum well (MQW) of semiconductor superlattice of indium arsenide (InAs), aluminum arsenide (AlAs), and indium aluminum arsenide (InAlAs). Moreover, as a semiconductor device made of any of the aforementioned materials, a diode, a bipolar transistor, or a field-effect transistor (FET) are desirable. The semiconductor device made of such a material including the III-V compound semiconductor element is characterized by high carrier mobility and short carrier life time. Therefore, in the modulator 3 composed of such a semiconductor device, when modulation current is fed through the semiconductor device, the modulation current can swiftly be converged from a transient state to a steady state, and thus a pulsed high-frequency signal for transmission corresponding to the modulation current can swiftly be settled into a steady state. In this way, even if the switching device 7 is turned into a closed (ON) state with quick timing after the pulsed high-frequency signal for transmission is outputted, it never occurs that an intermediate-frequency signal, which results from the high-frequency signal for transmission mixed with an unwanted signal produced immediately after leading edge of a pulse, is outputted to the component located downstream of the mixer 6. As a result, it is possible to reduce the time taken to intermit transmission/reception operations, which is accompanied by interruption of the intermediate-frequency signal.

Note that, in a case where the modulator 3 does not necessarily have to operate at high speed, instead of the III-V compound semiconductor element, Silicon (Si) or mixed crystal of Silicon-Germanium (SiGe) may also be employed.

It is preferable that, on the downstream side of the switching device 7 is disposed a filter for blocking intrusion of noise into the intermediate-frequency signal, while allowing passage of the intermediate-frequency signal during switching of the switching device 7. By the filter disposed on the downstream side, it is possible to remove such switching noise as may arise in accompaniment with switching of the switching device 7 and find its way into the intermediate-frequency signal, and thereby prevent an unwanted noise signal from entering the other circuit system nearby without fail. Moreover, since an unwanted noise signal is removed by the filter, it follows that the intermediate-frequency signal to be received can be identified with ease and with reliability.

It is also preferable that, between the output end of the mixer 6 and the switching device 7 is inputted a test signal having a frequency lower than the 3 dB cutoff frequency of the filter. The test signal is lower in frequency than the intermediate-frequency signal. Meanwhile, such noise as may find its way into the intermediate-frequency signal in accompaniment with switching of the switching device 7 is higher in frequency than the intermediate-frequency signal. Thus, the test signal is allowed to pass through the switching device 7 independently of the intermediate-frequency signal and noise, and is then outputted properly without being removed by the filter. As a result, the high-frequency transmitting/receiving apparatus is able to perform self-monitoring effectively (self-monitoring function) simply by making sure that the test signal is outputted properly through the switching device 7 and the filter, without hindering removal of switching noise.

Moreover, it is preferable that the switching device 7 receives a test switching signal for generating switching noise, and that, between the switching device 7 and the filter is disposed a switching noise detection terminal. By the input of the test switching signal, the switching device 7 generates weak switching noise. This eliminates the need to attenuate a test signal by an attenuator or the like device to obtain an attenuated test signal. That is, the weak switching noise can be utilized as an attenuated test signal. The switching noise is inputted to the downstream-side circuit, so that it may be detected by the detection terminal disposed between the switching device and the filter without causing saturation in an active circuit, such as an amplifier, connected to the downstream-side circuit. As a result, a self-monitoring function can be realized in a simple manner.

Further, it is preferable that the modulator 3 is provided with a signal selector switch for switching input of modulation signals and DC signals different from the modulation signals. For example, the signal selector switch should preferably be disposed basically in the same manner as a signal selector switch 34 in the example shown in the block diagram of FIGS. 10A and 10B. As the signal selector switch, for example, a CMOS semiconductor switch having a so-called SPDT function, or a two-mode selector switch analogous to the switching device 7 may be employed. By operating the signal selector switch in such a way as to change the signal path for input signals to be used in the modulator 3, apart from a pulsed modulation signal, a DC signal produced by an operation-test signal source such as a DC power source can be inputted to the modulator 3. Hence, in addition to a pulsed modulation signal, a DC signal such as a DC voltage can be inputted to the modulator 3 as an operation-test signal for the transmission system of the high-frequency transmitting/receiving apparatus. In response to the inputted signal, the modulator 3 produces an output in the downstream-side transmission circuit, whereby making it possible to carry out an operation test (trouble monitoring) on the transmission circuit. As a result, a function for monitoring troubles of the transmission circuit can also be realized.

At this time, it is preferable that a capacitor is connected in parallel with the signal selector switch basically in the same manner as a capacitor 35 of the example shown in the block diagram of FIGS. 10A and 10B. The capacitor acts to cancel out a parasitic capacitance existing within the signal selector switch to minimize reflection of high-frequency components of a pulse signal which is caused by the parasitic capacitance in the signal selector switch. Thereby, a low-distortion pulse signal can be inputted to the modulator 3. Moreover, in this case, the pulsed high-frequency signal for transmission sent out from the modulator 3 is stabilized in signal level. Thus, even if the switching device 7, which serves to avoid that a part of the high-frequency signal for transmission enters the mixer 6 and resultantly leaks into the downstream-side reception system, is turned into a closed (ON) state immediately after the pulsed high-frequency signal for transmission is sent out, no unwanted intermediate-frequency signal is outputted. As a result, it is possible to resume a reception operation immediately after the high-frequency signal for transmission is sent out.

Figure 3:
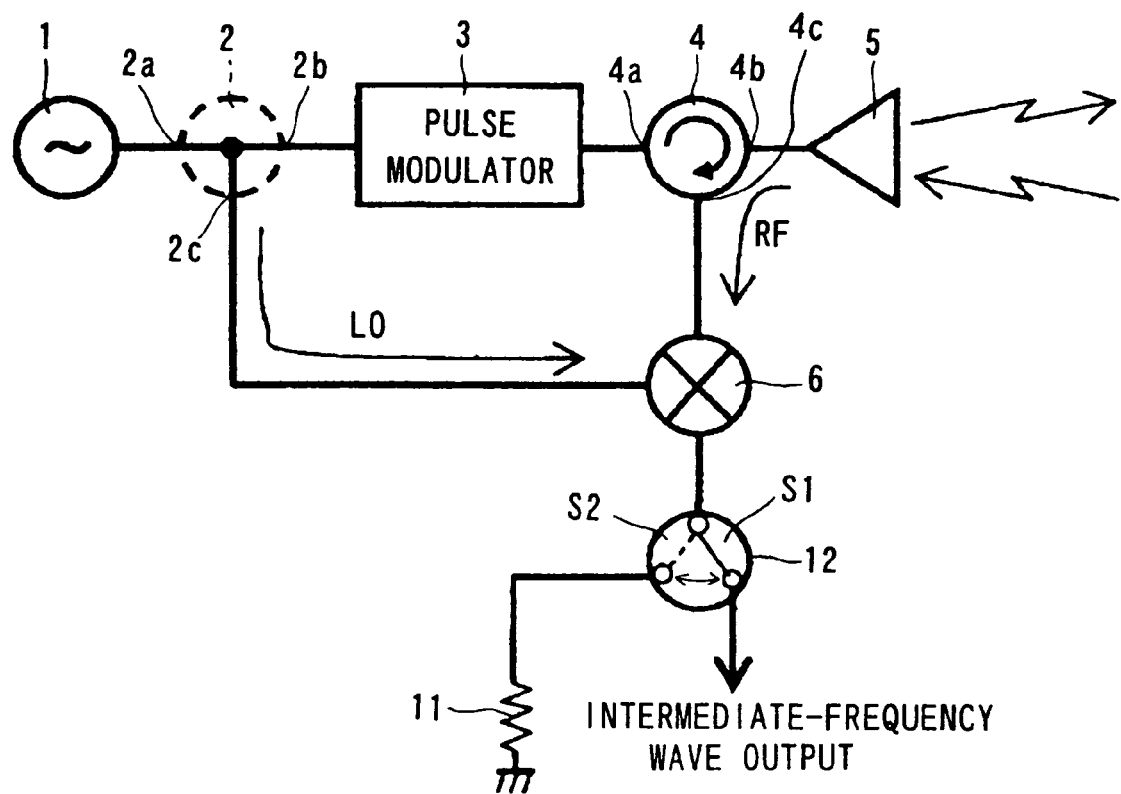
FIG. 3 is a block circuit diagram schematically showing a high-frequency transmitting/receiving apparatus according to a third embodiment of the invention.

The high-frequency transmitting/receiving apparatus according to the third embodiment of the invention shown in FIG. 3 includes a high-frequency oscillator 1, a branching device 2, a modulator 3, a circulator 4, a transmitting/receiving antenna 5, a mixer 6 and a switch 12. The high-frequency oscillator 1 generates a high-frequency signal. The branching device 2 is connected to the high-frequency oscillator 1, and branches the high-frequency signal into high-frequency branch signals so that the high-frequency branch signals may be outputted to one output end 2b and another output end 2c of the branching device 2, respectively. The modulator 3 is connected to the one output end 2b of the branching device 2, and modulates a part of the high-frequency signal, i.e., the high-frequency branch signal branched to the one output end 2b, so as to output it as a high-frequency signal for transmission. The circulator 4 is formed of a magnetic substance, and has a first terminal 4a, a second terminal 4b, and a third terminal 4c that are arranged about the periphery of the magnetic substance, of which the first terminal 4a is connected to the output end of the modulator 3, wherein a high-frequency signal inputted from one of the terminals is outputted from the other adjoining terminal in turn, in order from the first through third terminals. The transmitting/receiving antenna 5 is connected to the second terminal 4b of the circulator 4, transmits the high-frequency signal for transmission and receives a high-frequency signal returned from a target object to be detected through reflection. The mixer 6 is connected between the other output end 2c of the branching device 2 and the third terminal 4c of the circulator 4. The mixer 6 mixes the high-frequency branch signal outputted to the other output end 2c and a high-frequency signal received by the transmitting/receiving antenna 5 so as to generate an intermediate-frequency signal. The switch 12 is connected to the output end of the mixer 6, and switches back and forth between a first system S1 which outputs the intermediate-frequency signal to the downstream side and a second system S2 to which a termination circuit 11 for terminating the intermediate-frequency signal is connected.

Figure 4:
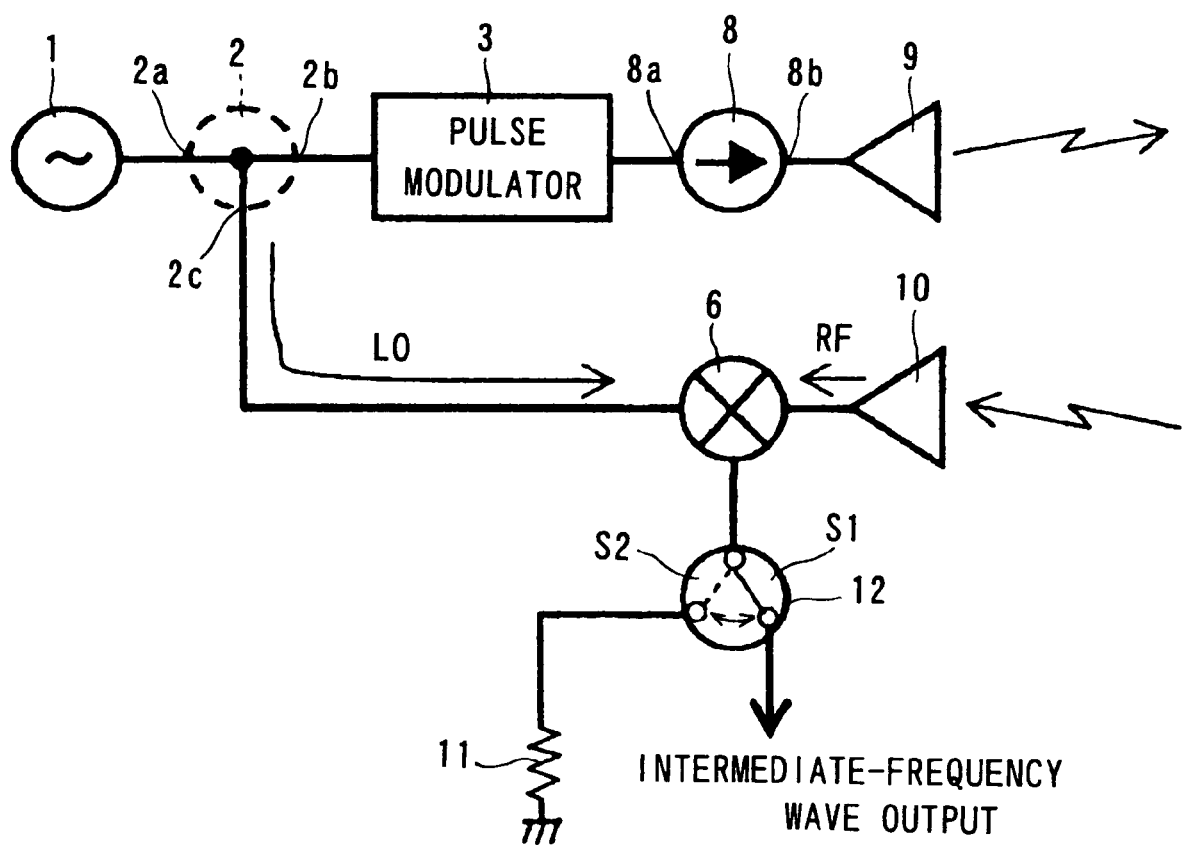
FIG. 4 is a block circuit diagram schematically showing a high-frequency transmitting/receiving apparatus according to a forth embodiment of the invention.

The high-frequency transmitting/receiving apparatus according to the fourth embodiment of the invention, shown in FIG. 4 includes a high-frequency oscillator 1, a branching device 2, a modulator 3, an isolator 8, a transmitting antenna 9, a receiving antenna 10, a mixer 6 and a switch 12. The high-frequency oscillator 1 generates a high-frequency signal. The branching device 2 is connected to the high-frequency oscillator 1, and branches the high-frequency signal into high-frequency branch signals so that the high-frequency branch signals may be outputted to one output end 2b and another output end 2c thereof, respectively. The modulator 3 is connected to the one output end 2b of the branching device 2, and modulates a part of the high-frequency signal, i.e., the high-frequency branch signal branched to the one output end 2b, so as to output it as a high-frequency signal for transmission. The isolator 8 has its one end 8a connected to the output end of the modulator 3, and passes the high-frequency signal for transmission from one end 8a to the other end 8b thereof. The transmitting antenna 9 is connected to the isolator 8, and transmits the high-frequency signal for transmission. The receiving antenna 10 is connected to the other output end 2c of the branching device 2. The mixer 6 is connected between the other output end 2c of the branching device 2 and the receiving antenna 10. The mixer 6 mixes the high-frequency branch signal outputted to the other output end 2c and a high-frequency signal received by the receiving antenna 10 so as to generate an intermediate-frequency signal. The switch 12 is connected to the output end of the mixer 6, and switches back and forth between a first system S1 which outputs the intermediate-frequency signal to the downstream side and a second system S2 to which a termination circuit 11 for terminating the intermediate-frequency signal is connected.

In the constructions described just above, the switch 12 serves the following purpose. By actuating the second system S2, the output end of the mixer 6 is connected to the termination circuit 11 at the time when outputting of the intermediate-frequency signal to the downstream side comes to rest. As the switch 12, a CMOS semiconductor switch having a so-called SPDT function, or a two-mode selector switch analogous to the switching device 7 may be employed. In this case, in contrast to the case where the intermediate-frequency signal is interrupted by turning the switch 12 into an opened state, the switch 12 is terminated by the termination circuit 11 connected to the second system S2. Thus, when the switch 12 is viewed as from the output end of the mixer 6, the input impedance is reduced, thus suppressing reflection of the intermediate-frequency signal from the switch 12 to the mixer 6.

According to the high-frequency transmitting/receiving apparatuses according to the third and fourth embodiments of the invention shown in FIGS. 3 and 4, respectively, at the time when the intermediate-frequency signal is interrupted by the switch 12, it is possible to suppress reflection of the intermediate-frequency signal from the switch 12 to the mixer 6. As a result, of the intermediate-frequency signals generated in the mixer 6, the one which is outputted to the downstream side to be received can be detected in good condition, with its waveform kept invariant. The transmission/reception performance will accordingly be enhanced.

Furthermore, the high-frequency transmitting/receiving apparatuses according to the third and fourth embodiments of the invention should preferably be embodied as follows.

It is preferable that impedance matching is achieved between the output end of the mixer 6 and the termination circuit 11. For example, such a circuit as shown herein is generally designed as a 50-Ω system circuit. In view of this, as shown in FIGS. 3 and 4, the termination circuit 11 is preferably so designed that a resistance of 50 Ω is connected in series with ground. Thereby, while the switch 12 is placed in the second system S2 mode, reflection of the intermediate-frequency signal toward the mixer 6 can be reduced to a minimum. As a result, of the intermediate-frequency signals generated in the mixer 6, the one which is outputted to the downstream side to be received can be detected in best condition, with its waveform changed little. The transmission/reception performance will accordingly be enhanced remarkably.

It is also preferable that a resistance is connected between the output end of the mixer 6 and the first system S1, and in parallel with the switch 12. Through the resistance, the DC level at the first system S1 can be stabilized, and thus, of the intermediate-frequency signals generated in the mixer 6, the one which is outputted to the downstream side to be received can be stabilized in signal level. Therefore, a detection error can be reduced. The transmission/reception performance will accordingly be enhanced remarkably.

Next, a detailed description will be given below as to the high-frequency transmitting/receiving apparatuses according to fifth and sixth embodiments of the invention, assuming that they are each applied to a millimeter-wave radar.

In the millimeter-wave radar to which the high-frequency transmitting/receiving apparatus according to the fifth embodiment of the invention is applied, the configuration of its millimeter-wave signal transmitting section is analogous to that as shown in the plan view of FIG. 16. On the other hand, in the millimeter-wave radar to which the high-frequency transmitting/receiving apparatus according to the sixth embodiment of the invention is applied, the configuration of its millimeter-wave signal transmitting section is analogous to that as shown in the plan view of FIG. 17. Moreover, an NRD guide employed as a dielectric line in these constructions has a basic structure similar to that as shown in the partly cutaway perspective view of FIG. 18.

FIGS. 5A and 5B are block circuit diagrams associated with a case where the high-frequency transmitting/receiving apparatuses according to the fifth and sixth embodiments of the invention are each applied to a millimeter-wave radar, showing the configuration of the millimeter-wave signal transmitting section and intermediate-frequency signal transmitting section thereof. Hereinafter, the high-frequency transmitting/receiving apparatus according to the fifth embodiment of the invention will be mainly described. Note that, in the following description, the constituent components corresponding to those shown in FIGS. 16 and 17 will be denoted by the same reference designations, and in addition, reference designations as seen in FIGS. 5A and 5B are enclosed within parentheses.

As shown in FIGS. 16 and 5A, the millimeter-wave radar based on the high-frequency transmitting/receiving apparatus according to the fifth embodiment of the invention includes a pair of parallel plate conductors 51, a first dielectric line 53, a millimeter-wave signal oscillator 52 (21), a pulse modulator 22, a second dielectric line 58, a circulator 54 (23), a third dielectric line 55, a fourth dielectric line 57, a mixer 59 (25) and a switching device 26. The pair of parallel plate conductors 51 are disposed at an interval equal to or less than one half of a wavelength of a millimeter-wave signal. The first dielectric line 53 is provided between the parallel plate conductors 51. The millimeter-wave signal oscillator 52 (21) is provided between the parallel plate conductors 51 and attached to the first dielectric line 53. The millimeter-wave signal oscillator 52 (21) converts a high-frequency signal outputted from a high-frequency diode to a frequency-modulated millimeter-wave signal, and allows the millimeter-wave signal to propagate through the first dielectric line 53. The pulse modulator 22 is provided between the parallel plate conductors 51 and disposed at a midway position of the first dielectric line 53. The pulse modulator 22 outputs the millimeter-wave signal from the first dielectric line 53 as a pulsed millimeter-wave signal for transmission. The second dielectric line 58 is provided between the parallel plate conductors 51 and disposed in proximity to the first dielectric line 53 in such a way that one end thereof is electromagnetically coupled with the first dielectric line 53, or coupled at one end thereof with the first dielectric line 53.

The circulator 54 (23) is provided between the parallel plate conductors 51 and formed of a ferrite plate disposed in parallel with the parallel plate conductors 51. The circulator 54 (23) has the first connection portion 54*a*, the second connection portion 54*b*, and the third connection portion 54*c* that are arranged at predetermined intervals about the periphery of the ferrite plate and respectively act as millimeter-wave signal input and output ends, of which the first connection portion 54*a* is connected to the millimeter-wave signal output end of the first dielectric line 53, wherein a millimeter-wave signal inputted from one of the connection portions is outputted from the other connection portion adjoining in a clockwise or counterclockwise direction within the plane of the ferrite plate. The third dielectric line 55 is provided between the parallel plate conductors 51, connected to the second connection portion 54*b* of the circulator 54 (23) and allows the millimeter-wave signal to propagate therethrough. The third dielectric line 55 has the transmitting/receiving antenna 56 (24) at its front end. The fourth dielectric line 57 is provided between the parallel plate conductors 51 and connected to the third connection portion 54*c* of the circulator 54 (23). The fourth dielectric line 57 allows a reception wave, which has been received by the transmitting/receiving antenna 56 (24), propagated through the third dielectric line 55 as well as the second connection portion 54*b*, and outputted from the third connection portion 54*c*, to propagate threrethrough.

The mixer 59 (25) is provided between the parallel plate conductors 51 and constructed by proximately placing or coupling a mid-portion of the second dielectric line 58 and a mid-portion of the fourth dielectric line 57 so as to achieve electromagnetic coupling therebetween. The mixer 59 (25) mixes a part of the millimeter-wave signal for transmission propagated from the second dielectric line 58 and the reception wave propagated from the fourth dielectric line 57 to generate an intermediate-frequency signal. The switching device 26 is disposed at the output end of the mixer 59 (25). The switching device 26 interrupts the intermediate-frequency signal in an opened (OFF) state, and, when the millimeter-wave signal for transmission outputted from the pulse modulator 22 is stabilized, changes from the opened state to a closed (ON) state to allow passage of the intermediate-frequency signal.

Note that, in this example, connected to the switching device 26 for interrupting and passing alternately the intermediate-frequency signal produced at the output end of the mixer 59 (25) is a timing generating section 29 for controlling switching timing of the switching device 26. Besides, disposed downstream of the switching device 26 is an amplifier 28 for amplifying the intermediate-frequency signal outputted through the switching device 26.

Moreover, reference numeral 27 represents a capacitor for achieving alternating-current coupling between the switching device 26 and the amplifier 28.

The switching device 26 is turned into a closed (ON) state after the pulsed millimeter-wave signal for transmission outputted from the pulse modulator 22 rises and the condition is stabilized. That is, switching of the switching device 26 has to be controlled in accordance with the stability of the millimeter-wave signal for transmission. Control of the switching of the switching device 26 may be exercised by monitoring the condition of the millimeter-wave signal for transmission. For example, in a case where a modulation signal from the pulse modulator 22 is utilized, the switching device 26 is turned into a closed (ON) state after the modulation current is stabilized.

For example, the millimeter-wave signal oscillator 52 (21) is a VCO (voltage-controlled oscillator) equipped with a Gunn diode and a varactor diode. The millimeter-wave signal oscillator 52 (21) is activated by inputting a signal to its IN-2 terminal for inputting a modulation signal. A signal outputted from the VCO built as the millimeter-wave signal oscillator 52 (21) and a pulsed signal inputted to the IN-1 terminal are inputted to the pulse modulator 22, thereby achieving pulse modulation. Eventually, a pulsed millimeter-wave signal for transmission is produced.

Figure 20:
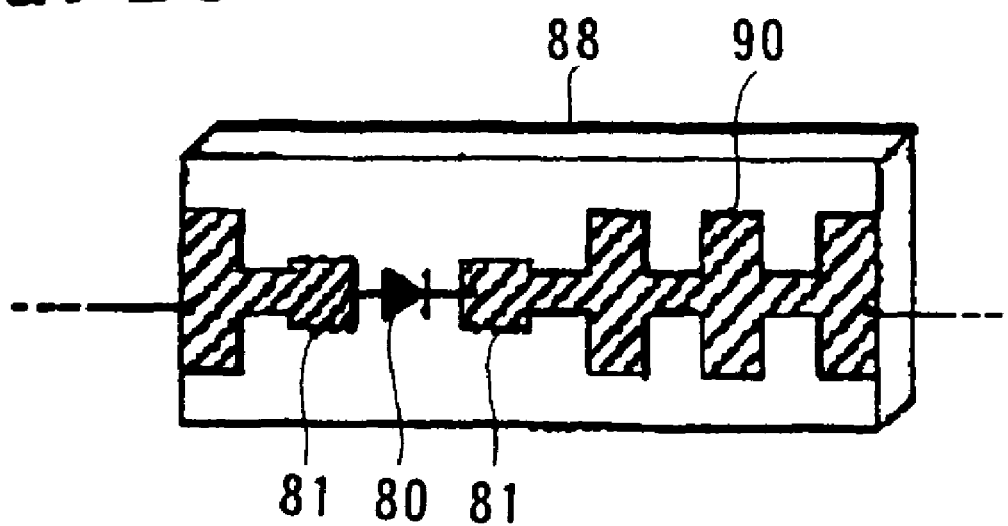
FIG. 20 is a perspective view showing the structure of the pulse modulator employed in the high-frequency transmitting/receiving apparatus.

In FIG. 16, the pulse modulator 22 is illustrated as interposed at a midway position of the first dielectric line 53. For example, the pulse modulator 22 is built as an RF switch having basically the same structure as that shown in FIG. 20. The pulse modulator 22 is constructed as follows. A choke-type bias supply line 90 is formed on one main surface of a substrate 88. In the midway thereof are formed connection electrodes 81. Then, a beam-lead or flip-chip type PIN diode or a Schottky-barrier diode 80 is mounted by soldering midway between the connection electrodes 81. The Schottky-barrier diode 80 is placed midway between the end faces of the first dielectric line 53 in such a way that the bias voltage applying direction coincides with a direction transversely of the line direction.

Reference numeral 54 (23) represents a circulator for transmitting a millimeter-wave signal toward the antenna 56 (24) during transmission, while transmitting a reception wave toward the mixer 59 (25) during reception. Reference numeral 56 (24) represents a millimeter-wave signal transmitting/receiving antenna. The transmitting/receiving antenna 56 (24) is connected to the circulator 54 (23) via a metal waveguide or a dielectric waveguide composed of a dielectric-filled metal waveguide, that is, built as a horn antenna, for example. The mixer 59 (25) acts to produce an intermediate-frequency signal required to detect the distance to a target object, etc., by mixing a millimeter-wave signal outputted from the VCO built as the millimeter-wave signal oscillator 21 and a reception signal received at the transmitting/receiving antenna 56 (24).

In the millimeter-wave radar employing the high-frequency transmitting/receiving apparatus according to the fifth embodiment of the invention, the transmitting/receiving antenna 56 (24) serves as an antenna. On the other hand, in the millimeter-wave radar employing the high-frequency transmitting/receiving apparatus according to the sixth embodiment of the invention, as shown in FIGS. 17 and 5B, two separate antennas are provided: the transmitting antenna 66(24a) and the receiving antenna 70(24b). Correspondingly, the fourth and fifth dielectric lines 69 and 67 are added. The fourth dielectric line 69 is connected to both the receiving antenna 70(24b) and the mixer 71(25). The fifth dielectric line 67 is connected to the third connection portion 64c of the circulator 64(23), for allowing a millimeter-wave signal which has been intrusively received at the transmitting antenna 66(24a) to propagate therethrough. At the front end thereof is disposed a reflectionless terminator 67a for attenuating the received millimeter-wave signal. Moreover, the mixer 71(25) is constructed by proximately placing or coupling a mid-portion of the second dielectric line 68 and a mid-portion of the fourth dielectric line 69 so as to achieve electromagnetic coupling therebetween. In the millimeter-wave radar employing the high-frequency transmitting/receiving apparatus according to the sixth embodiment of the invention, the working and effect of the switching device 26 described hereinbelow is basically the same as achieved in the millimeter-wave radar employing the high-frequency transmitting/receiving apparatus according to the fifth embodiment of the invention.

That is, the high-frequency transmitting/receiving apparatus according to the sixth embodiment of the invention includes a pair of parallel plate conductors 61, a first dielectric line 63, a millimeter-wave signal oscillator 62 (21), a pulse modulator 22, a second dielectric line 68, a circulator 64 (23), a third dielectric line 65, a fourth dielectric line 69, a fifth dielectric line 67, a mixer 71 (25) and a switching device 26. The pair of parallel plate conductors 61 are disposed at an interval equal to or less than one half of a wavelength of a millimeter-wave signal. The first dielectric line 63 is provided between the parallel plate conductors 61. The millimeter-wave signal oscillator 62 (21) is provided between the parallel plate conductors 61 and attached to the first dielectric line 63. The millimeter-wave signal oscillator 62 (21) converts a high-frequency signal outputted from a high-frequency diode to a frequency-modulated millimeter-wave signal, and allows the millimeter-wave signal to propagate through the first dielectric line 63. The pulse modulator 22 is provided between the parallel plate conductors 61 and disposed at a midway position of the first dielectric line 63. The pulse modulator 22 outputs the millimeter-wave signal from the first dielectric line 63 as a pulsed millimeter-wave signal for transmission. The second dielectric line 68 is provided between the parallel plate conductors 61 and disposed in proximity to the first dielectric line 63 in such a way that one end thereof is electromagnetically coupled with the first dielectric line 63, or coupled at one end thereof with the first dielectric line 63.

The circulator 64 (23) is provided between the parallel plate conductors 61 and formed of a ferrite plate disposed in parallel with the parallel plate conductors 61. The circulator 64 (23) has the first connection portion 64a, the second connection portion 64b, and the third connection portion 64c that are arranged at predetermined intervals about the periphery of the ferrite plate and respectively act as millimeter-wave signal input and output ends, of which the first connection portion 64a is connected to the millimeter-wave signal output end of the first dielectric line 63, wherein a millimeter-wave signal inputted from one of the connection portions is outputted from the other connection portion adjoining in a clockwise or counterclockwise direction within the plane of the ferrite plate. The third dielectric line 65 is provided between the parallel plate conductors 61, connected to the second connection portion 64b of the circulator 64 (23) and allows the millimeter-wave signal to propagate therethrough. The third dielectric line 65 has the transmitting/receiving antenna 66 (24a) at its front end. The fourth dielectric line 69 is provided between the parallel plate conductors 61 and the receiving antenna 70 (24b) is disposed at the front end thereof. The fifth dielectric line 67 is provided between the parallel plate conductors 61 and connected to the third connection portion 64c of the circulator 64 (23). The fifth dielectric line 67 allows a millimeter-wave signal which has been intrusively received at the transmitting antenna 66(24a), to propagate therethrough. The fifth dielectric line 67 has the reflectionless terminator 67a disposed at the front end thereof, for attenuating the received millimeter-wave signal.

The mixer 71 (25) is provided between the parallel plate conductors 61, disposed at another end of the fourth dielectric line 69 and constructed by proximately placing or coupling a mid-portion of the second dielectric line 68 and a mid-portion of the fourth dielectric line 69 so as to achieve electromagnetic coupling therebetween. The mixer 71 (25) mixes a part of the millimeter-wave signal for transmission propagated from the second dielectric line 68 and the reception wave propagated from the fourth dielectric line 69 to generate an intermediate-frequency signal. The switching device 26 is disposed at the output end of the mixer 71 (25). The switching device 26 interrupts the intermediate-frequency signal in an opened (OFF) state, and, when the millimeter-wave signal for transmission outputted from the pulse modulator 22 is stabilized, changes from the opened state to a closed (ON) state to allow passage of the intermediate-frequency signal.

Reference numeral 26 represents a switching device (IF switch) disposed at the output end of the mixer 59, 71(25), for interrupting the intermediate-frequency signal outputted from the mixer 59 (25) in an opened (OFF) state, while passing it in a closed (ON) state. Reference numeral 29 represents a timing generating section for generating a timing signal whereby to control switching timing of the switching device 26 (ON-OFF timing).

Reference numeral 28 represents an amplifier connected downstream of the switching device 26, for amplifying the intermediate-frequency signal outputted from the high-frequency transmitting/receiving apparatus. The amplifier 28 has a control terminal (IN-4 terminal) through which a control signal is inputted externally. In response to the inputted signal, the gain and operation of the amplifier 28 is controlled timewise. For example, the time period over which the amplifier 28 is controlled is determined in accordance with the digital form of the pulse signal inputted to the IN-3 terminal. Under the control of the amplifier 28, the inputted intermediate-frequency signal is periodically amplified with desired timing over a certain period of time.

The timing generating section 29 controls the switching timing as follows. When a pulsed signal at the IN-1 and a pulse signal at the IN-3 terminal are inputted in synchronization with the control signals from the pulse modulator 22 and the amplifier 28, a millimeter-wave signal for transmission that has been pulse-modulated by the pulse modulator 22 may be reflected from the connection between the NRD guide and the dielectric waveguide, or may leak from the circulator 23, with the result that the millimeter-wave signal is outputted as an unwanted signal through the mixer 25. Then, before the unwanted signal is directed to the amplifier 28, the timing generating section 29 operates to drive the switching device 26 to interrupt the unwanted signal.

One example of the timing control will be described below with reference to a diagram shown in FIG. 6. FIG. 6 is a diagram schematically showing voltage waveforms of a pulsed signal at the IN-1 terminal, a pulse signal at the IN-3 terminal, a switching signal at the switching device (IF switch) 26, and an output from the mixer 59 (25); the current waveform of the pulse modulator (RF switch) 22; and relative timing among the aforementioned signals. Note that part of the waveform of the mixer 59 (25)'s output indicated by the dash-and-dot line represents a certain output produced during the time period over which the IF switch (switching device) 26 is interrupting the mixer 59 (25)'s output. This portion is regarded as an unnecessary intermediate-frequency signal output in the high-frequency transmitting/receiving apparatus.

It should be noted here that the overall switching timing is determined with reference to the operation of the RF switch (pulse modulator) 22. The RF switch (pulse modulator) 22 changes between an output mode and a non-output mode repeatedly on the basis of the pulsed signal at the IN-1 terminal, and simultaneously pulsed millimeter-wave signals for transmission are outputted. In response to the pulsed signal from the IN-1 terminal, a reverse bias is applied to the Schottky-barrier diode of the RF switch (pulse modulator) 22, and thereby the Schottky-barrier diode reflects the millimeter-wave signal generated by the VCO built as the millimeter-wave signal oscillator 52 (21). The millimeter-wave signal reflected therefrom passes through the circulator 54 (23) and is then sent out from the transmitting/receiving antenna 56 (24). At this time, a part of the millimeter-wave signal is reflected between the transmitting/receiving antenna 56 (24) and the circulator 54 (23), and is then inputted to the mixer 59 (25). Moreover, the part of the millimeter-wave signal that has entered the circulator 54 (23) is directly inputted to the mixer 59 (25). Such a series of operations is carried out within a time period as short as 1 nanosecond. The millimeter-wave signal component that thus has entered the mixer 59 (25) is an unwanted signal. The unwanted signal hinders close-range radar detection and causes saturation in the amplifier 28, and further hinders a wider-range radar detection other than the close-range radar detection. To avoid this, the switching device (IF switch) 26 is turned into an opened (OFF) state to prevent the intermediate-frequency signal resulting from the unwanted millimeter-wave signal from being outputted to the downstream side. The OFF timing is determined on the basis of the pulsed signal at the IN-1 terminal and the pulse signal at the IN-3 terminal.

Next, the switching timing of the switching device (IF switch) 26 will be explained. In this example, the switching device (IF switch) 26 is turned into an opened (OFF) state after the pulse signal from the IN-3 terminal becomes an OFF-state signal and the control over the amplifier 28 is brought into an OFF state. That is, the switching device 26 is turned into an OFF state upon completion of radar detection (farthermost detection). In this way, the switching device (IF switch) 26 can be turned into an opened (OFF) state before the pulse modulator (RF switch) 22 outputs the following millimeter-wave signal for transmission.

Subsequently, after a lapse of d seconds since the pulsed signal from the IN-1 terminal has become an OFF-state signal, specifically, within 1 to 5 nanoseconds, the switching device (IF switch) 26 is turned into a closed (ON) state to start close-range detection. The time period d should preferably be determined in conformity with a time period during which transient variations in the mixer 59 (25)'s output ascribable to the transient characteristics of the pulse modulator (RF switch) 22 are reduced to the extent where they do not create any problem even though the output is amplified by the downstream-side amplifier 28. The time period d thus determined is adequate for the timing for turning the switching device (IF switch) 26 into a closed (ON) state. Moreover, the timing with which the pulse signal from the IN-3 terminal becomes an OFF-state signal is coincident with the timing with which radar detection is completed. This timing is adequate for the timing for turning the switching device (IF switch) 26 into an opened (OFF) state. Hence, when the millimeter-wave signal for transmission from the pulse modulator (RF switch) 22 is in a non-output state and the condition is stabilized, the switching device (IF switch) 26 changes from an opened state to a closed (ON) state to allow passage of the desired intermediate-frequency signal outputted from the output end of the mixer 59 (25).

By adjusting the switching timing of the switching device (IF switch) 26 in that way, it is possible to achieve switching of the switching device (IF switch) 26 with adequate timing and with high accuracy. As a result, the millimeter-wave radar employing the high-frequency transmitting/receiving apparatus of the invention will succeed in providing enhanced radar detection performance.

It is to be understood that the application of the invention is not limited to the specific embodiments described heretofore, and that many modifications and variations of the invention are possible within the scope of the invention. For example, a smoothing circuit such as a limiter may additionally be disposed between the mixer 25 and the switching device 26. In this case, since the intermediate-frequency signal can swiftly be settled into a steady state, it follows that the time period over which the switching device 26 is kept in an opened (OFF) state can be reduced to a minimum.

Next, a detailed description will be given below as to the high-frequency transmitting/receiving apparatuses according to the seventh and eighth embodiments of the invention, assuming that they are each applied to a millimeter-wave radar.

In the millimeter-wave radar to which the high-frequency transmitting/receiving apparatus according to the seventh embodiment of the invention is applied, the configuration of its millimeter-wave signal transmitting section is analogous to that as shown in the plan view of FIG. 16. On the other hand, in the millimeter-wave radar to which the eighth high-frequency transmitting/receiving apparatus according to the eighth embodiment of the invention is applied, the configuration of its millimeter-wave signal transmitting section is analogous to that as shown in the plan view of FIG. 17. Moreover, an NRD guide employed as a dielectric line in these constructions has a basic structure similar to that as shown in the partly cutaway perspective view of FIG. 18.

FIGS. 7A and 7B are block circuit diagrams of one exmaple associated with a case where the high-frequency transmitting/receiving apparatuses according to the seventh and eighth embodiments of the invention are each applied to a millimeter-wave radar, showing the configuration of the millimeter-wave signal transmitting section and intermediate-frequency signal transmitting section thereof. Hereinafter, one example of the high-frequency transmitting/receiving apparatus according to the seventh embodiment of the invention will be mainly described. Note that, in the following description, the constituent components corresponding to those shown in FIGS. 16 and 17 will be denoted by the same reference designations, and in addition, reference designations as seen in FIGS. 7A and 7B are enclosed within parentheses.

As shown in FIGS. 16 and 7A, the millimeter-wave radar based on the high-frequency transmitting/receiving apparatus according to the seventh embodiment of the invention includes a pair of parallel plate conductors 51, a first dielectric line 53, the millimeter-wave signal oscillator 52 (21), the pulse modulator 22, the second dielectric line 58, a circulator 54 (23), a third dielectric line 55, a fourth dielectric line 57, mixer 59 (25) and switching device 26a. The pair of parallel plate conductors 51 are disposed at an interval equal to or less than one half of a wavelength of a millimeter-wave signal. The first dielectric line 53 is provided between the parallel plate conductors 51. The millimeter-wave signal oscillator 52 (21) is provided between the parallel plate conductors 51 and attached to the first dielectric line 53. The millimeter-wave signal oscillator 52 converts a high-frequency signal outputted from a high-frequency diode to a frequency-modulated millimeter-wave signal, and allows the millimeter-wave signal to propagate through the first dielectric line 53. The pulse modulator 22 is provided between the parallel plate conductors 51 and disposed at a midway position of the first dielectric line 53. The pulse modulator 22 outputs the millimeter-wave signal from the first dielectric line 53 as a pulsed millimeter-wave signal for transmission. The second dielectric line 58 is provided between the parallel plate conductors 51 and disposed in proximity to the first dielectric line 53 in such a way that one end thereof is electromagnetically coupled with the first dielectric line 53, or coupled at one end thereof with the first dielectric line 53.

The circulator 54 (23) is provided between the parallel plate conductors 51 and formed of a ferrite plate disposed in parallel with the parallel plate conductors 51. The circulator 54 (23) has the first connection portion 54a, the second connection portion 54b, and the third connection portion 54c that are arranged at predetermined intervals about the periphery of the ferrite plate and respectively act as millimeter-wave signal input and output ends, of which the first connection portion 54a is connected to the millimeter-wave signal output end of the first dielectric line 53, wherein a millimeter-wave signal inputted from one of the connection portions is outputted from the other connection portion adjoining in a clockwise or counterclockwise direction within the plane of the ferrite plate. The third dielectric line 55 is provided between the parallel plate conductors 51, connected to the second connection portion 54b of the circulator 54 (23) and allows the millimeter-wave signal to propagate therethrough. The third dielectric line 55 has the transmitting/receiving antenna 56 (24) at its front end. The fourth dielectric line 57 is provided between the parallel plate conductors 51 and connected to the third connection portion 54c of the circulator 54 (23). The fourth dielectric line 57 allows a reception wave, which has been received by the transmitting/receiving antenna 56 (24), propagated through the third dielectric line 55 as well as the second connection portion 54b, and outputted from the third connection portion 54c, to propagate threrethrough.

The mixer 59 (25) is provided between the parallel plate conductors 51 and constructed by proximately placing or coupling a mid-portion of the second dielectric line 58 and a mid-portion of the fourth dielectric line 57 so as to achieve electromagnetic coupling therebetween. The mixer 59 (25) mixes a part of the millimeter-wave signal for transmission propagated from the second dielectric line 58 and the reception wave propagated from the fourth dielectric line 57 to generate an intermediate-frequency signal. The switching device 26a is disposed at the output end of the mixer 59 (25). The switching device 26a interrupts the intermediate-frequency signal in an opened (OFF) state, and, when the millimeter-wave signal for transmission outputted from the pulse modulator 22 is stabilized, changes from the opened state to a closed (ON) state to allow passage of the intermediate-frequency signal.

Note that, in this example, connected to the switching device 26a for interrupting and passing the intermediate-frequency signal produced at the output end of the mixer 59 (25) is a timing generating section 29a for controlling switching timing of the switching device 26a. Besides, disposed downstream of the switching device 26a is an amplifier 28a for amplifying the intermediate-frequency signal outputted through the switching device 26a.

Moreover, reference numeral 27a represents a capacitor for achieving alternating-current coupling between the switching device 26a and the amplifier 28a.

The switching device 26a is turned into a closed (ON) state after the pulsed millimeter-wave signal for transmission outputted from the pulse modulator 22 rises and the condition is stabilized. That is, switching of the switching device 26a has to be controlled in accordance with the stability of the millimeter-wave signal for transmission. Control of the switching of the switching device 26 may be exercised by monitoring the condition of the millimeter-wave signal for transmission. For example, in a case where a modulation signal from the pulse modulator 22 is utilized, the switching device 26a is turned into a closed (ON) state after the modulation current is stabilized.

On the downstream side of the switching device 26a is disposed a filter 30 for removing such noise as may find its way into the intermediate-frequency signal in accompaniment with switching of the switching device 26a. The filter 30 acts to block such noise and to pass the intermediate-frequency signal. Such noise as may find its way into the intermediate-frequency signal is higher in frequency than the intermediate-frequency signal. In view of this, for example, the filter 30 is preferably composed of an RC low-pass filter as shown in FIG. 7. Instead, a band-pass filter for selectively passing signals lying in an intermediate-frequency signal frequency band, or a band-elimination filter for selectively blocking noise may be employed.

In the millimeter-wave radar employing the high-frequency transmitting/receiving apparatus according to the seventh embodiment of the invention, the transmitting/receiving antenna 56 (24) serves as an antenna. On the other hand, in the millimeter-wave radar employing the high-frequency transmitting/receiving apparatus according to the eighth embodiment of the invention, as shown in FIGS. 17 and 17B, two separate antennas are provided: the transmitting antenna 66 (24a) and the receiving antenna 70 (24b). Correspondingly, the fourth and fifth dielectric lines 69 and 67 are added. The fourth dielectric line 69 is connected to both the receiving antenna 70 (24b) and the mixer 71 (25). The fifth dielectric line 67 is connected to the third connection portion 64c of the circulator 64 (23), for allowing a millimeter-wave signal which has been intrusively received at the transmitting antenna 66 (24a) to propagate. At the front end thereof is disposed the reflectionless terminator 67a for attenuating the received millimeter-wave signal. Moreover, the mixer 71 (25) is constructed by proximately placing or coupling a mid-portion of the second dielectric line 68 and a mid-portion of the fourth dielectric line 69 so as to achieve electromagnetic coupling therebetween. In the millimeter-wave radar employing the high-frequency transmitting/receiving apparatus according to the eighth embodiment of the invention, the working of the switching device 26a, the structure of the filter 30, and the effect that they bring about, which will be described hereinbelow, are basically the same as achieved in the above-described millimeter-wave radar employing the high-frequency transmitting/receiving apparatus according to the seventh embodiment of the invention.

The high-frequency transmitting/receiving apparatus according to the eighth embodiment of the invention includes a pair of parallel plate conductors 61, a first dielectric line 63, a millimeter-wave signal oscillator 62 (21), a pulse modulator 22, a second dielectric line 68, a circulator 64 (23), a third dielectric line 65, a fourth dielectric line 69, a fifth dielectric line 67, a mixer 71 (25), a switching device 26a and filter 30. The pair of parallel plate conductors 61 are disposed at an interval equal to or less than one half of a wavelength of a millimeter-wave signal. The first dielectric line 63 is provided between the parallel plate conductors 61. The millimeter-wave signal oscillator 62 (21) is provided between the parallel plate conductors 61 and attached to the first dielectric line 63. The millimeter-wave signal oscillator 62 (21) converts a high-frequency signal outputted from a high-frequency diode to a frequency-modulated millimeter-wave signal, and allows the millimeter-wave signal to propagate through the first dielectric line 63. The pulse modulator 22 is provided between the parallel plate conductors 61 and disposed at a midway position of the first dielectric line 63. The pulse modulator 22 outputs the millimeter-wave signal from the first dielectric line 63 as a pulsed millimeter-wave signal for transmission. The second dielectric line 68 is provided between the parallel plate conductors 61 and disposed in proximity to the first dielectric line 63 in such a way that one end thereof is electromagnetically coupled with the first dielectric line 63, or coupled at one end thereof with the first dielectric line 63.

The circulator 64 (23) is provided between the parallel plate conductors 61 and formed of a ferrite plate disposed in parallel with the parallel plate conductors 61. The circulator 64 (23) has the first connection portion 64a, the second connection portion 64b, and the third connection portion 64c that are arranged at predetermined intervals about the periphery of the ferrite plate and respectively act as millimeter-wave signal input and output ends, of which the first connection portion 64a is connected to the millimeter-wave signal output end of the first dielectric line 63, wherein a millimeter-wave signal inputted from one of the connection portions is outputted from the other connection portion adjoining in a clockwise or counterclockwise direction within the plane of the ferrite plate. The third dielectric line 65 is provided between the parallel plate conductors 61, connected to the second connection portion 64b of the circulator 64 (23), and allows the millimeter-wave signal to propagate therethrough. The third dielectric line 65 has the transmitting/receiving antenna 66 (24a) at its front end. The fourth dielectric line 69 is provided between the parallel plate conductors 61 and the receiving antenna 70 (24b) is disposed at the front end thereof. The fifth dielectric line 67 is provided between the parallel plate conductors 61 and connected to the third connection portion 64c of the circulator 64 (23). The fifth dielectric line 67 allows a millimeter-wave signal which has been intrusively received at the transmitting antenna 66 (24a), to propagate therethrough. The fifth dielectric line 67 has the reflectionless terminator 67a disposed at the front end thereof, for attenuating the received millimeter-wave signal.

The mixer 71 (25) is provided between the parallel plate conductors 61, disposed at another end of the fourth dielectric line 69 and constructed by proximately placing or coupling a mid-portion of the second dielectric line 68 and a mid-portion of the fourth dielectric line 69 so as to achieve electromagnetic coupling therebetween. The mixer 71 (25) mixes a part of the millimeter-wave signal for transmission propagated from the second dielectric line 68 and the reception wave propagated from the fourth dielectric line 69 to generate an intermediate-frequency signal. The switching device 26a is disposed at the output end of the mixer 71 (25) and switches the intermediate-frequency signal. The filter 30 is disposed downstream of the switching device 26a, and blocks the noise as may find its way into the intermediate-frequency signal in accompaniment with switching of the switching device 26, while allowing passage of the intermediate-frequency signal.

Reference numeral 26a represents a switching device (IF switch) disposed at the output end of the mixer 59, 71 (25), for interrupting the intermediate-frequency signal outputted from the mixer 59, 71 (25) in an opened (OFF) state, while passing it in a closed (ON) state. If a millimeter-wave signal for transmission that has been pulse-modulated by the pulse modulator 22 is reflected from the connection between the NRD guide and the dielectric waveguide, or leaks from the circulator 54, 64 (23), the millimeter-wave signal is outputted as an unwanted signal through the mixer 59, 71 (25), so that an unnecessary intermediate-frequency signal is produced. The switching device (IF switch) 26a acts to interrupt the resultant unnecessary intermediate-frequency signal before it is outputted from the high-frequency transmitting/receiving apparatus.

Reference numeral 28*a* represents an amplifier connected downstream of the switching device 26*a*, for amplifying the intermediate-frequency signal outputted from the high-frequency transmitting/receiving apparatus. Under normal conditions, the gain and operation of the amplifier 28*a* is controlled timewise. Under the control of the amplifier 28*a*, the inputted intermediate-frequency signal is periodically amplified with desired timing over a certain period of time.

Reference numeral 29*a* represents a timing generating section for generating a timing signal whereby to control switching timing of the switching device 26*a* (ON-OFF timing). For example, the timing generating section 29*a* receives input of a pulsed branch signal inputted from the IN-1 terminal to the pulse modulator 22. In accordance with the signal level, the timing generating section 29*a* generates a timing signal with which the switching of the switching device 26*a* can be controlled with desired timing. For example, the switching timing is controlled as follows. If a millimeter-wave signal for transmission that has been pulse-modulated by the pulse modulator 22 is reflected from the connection between the NRD guide and the dielectric waveguide, or leaks from the circulator 23, the millimeter-wave signal is outputted as an unwanted signal through the mixer 25. Then, before the unwanted signal is directed to the amplifier 28*a*, the timing generating section 29*a* operates to drive the switching device 26*a* to interrupt the unwanted signal.

Reference numeral 30 represents a filter for blocking such noise as may find its way into the intermediate-frequency signal in accompaniment with switching of the switching device 26*a*, while allowing passage of the intermediate-frequency signal. In general, such noise gets in as a harmonic component which is higher in frequency than the intermediate-frequency signal. In view of this, the filter 30 is preferably composed of an RC low-pass filter or an LC low-pass filter. Such filters are each constituted by a capacitor C and a resistance R or an inductance L, for allowing passage of intermediate-frequency signals lying in a lower frequency band, while blocking intrusion of noise lying in a higher frequency band.

In the filter 30, its cutoff frequency is preferably set as high as possible within the bounds of not interfering with identification of an intermediate-frequency signal to be outputted from the high-frequency transmitting/receiving apparatus, for example, set at a 3 dB cutoff frequency. The 3 dB cutoff frequency can be adjusted by setting the circuit constant constituting the filter 30 at an appropriate value. By the filter such as a low-pass filter or a band-pass filter, it is possible to remove unwanted signals lying in a band of frequencies higher than the 3 dB cutoff frequency, that is, such noise as may find its way into the intermediate-frequency signal in accompaniment with switching of the switching device 26*a*.

Regarding removal of such switching noise as may arise in accompaniment with switching of the switching device 26*a*, by adjusting the 3 dB cutoff frequency of the filter 30 in such a way as to secure a bandwidth of up to several tens of MHz that is necessary to reception signals, it is possible to remove the switching noise successfully without fail. This is because most of the energy of the switching noise, in terms of frequency component, lies in a band of frequencies higher than the 3 dB cutoff frequency. The switching noise possesses a sharp, spike-like voltage oscillation. Thus, if it is changed into a signal of greater amplitude through amplification, the resultant signal finds its way into the circuit nearby as an unwanted signal, which may result in occurrence of an unexpected malfunction. Hence, by eliminating adverse effects exerted by such noise, the millimeter-wave radar employing the high-frequency transmitting/receiving apparatus of the invention can be operated with stability.

Incidentally, there exists a to-be-received signal indicating close-range detection roughly concurrently with the switching of the switching device 26*a* into a closed (ON) state. If switching noise appears at this time, identification of the to-be-received signal becomes difficult. In this respect, the use of the high-frequency transmitting/receiving apparatus of the invention in a millimeter-wave radar will end concern over such a problem. Accordingly, the millimeter-wave radar is capable of detecting a target object at close range successfully.

Normally, the filter 30 should preferably be disposed upstream of the amplifier 28*a*. However, it is also possible to dispose the filter 30 downstream of the amplifier 28*a* instead.

In the block circuit diagram of FIGS. 7A and 7B, reference numeral 31 represents an input wiring line for a test signal. Through the input wiring line 31, a test signal is inputted from the IN-3 terminal to the switching device 26*a*, for monitoring troubles such as breaks in the circuits located downstream of the switching device 26*a*. For example, while the switching device 26*a* is kept in a closed (ON) state, a sine wave, a triangular wave, or a pulse, each of which has a frequency lower than the 3 dB cutoff frequency of the filter 30 formed of a low-pass filter or a band-pass filter, is used as a test signal. Such a test signal is allowed to pass through the filter 30. Simply by detecting, in an OUT terminal, the spectral signal intensity of the test signal at the frequency, it is possible to achieve self-monitoring without hindering removal of switching noise associated with the intermediate-frequency signal.

Hereby, in the millimeter-wave radar having the switching device capable of preventing a pulse-modulated millimeter-wave signal for transmission from being outputted to the reception system due to inner reflection or other causes, the influence of switching noise occurring in the switching device can be reduced successfully, and also, a self-monitoring circuit can be realized in a simple manner. The millimeter-wave radar will accordingly succeed in providing excellent radar detection performance and in achieving proper self-monitoring.

Next, FIGS. 8A and 8B are block circuit diagrams of another example associated with a case where the high-frequency transmitting/receiving apparatuses according to the seventh and eighth embodiments of the invention are each applied to a millimeter-wave radar, showing the configuration of the millimeter-wave signal transmitting section and intermediate-frequency signal transmitting section thereof. In FIGS. 8A and 8B, the components that play the same or corresponding roles as in FIGS. 7A and 7B will be identified with the same reference symbols. Moreover, FIG. 9 is a block circuit diagram showing one example associated with a case where a test switching signal is inputted to the switching device constituting the millimeter-wave radar. Hereinafter, another example of the high-frequency transmitting/receiving apparatus according to the seventh embodiment of the invention will be mainly described. Note that, also in the following description, the constituent components corresponding to those shown in FIGS. 16 and 17 will be denoted by the same reference designations, and in addition, reference designations as seen in FIGS. 8A and 8B are enclosed within parentheses.

As described previously, in the millimeter-wave radar employing the high-frequency transmitting/receiving apparatus according to the seventh embodiment of the invention, the transmitting/receiving antenna 56 (24) serves as an antenna. On the other hand, in the millimeter-wave radar employing the high-frequency transmitting/receiving apparatus according to the eighth embodiment of the invention, as shown in FIGS. 17 and 8B, two separate antennas are provided: the transmitting antenna 66 (24*a*) and the receiving antenna 70 (24*b*). Correspondingly, the fourth and fifth dielectric lines 69 and 67 are added. The fourth dielectric line 69 is connected to both the receiving antenna 70 (24*b*) and the mixer 71 (25). The fifth dielectric line 67 is connected to the third connection portion 64*c* of the circulator 64 (23), for allowing a millimeter-wave signal which has been intrusively received at the transmitting antenna 66 (24*a*) to propagate. At the front end thereof is disposed the reflectionless terminator 67*a* for attenuating the received millimeter-wave signal. Moreover, the mixer 71 (25) is constructed by proximately placing or coupling a mid-portion of the second dielectric line 68 and a mid-portion of the fourth dielectric line 69 so as to achieve electromagnetic coupling therebetween. Also in this construction, the working of the switching device 26*a*, the structure of the filter 30, the effect that they bring about, and the configuration and effect concerning inputting of a test switching signal and detection of switching noise, which will be described hereinbelow, are basically the same as achieved in the above-described millimeter-wave radar employing the seventh high-frequency transmitting/receiving apparatus according to the seventh embodiment of the invention.

The example shown in FIGS. 8A and 8B are constructed basically in the same manner as in FIGS. 7A and 7B except that, in the former, the filter 30 is disposed downstream of the amplifier 28*a*; to the signal input terminal for controlling switching of the switching device 26*a* is connected an input wiring line 32 for inputting a test switching signal required to generate switching noise which arises in accompaniment with switching of the switching device 26*a*; and the output wiring line 33 is connected, as a switching noise detection terminal, downstream of the amplifier 28*a* and upstream of the filter 30.

In the examples shown in FIGS. 8A and 8B, from an IN-CHECK terminal connected to the input wiring line 32 to the signal input terminal for controlling switching of the switching device 26*a*, is inputted a test switching signal for monitoring troubles such as breaks in the circuits located downstream of the switching device 26*a*. By inputting a test switching signal from the IN-CHECK terminal to the signal input terminal for controlling switching of the switching device 26*a*, switching noise occurs in accompaniment with switching of the switching device 26*a*. The switching noise is taken out of the output wiring line 33, and is then detected at an OUT-CHECK terminal, thereby performing self-monitoring on the constituent components ranging from the switching device 26*a* to the amplifier 28. In this case, the output wiring line 33, working as a detection terminal connected to the OUT-CHECK terminal, should preferably be disposed downstream of the amplifier 28*a* and upstream of the filter 30. This helps prevent the switching noise, used as a test signal, from being attenuated by the filter 30. Therefore, the switching noise can be detected without fail through the output wiring line 33. Moreover, since any other switching noise than that used as a test signal is attenuated through the filter 30, it never occurs that the switching noise has an adverse effect on the millimeter-wave transmission/reception performance.

Note that the switching noise occurring in the switching device 26*a* is as weak as about 1 μV. Therefore, for example, even if the switching noise is amplified by several tens of dB by the downstream-side amplifier 28*a*, no saturation is caused in the amplifier 28*a*. The switching noise may accordingly be used as it is without being attenuated by an attenuator or the like device.

In order to selectively input a signal from the timing generating section 29*a* or a test switching signal from the IN-CHECK terminal through the input wiring line 32 to the signal input terminal for controlling switching of the switching device 26*a*, such a circuit as shown in the block circuit diagram of FIG. 9 can be used.

In FIG. 9, reference symbol MIXER corresponds to the mixer 25; CMOS SWITCH corresponds to the switching device 26*a*; AMP corresponds to the amplifier 28*a* (although not shown, the capacitor 27*a* is included in part thereof); and TIMING GENERATOR corresponds to the timing generating section 29*a*.

Moreover, reference symbols R1 and R2 each represent a resistance for applying a voltage required to reliably operate a CMOS SWITCH having an extremely high input resistance. By feeding a sufficient current through the resistance, a voltage of necessary level is produced. The resistance values of R1 and R2 are determined in consideration of the upper limit of the operating current of the semiconductor device for generating a test switching signal to be inputted from the IN-CHECK terminal through the input wiring line 32 to the signal input terminal for controlling switching of the switching device 26*a*.

Reference symbol D1 represents a diode for effecting isolation lest a test switching signal from the IN-CHECK terminal should leak toward TIMING GENERATOR. On the other hand, reference symbol D2 represents another diode for effecting isolation lest a signal from TIMING GENERATOR should leak toward the IN-CHECK terminal. With this arrangement, either a signal from the timing generating section 29*a* or a test switching signal from the IN-CHECK terminal can selectively be inputted to the signal input terminal for controlling switching of the switching device 26*a* without causing any interference between the different signals. As a result, during a pause in a millimeter-wave transmission/reception operation, the apparatus employing the high-frequency transmitting/receiving apparatus of the invention is able to perform self-monitoring with use of the switching noise.

Next, FIGS. 10A and 10B is a block circuit diagrams of still another example associated with the case where the high-frequency transmitting/receiving apparatuses according to the seventh and eighth embodiments of the invention are each applied to a millimeter-wave radar, showing the configuration of the millimeter-wave signal transmitting section and intermediate-frequency signal transmitting section thereof. In FIGS. 10A and 10B, the components that play the same or corresponding roles as in FIGS. 8A and 8B will be denoted by the same reference symbols. Hereinafter, still another example of the high-frequency transmitting/receiving apparatus according to the seventh embodiment of the invention will be mainly described. Note that, also in the following description, the constituent components corresponding to those shown in FIG. 16 will be denoted by the same reference designations, and in addition, reference designations as seen in FIGS. 10A and 10B are enclosed within parentheses.

Also in the millimeter-wave radar employing the high-frequency transmitting/receiving apparatus according to the seventh embodiment of the invention, the transmitting/receiving antenna 56 (24) serves as an antenna. On the other hand, in the millimeter-wave radar employing the high-frequency transmitting/receiving apparatus according to the eighth embodiment of the invention, as shown in FIGS. 17 and 10B, two separate antennas are provided: the transmitting antenna 66 (24a) and the receiving antenna 70 (24b). Correspondingly, the fourth and fifth dielectric lines 69 and 67 are added. The fourth dielectric line 69 is connected to both the receiving antenna 70 (24b) and the mixer 71 (25). The fifth dielectric line 67 is connected to the third connection portion 64c of the circulator 64 (23), for allowing a millimeter-wave signal which has been intrusively received at the transmitting antenna 66 (24a) to propagate. At the front end thereof is disposed the reflectionless terminator 67a for attenuating the received millimeter-wave signal. Moreover, the mixer 71 (25) is constructed by proximately placing or coupling a mid-portion of the second dielectric line 68 and a mid-portion of the fourth dielectric line 69 so as to achieve electromagnetic coupling therebetween. Also in this construction, the working of the switching device 26a, the structure of the filter 30, the effect that they bring about, and the configuration and effect concerning inputting of a test switching signal and detection of switching noise, which will be described hereinbelow, are basically the same as achieved in the above-described millimeter-wave radar employing the high-frequency transmitting/receiving apparatus according to the seventh embodiment of the invention.

The examples shown in FIGS. 10A and 10B are constructed basically in the same manner as in FIGS. 8A and 8B except that, in the former, a signal selector switch 34 is disposed between the modulation-signal input section of the pulse modulator 22 and the IN-1 terminal. Besides, as a desirable constituent element, a capacitor 35 is connected between the pulse modulator 22 and the IN-1 terminal, and in parallel with the signal selector switch 34. Further, as another desirable constituent element, an output wiring line 36 for a transmission-circuit test signal is connected to the mixer 25. The output wiring line 36 acts as a detection terminal for detecting a millimeter-wave signal transmitted from the millimeter-wave signal oscillator 21 during transmission-circuit operation tests.

Thus, in the examples shown in FIGS. 10A and 10B, a DC signal inputted as a transmission-circuit test signal from an IN-CHECK 2 terminal and a pulsed pulse modulation signal inputted from the IN-1 terminal can alternately be inputted to the pulse modulator 22 by switching the signal selector switch 34. The DC signal inputted as a transmission-circuit test signal from the IN-CHECK 2 terminal to the pulse modulator 22 is used to monitor troubles such as breaks in the transmission circuits ranging from the millimeter-wave signal oscillator 21, through the pulse modulator 22, to the transmitting/receiving antenna 24.

Upon receipt of a DC signal fed from the IN-CHECK 2 terminal as a transmission-circuit test signal, the pulse modulator 22 allows passage of a millimeter-wave signal generated in the millimeter-wave signal oscillator 21. Then, the millimeter-wave signal emitted from the transmitting/receiving antenna 24 is detected by a detector, thereby performing self-monitoring on the transmission circuits ranging from the millimeter-wave signal oscillator 21 to the transmitting/receiving antenna 24. Note that, instead of detecting the millimeter-wave signal emitted from the transmitting/receiving antenna 24 by the detector, it is also possible to adopt the following method. First of all, in the vicinity of the transmitting/receiving antenna 24 is disposed a reflector or the like for reflecting millimeter-wave signals. Then, the millimeter-wave signal emitted from the transmitting/receiving antenna 24 is made incident on the transmitting/receiving antenna 24 once again, and the millimeter-wave signal is detected by the mixer 25. Subsequently, the detected signal is taken out of the output wiring line 36 for a transmission-circuit test signal connected to the mixer 25, thereby performing self-monitoring on the transmission circuits and part of the reception circuits ranging from the transmitting/receiving antenna 24 to the mixer 25. In this case, not only it is possible to perform an operation test on the high-frequency transmitting/receiving apparatus during manufacturing, but it is also possible to perform an operation test thereon during its use.

Moreover, in this case, it is preferable to provide a reflector moving mechanism over the transmitting/receiving antenna 24 of the high-frequency transmitting/receiving apparatus as seen in the radiation direction. The reflector moving mechanism imparts a shutter-like function to the reflector for reflecting millimeter-wave signals so that the reflector may reflect signals emitted from the transmitting/receiving antenna 24 on an intermittent basis. By operating the moving mechanism and the signal selector switch 34 in synchronization with each other, self-monitoring can be achieved as required during the use of the high-frequency transmitting/receiving apparatus.

A DC signal and a pulse modulation signal are alternately inputted by switching the signal selector switch 34. Here, the DC signal in use should preferably be such that a constant DC voltage is continuously produced while the signal selector switch 34 is placed in a DC-signal output mode. In this case, a voltage-divided DC fed from a DC power source such as a DC line disposed within the circuit of the high-frequency transmitting/receiving apparatus, or a cell, or a battery, may be used in a simple manner. Alternatively, the DC signal in use may be such that a constant DC voltage is intermittently produced, in accordance with a predetermined pattern, while the signal selector switch 34 is placed in a DC-signal output mode. In this case, it is possible to deal with operation tests of high complexity. For example, even in the case of conducting operation tests using millimeter-wave signals for transmission under a plurality of different conditions, each of the operation tests can be conducted without fail by making a pause before and after the test condition is changed.

Moreover, in the example shown in FIGS. 10A and 10B, the capacitor 35 is connected between the pulse modulator 22 and the IN-1 terminal, and in parallel with the signal selector switch 34. This makes it possible to correct a parasitic capacitance existing within the signal selector switch 34 to a virtually zero value and thereby prevent deformation of the waveform of the pulse modulation signal while passing through the signal selector switch 34.

Here, if it is assumed that the value of the parasitic capacitance existing within the signal selector switch 34 is $C_L$, and that a value of a correction capacitance of the capacitor 35 for correcting the parasitic capacitance is $C_0$, then the correction capacitance value $C_0$ of the capacitor 35 for correcting the parasitic capacitance value $C_L$ in the best way is determined by calculation according to the following equation:

$$C_0 = (C_L \cdot R_L)/R_r \qquad (1)$$

wherein $R_r$ represents a resistance value between the input end and the output end of the signal selector switch 34 as observed when the switch 34 for a transmission-circuit test is closed (turned on); and $R_L$ represents a load resistance value as observed when the pulse modulation signal used for activating the pulse modulator 22 is terminated by a load resistance within the pulse modulator 22.

In this way, by connecting the capacitor 35 having a correction capacitance value of $C_0$ in parallel with the signal selector switch 34 having a parasitic capacitance value of $C_L$, the parasitic capacitance viewed as from the input end of the signal selector switch 34 can apparently be cancelled out; wherefore the waveform of the pulse modulation signal which passes through the signal selector switch 34 can be brought into a best, distortion-free condition. Moreover, the pulsed millimeter-wave signal for transmission sent out from the pulse modulator 22 is stabilized in signal level. Therefore, even if the switching device 26a, which serves to avoid that the pulse-modulated millimeter-wave signal for transmission enters the mixer 25 and resultantly leaks into the downstream-side reception system, is turned into a closed (ON) state immediately after the pulsed millimeter-wave signal for transmission is sent out, no unwanted intermediate-frequency signal is outputted. As a result, a reception operation can be performed immediately after the millimeter-wave signal for transmission is sent out. The advantages thus far described will be explained in detail by way of Working example.

It is to be understood that the application of the invention is not limited to the specific embodiments described heretofore, and that many modifications and variations of the invention are possible within the scope of the invention. For example, instead of constituting the filter 30 for removing switching noise by an RC low-pass filter or an LC low-pass filter, it is also possible to use a low-pass filter with an LC distributed constant line, a band-pass filter, or a band-rejection filter. In this case, since the boundary between the passband and the rejection band can be made sharper, it is possible to secure a wide high-frequency passband and thereby extend a range of frequencies of a to-be-received intermediate-frequency signal. Moreover, the resistance (R) component of the filter 30 is decreased, resulting in a loss of the to-be-received intermediate-frequency signal being reduced.

Further, it is also possible to provide a switching device analogous to the switching device 26a between the modulation-signal input section of the pulse modulator 22 and the IN-1 terminal. By detecting the switching device's switching noise at the OUT-CHECK terminal, self-monitoring is achieved in the apparatus. In this case, in addition to the wiring line for connecting the components ranging from the switching device 26a to the amplifier 28a, the one for connecting the modulator 22, the one for connecting the mixer 25, and the one for connecting the modulator 22 and the mixer 25 can also be subjected to self-monitoring.

Next, a detailed description will be given below as to the high-frequency transmitting/receiving apparatuses according to the ninth and tenth embodiments of the invention, assuming that they are each applied to a millimeter-wave radar.

In the millimeter-wave radar to which the high-frequency transmitting/receiving apparatus according to the ninth embodiment of the invention is applied, the configuration of its millimeter-wave signal transmitting section is analogous to that as shown in the plan view of FIG. 16 On the other hand, in the millimeter-wave radar to which the high-frequency transmitting/receiving apparatus according to the tenth embodiment of the invention is applied, the configuration of its millimeter-wave signal transmitting section is analogous to that as shown in the plan view of FIG. 17. Moreover, an NRD guide employed as a dielectric line in these constructions has a basic structure similar to that as shown in the partly cutaway perspective view of FIG. 18.

FIGS. 12A and 12B are block circuit diagrams associated with a case where the high-frequency transmitting/receiving apparatuses according to the ninth and tenth embodiments of the invention are each applied to a millimeter-wave radar, showing the configuration of the millimeter-wave signal transmitting section and intermediate-frequency signal transmitting section thereof. Hereinafter, the high-frequency transmitting/receiving apparatus according to the ninth embodiment of the invention will be mainly described. Note that, in the following description, the constituent components corresponding to those shown in FIGS. 16 and 17 will be denoted by the same reference designations, and in addition, reference designations as seen in FIGS. 12A and 12B are enclosed within parentheses.

As shown in FIGS. 16 and 12A, the millimeter-wave radar based on the high-frequency transmitting/receiving apparatus according to the ninth embodiment of the invention includes a pair of parallel plate conductors 51, the first dielectric line 53, the millimeter-wave signal oscillator 52 (21), the pulse modulator 22, the second dielectric line 58, the circulator 54 (23), the third dielectric line 55, the fourth dielectric line 57, the mixer 59 (25) and the switch 26b. The pair of parallel plate conductors 51 are disposed at an interval equal to or less than one half of a wavelength of a millimeter-wave signal. The first dielectric line 53 is provided between the parallel plate conductors 51. The millimeter-wave signal oscillator 52 (21) is provided between the parallel plate conductors 51 and attached to the first dielectric line 53. The millimeter-wave signal oscillator 52 (21) converts a high-frequency signal outputted from a high-frequency diode to a frequency-modulated millimeter-wave signal, and allows the millimeter-wave signal to propagate through the first dielectric line 53. The pulse modulator 22 is provided between the parallel plate conductors 51 and disposed at a midway position of the first dielectric line 53. The pulse modulator 22 outputs the millimeter-wave signal from the first dielectric line 53 as a pulsed millimeter-wave signal for transmission. The second dielectric line 58 is provided between the parallel plate conductors 51 and disposed in proximity to the first dielectric line 53 in such a way that one end thereof is electromagnetically coupled with the first dielectric line 53, or coupled at one end thereof with the first dielectric line 53.

The circulator 54 (23) is provided between the parallel plate conductors 51 and formed of a ferrite plate disposed in parallel with the parallel plate conductors 51. The circulator 54 (23) has the first connection portion 54a, the second connection portion 54b, and the third connection portion 54c that are arranged at predetermined intervals about the periphery of the ferrite plate and respectively act as millimeter-wave signal input and output ends, of which the first connection portion 54a is connected to the millimeter-wave signal output end of the first dielectric line 53, wherein a millimeter-wave signal inputted from one of the connection portions is outputted from the other connection portion adjoining in a clockwise or counterclockwise direction within the plane of the ferrite plate. The third dielectric line 55 is provided between the parallel plate conductors 51, connected to the second connection portion 54b of the circulator 54 (23), and allows the millimeter-wave signal to propagate therethrough. The third dielectric line 55 has the transmitting/receiving antenna 56 (24) at its front end. The fourth dielectric line 57 is provided between the parallel plate conductors 51 and connected to the third connection portion 54c of the circulator 54 (23). The fourth dielectric line 57 allows a reception wave, which has been received by the transmitting/receiving antenna 56 (24), propagated through the third dielectric line 55 as well as the second connection portion 54b, and outputted from the third connection portion 54c, to propagate therethrough.

The mixer 59 (25) is provided between the parallel plate conductors 51 and constructed by proximately placing or coupling a mid-portion of the second dielectric line 58 and a mid-portion of the fourth dielectric line 57 so as to achieve electromagnetic coupling therebetween. The mixer 59 (25) mixes a part of the millimeter-wave signal for transmission propagated from the second dielectric line 58 and the reception wave propagated from the fourth dielectric line 57 to generate an intermediate-frequency signal. In this construction, the switch 26b is disposed at the output end of the mixer 59 (25) and switches back and forth between a first system Si which outputs an intermediate-frequency signal to the downstream side and a second system S2 to which a termination circuit 37 for terminating the intermediate-frequency signal is connected.

The switch 26b allows the output end of the mixer 59 (25) to be connected to the first system S1 and the second system S2 alternately by switching. In this example, the first system S1 for outputting an intermediate-frequency signal to the downstream side is connected via the capacitor 27b to the amplifier 28b. The second system S2 is connected to the termination circuit 37 for terminating the intermediate-frequency signal. As shown in FIG. 12A, the termination circuit 37 of this example is composed of a resistance R1, a resistance R2, and a capacitor C1.

Note that the capacitor 27b acts to achieve alternating-current coupling between the switch 26b and the amplifier 28b.

Moreover, in the example shown in FIG. 12A, a resistance R3 is connected between the output end of the mixer 59 (25) with the first system S1 and the input end of the amplifier 28b located downstream of the switch 26b, and in parallel with the switch 26b.

Hereinafter, the concrete structure and working of the millimeter-wave radar employing the high-frequency transmitting/receiving apparatus according to the ninth embodiment of the invention will be described in detail.

In the millimeter-wave radar employing the high-frequency transmitting/receiving apparatus according to the ninth embodiment of the invention, the transmitting/receiving antenna 56 (24) serves as an antenna. On the other hand, in the millimeter-wave radar employing the high-frequency transmitting/receiving apparatus according to the tenth embodiment of the invention, as shown in FIGS. 17 and 12B, two separate antennas are provided: the transmitting antenna 66 (24a) and the receiving antenna 70 (24a). Correspondingly, the fourth and fifth dielectric lines 69 and 67 are added. The fourth dielectric line 69 is connected to both the receiving antenna 70 (24b) and the mixer 71 (25). The fifth dielectric line 67 is connected to the third connection portion 64c of the circulator 64 (23), for allowing a millimeter-wave signal which has been intrusively received at the transmitting antenna 66 (24a), to propagate therethrough. At the front end thereof is disposed the reflectionless terminator 67a for attenuating the received millimeter-wave signal. Moreover, the mixer 71 (25) is constructed by proximately placing or coupling a mid-portion of the second dielectric line 68 and a mid-portion of the fourth dielectric line 69 so as to achieve electromagnetic coupling therebetween. Also in this construction, the working and effect of the switching device 26b described hereinbelow is basically the same as achieved in the millimeter-wave radar employing the high-frequency transmitting/receiving apparatus according to the ninth embodiment of the invention.

The high-frequency transmitting/receiving apparatus according to the tenth embodiment of the invention includes a pair of parallel plate conductors 61, a first dielectric line 63, a millimeter-wave signal oscillator 62 (21), a pulse modulator 22, a second dielectric line 68, a circulator 64 (23), a third dielectric line 65, a fourth dielectric line 69, a fifth dielectric line 67, a mixer 71 (25) and a switch 26b. The pair of parallel plate conductors 61 are disposed at an interval equal to or less than one half of a wavelength of a millimeter-wave signal. The first dielectric line 63 is provided between the parallel plate conductors 61. The millimeter-wave signal oscillator 62 (21) is provided between the parallel plate conductors 61 and attached to the first dielectric line 63. The millimeter-wave signal oscillator 62 (21) converts a high-frequency signal outputted from a high-frequency diode to a frequency-modulated millimeter-wave signal, and allows the millimeter-wave signal to propagate through the first dielectric line 63. The pulse modulator 22 is provided between the parallel plate conductors 61 and disposed at a midway position of the first dielectric line 63. The pulse modulator 22 outputs the millimeter-wave signal from the first dielectric line 63 as a pulsed millimeter-wave signal for transmission. The second dielectric line 68 is provided between the parallel plate conductors 61 and disposed in proximity to the first dielectric line 63 in such a way that one end thereof is electromagnetically coupled with the first dielectric line 63, or coupled at one end thereof with the first dielectric line 63.

The circulator 64 (23) is provided between the parallel plate conductors 61 and formed of a ferrite plate disposed in parallel with the parallel plate conductors 61. The circulator 64 (23) has the first connection portion 64a, the second connection portion 64b, and the third connection portion 64c that are arranged at predetermined intervals about the periphery of the ferrite plate and respectively act as millimeter-wave signal input and output ends, of which the first connection portion 64a is connected to the millimeter-wave signal output end of the first dielectric line 63, wherein a millimeter-wave signal inputted from one of the connection portions is outputted from the other connection portion adjoining in a clockwise or counterclockwise direction within the plane of the ferrite plate. The third dielectric line 65 is provided between the parallel plate conductors 61, connected to the second connection portion 64b of the circulator 64 (23), and allows the millimeter-wave signal to propagate therethrough. The third dielectric line 65 has the transmitting/receiving antenna 66 (24a) at its front end. The fourth dielectric line 69 is provided between the parallel plate conductors 61 and the receiving antenna 70 (24b) is disposed at the front end thereof. The fifth dielectric line 67 is provided between the parallel plate conductors 61 and connected to the third connection portion 64c of the circulator 64 (23). The fifth dielectric line 67 allows a millimeter-wave signal which has been intrusively received at the transmitting antenna 66 (24a), to propagate therethrough. The fifth dielectric line 67 has the reflectionless terminator 67a disposed at the front end thereof, for attenuating the received millimeter-wave signal.

The mixer 71 (25) is provided between the parallel plate conductors 61, disposed at another end of the fourth dielectric line 69 and constructed by proximately placing or coupling a mid-portion of the second dielectric line 68 and a mid-portion of the fourth dielectric line 69 so as to achieve electromagnetic coupling therebetween. The mixer 71 (25) mixes a part of the millimeter-wave signal for transmission propagated from the second dielectric line 68 and the reception wave propagated from the fourth dielectric line 69 to generate an intermediate-frequency signal. The switch 26b is disposed at the output end of the mixer 71 (25), and switches back and forth between a first system S1 which outputs the intermediate-frequency signal outputted to the downstream side, and a second system S2 to which a termination circuit for terminating the intermediate-frequency signal is connected.

Reference numeral 26b represents a switch disposed at the output end of the mixer 59, 71 (25), for switching back and forth between the first system S1 which outputs the intermediate-frequency signal outputted from the mixer 59, 71 (25) to the downstream side, and the second system S2 to which a termination circuit for terminating the intermediate-frequency signal is connected. While the switch 26b is placed in the first system S1 mode, the intermediate-frequency signal is outputted to the downstream side. On the other hand, while the switch 26b is placed in the second system S2 mode, intrusion of an unwanted signal is interrupted. More specifically, if a millimeter-wave signal for transmission that has been pulse-modulated by the pulse modulator 22 is reflected from the connection between the NRD guide and the dielectric waveguide, or leaks from the circulator 54, 64 (23), the millimeter-wave signal may be outputted as an unwanted signal through the mixer 59, 71 (25). Then, before the unwanted signal is directed to the amplifier 28b, the switch 26b is driven to interrupt the unwanted signal.

As the switch 26b such as shown herein, a CMOS semiconductor switch having a so-called SPDT function is preferably employed. In this case, switching between the first system S1 and the second system S2 can be achieved at high speed. While the switch 26b is placed in the second system S2 mode to effect insulation between the mixer 59, 71 (25) and the amplifier 28b, the output from the mixer 59, 71 (25) can be directed, through the second system S2, to the termination circuit 37. Note that the time period over which the switch 26b is kept in a neutral state, namely, the switch 26b is placed neither in the first system S1 mode nor in the second system S2 mode, is so short that it may be ignored, as compared with the pulse width in actual use.

Reference numeral 28b represents an amplifier connected to the first system S1 located downstream of the switch 26b, for amplifying the intermediate-frequency signal outputted from the high-frequency transmitting/receiving apparatus. The amplifier 28b is so designed that its gain and operation are controlled timewise. For example, the time period over which the amplifier 28b is controlled is determined in accordance with the digital form of a pulse signal to be inputted thereto. Under the control of the amplifier 28b, the inputted intermediate-frequency signal is periodically amplified with desired timing over a certain period of time.

Reference numeral 29b represents a timing generating section for generating switching timing of the switch 26b back and forth between the first system S1 and the second system S2. The timing generating section 29b receives input of a pulsed branch signal inputted from the IN-1 terminal to the pulse modulator 22. In accordance with the signal level, the timing generating section 29b operates to control switching of the switch 26b. For example, the switching timing is controlled as follows. If a millimeter-wave signal for transmission that has been pulse-modulated by the pulse modulator 22 is reflected from the connection between the NRD guide and the dielectric waveguide, or leaks from the circulator 54, 64 (23), the millimeter-wave signal is outputted as an unwanted signal through the mixer 59, 71 (25). Then, before the unwanted signal is directed to the amplifier 28b, the timing generating section 29b operates to turn the switch 26b into the second system S2 mode so as to interrupt the unwanted signal.

Figure 19:
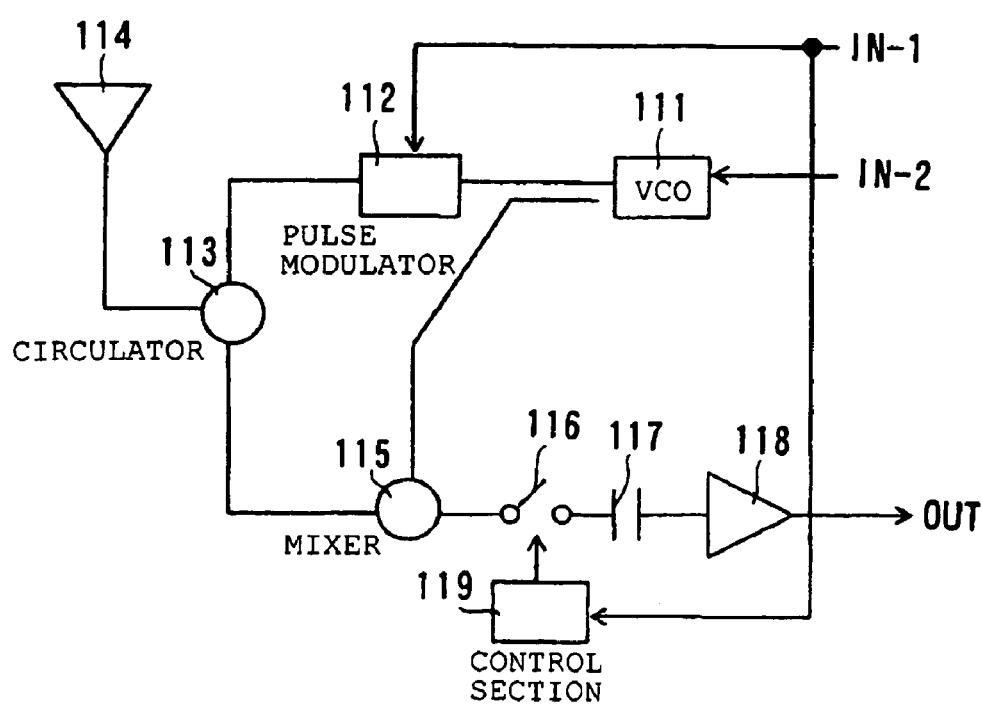
FIG. 19 is a block circuit diagram showing the configuration of each section of a conventional high-frequency transmitting/receiving apparatus employed as a millimeter-wave radar.

Reference numeral 37 represents a termination circuit for terminating output of the intermediate-frequency signal at the time when the output mode of the mixer 59, 71 (25) is switched to the second system S2 by the switch 26b. For example, the termination circuit 37 is composed of a resistance R1, a resistance R2, and a capacitor C1, as shown in FIGS. 12A and 12B. Here, the capacitance of the capacitor C1 should preferably be set in a range of a few nF (nanofarad) to a few μF (microfarad). This is because, since the capacitance to ground at the output end of the mixer 59, 71 (25) is far larger than the capacitance of the opened-state switch 116 of the conventional high-frequency transmitting/receiving apparatus shown in FIG. 19 (approximately pF (picofarad) in normal cases), it follows that the impedance with respect to high-frequency waves is decreased. Consequently, impedance matching can substantially be achieved between the output of the mixer 59, 71 (25) and the termination circuit 37. By adjusting the circuit constant to conform to the output impedance of the mixer 59, 71 (25), the termination circuit 37 is allowed to function as a reflectionless termination circuit, resulting in an advantage in keeping reflection from the termination circuit 37 toward the mixer 59, 71 (25) to a minimum.

The termination circuit 37 is not limited to the configuration illustrated in FIGS. 12A and 12B, but may be of another configuration formed by combining a few of circuit elements selected from among a resistance component, a capacitance component, and an inductance component.

In this way, an unwanted intermediate-frequency signal which has been inputted to the second system S2 by the switch 26b is terminated and absorbed by the termination circuit 37 before finding its way into the other circuit. This makes it possible to allow only the necessary intermediate-frequency signal to pass through the first system S1, as a reception wave, and come out of the millimeter-wave radar. Moreover, it never occurs that the unwanted intermediate-frequency signal degrades the signal waveform of the necessary intermediate-frequency signal.

Reference numeral 38 represents a resistance which is connected in parallel with the switch 26b, for stabilizing the DC level at the output end of the mixer 59, 71 (25) and the first-system S1-side output end of the switch 26b. In this example, the resistance 38 is composed of a resistance portion R3 and a resistance portion R4. The resistance portion R3 provides connection between the output end of the mixer 59, 71 (25) and the first-system S1-side output end of the switch 26b. The resistance portion R4 provides connection between the output end of the mixer 59, 71 (25) and the second-system S2-side output end of the switch 26b. It is preferable to set the resistance portions R3 and R4 as high as possible to the extent where they do not affect the AC component of the intermediate-frequency signal, for example, high resistance of the order of a few MΩ.

The resistance portions R3 and R4 of the resistance 38 each act to stabilize the DC level at the circuits located downstream of the mixer 59, 71 (25). Thereby, the output signal level can be kept stabilized throughout the time period during which the intermediate-frequency signal necessary as a reception wave is not yet available, en passant, this time period is far longer than the time period during which the intermediate-frequency signal necessary as a reception wave is being outputted. As a result, the output signal level can be kept substantially constant during a pause in radar detection, thereby preventing erroneous radar detection without fail.

As described heretofore, according to the high-frequency transmitting/receiving apparatuses according to the ninth and tenth embodiments of the invention, the pulse-modulated millimeter-wave signal for transmission can be prevented from being outputted to the reception system due to inner reflection or other causes, without fail, by turning the switch 26b into the second system S2 mode. Moreover, during the interruption, the load impedance in the output of the mixer 59, 71 (25) can be matched. Hence, in the case of applying the high-frequency transmitting/receiving apparatus to a millimeter-wave radar, the millimeter-wave radar will succeed in providing enhanced detection performance, particularly, excellent reception performance.

It is to be understood that the application of the invention is not limited to the specific embodiments described heretofore, and that many modifications and variations of the invention are possible within the scope of the invention. For example, the capacitor 27b for achieving alternating-current coupling may be disposed between the output end of the mixer 59, 71 (25) and the switch 26b, or between the second-system S2-side output end of the switch 26b and the termination circuit 37. By doing so, in a case where the bias voltage of the mixer 59, 71 (25) is determined freely, the DC level at the first and second systems S1 and S2 can be stabilized.

The high-frequency transmitting/receiving apparatus according to the eleventh embodiment shown in FIG. 13 is composed of a high-frequency oscillator 1, a branching device 2, an RF switch 13, a circulator 4, a transmitting/receiving antenna 5, a mixer 6, a switching device 7, switching control signal lines 14 and 15 and a delay line or a delay circuit element (in this example, a delay line 16). The high-frequency oscillator 1 generates a high-frequency signal. The branching device 2 is connected to the high-frequency oscillator 1, and branches the high-frequency signal into high-frequency branch signals so that the high-frequency branch signals may be outputted to one output end 2b and another output end 2c of the branching device 2, respectively. The RF switch 13 is connected to the one output end 2b of the branching device 2, and outputs a high-frequency signal for transmission by allowing passage of a part of the high-frequency signal intermittently, in a cycle of T, for a duration of time t (wherein T>t) in a closed state. The circulator 4 is formed of a magnetic substance, and has a first terminal 4a, a second terminal 4b, and a third terminal 4c that are arranged about the periphery of the magnetic substance, of which the first terminal 4a is connected to the output end of the RF switch 13, wherein a high-frequency signal inputted from one of the terminals is outputted from the other adjoining terminal in turn, in order from the first through third terminals. The transmitting/receiving antenna 5 is connected to the second terminal 4b of the circulator 4, and transmits the high-frequency signal for transmission and receives a high-frequency signal returned from a target object to be detected through reflection. The mixer 6 is connected between the other output end 2c of the branching device 2 and the third terminal 4c of the circulator 4. The mixer 6 mixes the high-frequency branch signal outputted to the other output end 2c and a high-frequency signal received by the transmitting/receiving antenna 5 so as to generate an intermediate-frequency signal. The switching device 7 connected to the output end of the mixer 6, and allows passage of the intermediate-frequency signal in a closed state, whereas interrupts the intermediate-frequency signal in an opened state. The switching control signal lines 14 and 15 are connected to the RF switch 13 and the switching device 7, respectively, and inputs signals to the RF switch 13 and the switching device 7, respectively, which signals control switching of the RF switch 13 and the switching device 7. The delay line 16 is connected to one of the switching control signal lines 14 and 15 (in this example, the switching control signal line 15), and turns the switching device 7 into an opened state in synchronization with unmaking of the RF switch 13, whereas turns the switching device 7 into a closed state in synchronization with making of the RF switch 13.

The high-frequency transmitting/receiving apparatus according to the twelfth embodiment of the invention shown in FIG. 14 is composed of a high-frequency oscillator 1, a branching device 2, an RF switch 13, an isolator 8, a transmitting antenna 9, a receiving antenna 10, a mixer 6, a switching device 7, switching control signal lines 14 and 15 and a delay line or a delay circuit element (in this example, a delay line 16). The high-frequency oscillator 1 generates a high-frequency signal. The branching device 2 is connected to the high-frequency oscillator 1, and branches the high-frequency signal into high-frequency branch signals so that the high-frequency branch signals may be outputted to one output end 2b and another output end 2c of the branching device 2, respectively. The RF switch 13 is connected to the one output end 2b of the branching device 2, and outputs a high-frequency signal for transmission by allowing passage of part of the high-frequency signal intermittently, in a cycle of T, for a duration of time t (wherein T>t) in a closed state. The isolator 8 has its one end 8a connected to the output end of the RF switch 13, and passes the high-frequency signal for transmission from one end 8a to the other end 8b thereof. The transmitting antenna 9 is connected to the isolator 8, and transmits the high-frequency signal for transmission. The receiving antenna 10 is connected to the other output end 2c of the branching device 2. The mixer 6 is connected between the other output end 2c and the receiving antenna 10. The mixer 6 mixes the high-frequency branch signal outputted to the other output end 2c and a high-frequency signal received by the receiving antenna 10 so as to generate an intermediate-frequency signal. The switching device 7 is connected to the output end of the mixer 6, and allows passage of the intermediate-frequency signal in a closed state, whereas interrupts the intermediate-frequency signal in an opened state. The switching control signal lines 14 and 15 are connected to the RF switch 13 and the switching device 7, respectively, and inputs signals to the RF switch 13 and the switching device 7, respectively, which signals control switching of the RF switch 13 and the switching device 7. The delay line 16 is connected to one of the switching control signal lines 14 and 15 (in this example, the switching control signal line 15), and turns the switching device 7 into an opened state in synchronization with unmaking of the RF switch 13, whereas turns the switching device 7 into a closed state in synchronization with making of the RF switch 13.

In the constructions described above, by actuating the delay line 16, the switching device 7 is driven in synchronization with the RF switch 13. Specifically, the switching device 7 is opened and closed alternately ahead of or behind switching of the RF switch 13, within a certain period of time, with appropriate timing. To obtain appropriate timing for synchronization between switching of the switching device 7 and switching of the RF switch 13, the opening and closing times for the switching device 7 are set at values less than ±T based on the timing to turn the RF switch 13 into a closed state. For example, in the case of applying the high-frequency transmitting/receiving apparatus to a radar, where the time period over which a high-frequency signal is transmitted from the transmitting/receiving antenna 5 or the transmitting antenna 9 and is then returned to the transmitting/receiving antenna 5 or the receiving antenna 10 is given as $d_1$ (wherein $d_1<T-t$), then the opening and closing times for the switching device 7 are each set at a value delayed with respect to the opening and closing times for the RF switch 13 by the time interval $d_1$, respectively. In this way, the high-frequency signal can be received, in synchronization with switching of the RF switch 13, with appropriate timing.

For example, the delay line 16 is preferably formed of a distributed constant line having an increased effective permittivity with respect to a high-frequency signal to be transmitted to the delay line 16. Moreover, instead of disposing the delay line 16, it is also possible to realize a delay-line element by making the switching control signal lines 14 and 15 different from each other in line length (electrical length). That is, an excess length of one of the switching control signal lines 14 and 15 is used as a delay line. Further, instead of employing a delay line, it is also possible to constitute a commonly-known delay circuit element by combining lumped constant circuits such as a capacitor and an inductance.

According to the high-frequency transmitting/receiving apparatuses according to the eleventh and twelfth embodiments of the invention shown in FIGS. 13 and 14, by actuating the delay line 16, the switching device 7 is driven in synchronization with the RF switch 13. Specifically, the switching device 7 is opened and closed alternately ahead of or behind switching of the RF switch 13, within a certain period of time, with appropriate timing. Thus, reception-operation inhibition time can selectively be adjusted; wherefore the high-frequency transmitting/receiving apparatus is impervious to adverse effects of extraneous noise, etc., and is thus capable of receiving to-be-received high-frequency signals with reliability.

Next, an additional detailed description will be given below as to the components for constituting any of the high-frequency transmitting/receiving apparatuses according to the first to twelfth embodiments of the invention.

It is preferable to use, as the material of the first to fifth dielectric lines 53, 58, 55, 57, 63, 68, 65, 69, 67 constituting nonradiative dielectric waveguides, a resin material such as tetrafluoroethylene or polystyrene; or a ceramic material such as cordierite ($2MgO.2Al_2O_3.5SiO_2$) ceramics having a low relative permittivity, alumina ($Al_2O_3$) ceramics, or glass ceramics. These materials are low-loss to millimeter-wave band. Moreover, although the first to fifth dielectric lines 53, 58, 55, 57, 63, 68, 65, 69, 67 are given basically a rectangular cross-sectional profile, they may have their corners rounded off. That is, the dielectric lines may have a cross-sectional profile of various shapes so long as millimeter-wave signals are transmitted properly.

It is preferable to use, as the magnetic substance or ferrite plate used to form the circulator 54, 64 (4), a zinc-nickel-iron composite oxide ($Zn_aNi_bFe_cO_x$) that is particularly desirable to millimeter-wave signals. Moreover, although the magnetic substance or ferrite plate used to form the circulator 54, 64 (4) is basically disc-shaped, it may have the shape of a regular polygon, as viewed plane-wise. In this case, where the number of dielectric lines to be connected is given as n (n represents an integer of 3 or more), then the planar configuration of the material should preferably be m-sided regular polygon (m represents an integer of 3 or more, wherein m>n).

It is preferable to use, as the material of the parallel plate conductor 51, 61, a conductor plate made of Cu, Al, Fe, Ag, Au, Pt, SUS (stainless steel), brass (Cu—Zn alloy), or the like material, in terms of high electric conductivity and excellent processability. It is also possible to use an insulation plate made of ceramics or resin having layers of such conductor materials as mentioned above formed on the surface thereof.

The substrate 88 is preferably constituted by forming a choke-type bias supply line 90 on one principal surface of a platy base substrate. The base substrate is made of tetrafluoroethylene, polystyrene, glass ceramics, glass epoxy resin, epoxy resin, or the like. The choke-type bias supply line 90 is formed of a strip conductor or the like made of aluminum (Al), gold (Au), copper (Cu), or the like.

Further, the high-frequency transmission line for providing connection among the circuit elements and transmitting high-frequency signals is not limited to the nonradiative dielectric waveguide, but may be of another configuration such as a waveguide, a dielectric waveguide, a strip line, a micro-strip line, a coplanar line, a slot line, a coaxial line, or the like. The selection is made in consideration of the frequency band in use and purposes. Moreover, the frequency band in use is not limited to a millimeter-wave band, but may be of a micro-wave band, or even below.

Next, a description will be given below as to a radar system employing the high-frequency transmitting/receiving apparatus of the invention, a vehicle equipped with the radar system, and a small boat equipped with the radar system.

FIG. 15 is a block circuit diagram of a radar system according to one embodiment of the invention. The radar system includes any one of the high-frequency transmitting/receiving apparatuses according to the first to twelfth embodiments of the invention (in this example, the high-frequency transmitting/receiving apparatus of the first embodiment is chosen) and a distance information detector 100 for detecting data on the distance to a target object to be detected by processing the intermediate-frequency signal outputted from the high-frequency transmitting/receiving apparatus.

In the above-stated construction, the distance information detector 100 acts to output information including the distance between the radar system and a to-be-detected target object and the-direction on that by processing the detected intermediate-frequency signal. For example, the distance information detector 100 is composed of an operating circuit, a discrimination circuit, and a computer. The operating circuit includes a differentiation circuit, an integrating circuit, a square-law circuit, and the like, for computing the intermediate-frequency signal to obtain positional data. The discrimination circuit determines an output from the operating circuit. The computer drives the operating circuit, the discrimination circuit, and the high-frequency transmitting/receiving apparatus to operate in accordance with a predetermined sequence of operations. The operating circuit and the discrimination circuit can be constituted by combining an operational amplifier (OP amplifier), a comparator, and the like component. A switch, an amplifier, or a filter may additionally be disposed as required. Moreover, an A-D converter and a D-A converter may be used. Therewith, in the course of the computation or discrimination process, an analog signal is converted into a digital signal, and then computation or discrimination is carried out on the basis of the digital signal. The digital signal is further converted into an analog signal on an as needed basis. It is preferable to use, as an operating circuit for computing the digital signal obtained through A-D conversion, for example, a digital signal processor (DSP) capable of performing fast-Fourier-transformation (FFT) processing and the like processing.

According to the radar system of one embodiment of the invention shown in FIG. 15, the high-frequency transmitting/receiving apparatus according to the first embodiment of the invention is employed as a constituent component. Since the high-frequency transmitting/receiving apparatus according to the first embodiment is excellent in reception performance, it follows that a to-be-detected target object can swiftly be detected without fail. Moreover, both nearby and far-off to-be-detected target objects can also be detected successfully. It is needless to say here that the high-frequency transmitting/receiving apparatuses according to the second through twelfth embodiments of the invention will achieve the same effects as achieved by the high-frequency transmitting/receiving apparatus according to the first embodiment of the invention in the radar system of the invention. Note that the application of the high-frequency transmitting/receiving apparatus of the invention is not limited to the radar system. For example, the high-frequency transmitting/receiving apparatus may be used as a so-called Physical Media Dependent (PMD) device working as a physical layer of a radio used for a wireless LAN. In this case, the PMD device, a Physical Media Attachment (PMA) device which is higher in rank than the PMD, a Media Access Controller (MAC) device, and other like devices are combined together to constitute the radio.

The vehicle equipped with the radar system of the invention includes the radar system of the invention described just above. The radar system is used to detect a target object to be detected.

With such a structure, the vehicle equipped with the radar system of the invention is, like a conventional vehicle equipped with the radar system, able to control its behavior based on the distance information detected by the radar system and to warn a driver of, for example, presence of an obstruction on the road or another vehicle by sound, light, or vibration. Besides, the vehicle equipped with the radar system of the invention has the advantage over the conventional construction in that, since the radar system detects swiftly a to-be-detected target object, i.e. an obstruction on the road or another vehicle without fail, it is possible to control the vehicle and give a driver a warning properly without causing abrupt actions in the vehicle.

Specifically, the vehicle equipped with the radar system of the invention can be applied to a bicycle, a motor-assisted bicycle, a ride at an amusement park, and a cart in a golf course, let alone a steam train, an electric train, an automobile, and a truck.

The small boat equipped with the radar system of the invention includes the radar system of the invention described just above. The radar system is used to detect a target object to be detected.

With such a structure, the small boat equipped with the radar system of the invention is, like a conventional small boat equipped with the radar system, able to control its behavior based on the distance information detected by the radar system and to warn an operator of, for example, presence of an obstruction such as a reef or another vessel or craft by sound, light, or vibration. Besides, the small boat equipped with the radar system of the invention has the advantage over the conventional construction in that, since the radar system detects swiftly a to-be-detected target object, i.e. an obstruction such as a reef or another vessel or craft without fail, it is possible to control the small boat and give an operator a warning properly without causing abrupt actions in the small boat.

The small boat equipped with the radar system of the invention may be applied to boats that can be operated by both licensed and unlicensed operators, specifically, a small boat whose total tonnage is less than 20 tons; a foyboat; a dinghy; a wet bike; an outboard motor-mounted small bass fishing boat; an outboard motor-mounted inflatable boat (rubber boat); a fishing vessel; a leisure fishing boat; a working boat; an old-fashioned houseboat; a towing boat; a sport boat; a fishing boat; a yacht; an oceangoing yacht; a cruiser; and a pleasure boat whose total tonnage is 20 tons or above.

Thus, according to the invention, there are provided a high-frequency transmitting/receiving apparatus of outstanding reception performance that is capable of properly interrupting an intermediate-frequency signal containing noise and of properly outputting an intermediate-frequency signal which is effective in detecting distance information; a high-performance radar system employing the high-frequency transmitting/receiving apparatus that is capable of swiftly detecting a target object to be detected with reliability; a vehicle bearing the high-performance radar system; and a small boat bearing the high-performance radar system.

It is to be understood that the application of the invention is not limited to the specific embodiments described heretofore, and that many modifications and variations of the invention are possible within the scope of the invention. For example, in the high-frequency transmitting/receiving apparatus of the invention, an output end of the switching device 7, 26a and 26b or the switch (IF switch) 12 may be connected to one input end of an operational amplifier (OP amplifier) which is operable at high speed, and the other input end and the output end of the operational amplifier may be connected to another IF switch and a circuit located downstream of the reception system, respectively. The IF switch should preferably be analogous and equivalent in characteristics to the switch (IF switch) 12. In this case, the operational amplifier is so operated as to offset an unwanted signal such as switching noise occurring in one IF switch itself by a like signal generated in the other IF switch. As a result, in the high-frequency transmitting/receiving apparatus, the unwanted signal can be prevented from being inputted to the circuit located downstream of the reception system.

(Working Example)

Figure 18:
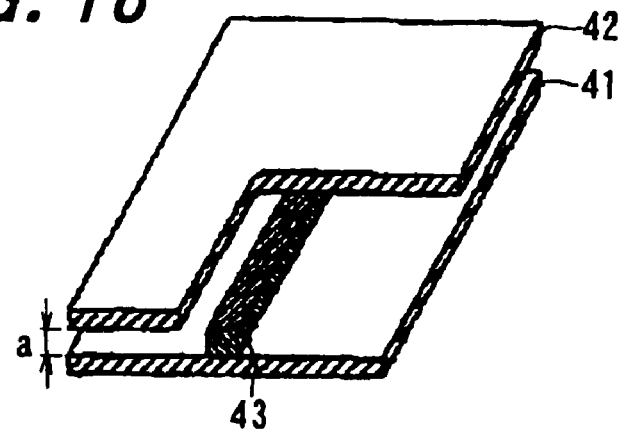
FIG. 18 is a partly cutaway perspective view showing the basic structure of an NRD guide.

As an working example, a millimeter-wave radar was constructed that has such a circuit configuration as shown in FIG. 10A. The NRD guide, which is a principal component constituting the millimeter-wave signal transmitting section of the millimeter-wave radar, is fabricated as follows. As shown in FIG. 18, as a pair of parallel plate conductors 41 and 42, two pieces of 6 mm-thick Al plates are disposed at an interval a of 1.8 mm. Between the Al plates is interposed a dielectric line 43 made of cordierite ceramics having a relative dielectric constant of 4.8. The dielectric line 43 has a sectional profile of 1.8 mm in height and 0.8 mm in width. Moreover, the millimeter-wave circuit constituting the millimeter-wave signal transmitting section is configured as shown in FIG. 16.

The capacitor 35 employed in the millimeter-wave radar is designed as follows. The correction capacitance value $C_0$ of the capacitor 35 connected in parallel with the signal selector switch 34 is determined as 10 nF by calculation according to the equation (1). At this time, the values of $C_L$, $R_L$, and $R_r$ are determined as 84.5 pF (at 84 MHz), 751 Ω, and 6 Ω, respectively, by actual measurement.

Based on the correction capacitance value $C_0$ thus obtained, there were prepared a few test samples of the millimeter-wave radar with varying capacitance values of the capacitor 35 (within a range of 8 to 22 nF). Under operating conditions, measurements were made of an output voltage of an intermediate-frequency signal (voltage at the OUT terminal) on each of the samples. At this time, the measurement on the millimeter-wave signal oscillator 21 was made by means of a sampling scope, and the measurement results were obtained as actually measured values of changes in the output voltage of the intermediate-frequency signal with respect to time. During the measurement process, the signal selector switch 34 was kept connected to the IN-1 terminal.

FIGS. 11A and 11B are diagrams of examples of measurement results on the output voltage of the intermediate-frequency signal in the millimeter-wave radar built as the working example, with FIG. 11A showing one example of measurement results on the output voltage waveform of the intermediate-frequency signal, and FIG. 11B showing the dependence of the range of fluctuation in the output voltage of the intermediate-frequency signal $\Delta V_{IF}$ with respect to the correction capacitance value $C_0$. In FIG. 11A, the time is taken along the horizontal axis, and the voltage is taken along the vertical axis. Moreover, in the diagram, the voltage waveform of the pulse modulation signal inputted to the IN-1 terminal and the output voltage waveforms of the intermediate-frequency signal at a plurality of different millimeter-wave frequencies are represented on the same time axis. As shown in FIG. 11A, the range of fluctuation in the output voltage of the intermediate-frequency signal $\Delta V_{IF}$ is defined as a maximum value of the difference among the output voltages of the intermediate-frequency signal at different millimeter-wave frequencies, as observed at one time.

More specifically, first of all, the millimeter-wave radar was operated as follows. Under the condition that the radiation from the transmitting/receiving antenna 24 is not reflected externally, the millimeter-wave signal oscillator 21 was driven to generate a millimeter-wave signal of 76 to 77 GHz. Simultaneously, with the signal selector switch 34 kept connected to the IN-1 terminal, a pulse modulation signal was inputted to the pulse modulator 22. The pulse modulation signal is 100 ns in pulse width; 3.8 ns in pulse rise and fall time; and 5 V in amplitude voltage. Thereby, the transmitting/receiving antenna 24 entered the state of transmitting pulsed millimeter-wave signals for transmission. Then, with the reception-side circuit of the millimeter-wave radar kept in an operating condition, the output voltage of the intermediate-frequency signal resulting from the pulsed millimeter-wave signal for transmission leaking from the circulator 23 was measured by means of a sampling oscilloscope connected to the OUT terminal. FIG. 11A indicates the measurement results thereon.

As shown in FIG. 11A, the output voltage of the intermediate-frequency signal fluctuates immediately after falling edge of a pulse of the pulse modulation signal (immediately after the pulsed millimeter-wave signal for transmission is sent out). The amount of fluctuation varies according to the frequency of the millimeter-wave signal. The range of fluctuation in the output voltage of the intermediate-frequency signal $\Delta V_{IF}$, namely, a maximum value of the amount of fluctuation depending on the frequency, occurs for the following reason. Mainly because of distortion of the pulse modulation signal, the voltage remains unstable and fluctuated even after falling edge of a pulse of the pulse modulation signal. While the range of fluctuation in the output voltage of the intermediate-frequency signal $\Delta V_{IF}$ is being unduly large, it is difficult to perform accurate radar detection.

Next, the millimeter-wave radar with varying capacitor 35's correction capacitance values $C_0$ (within a range of 8 to 22 nF) was operated in a similar manner to measure the range of fluctuation in the output voltage of the intermediate-frequency signal $\Delta V_{IF}$ at each of the correction capacitance values $C_0$. FIG. 11B indicates the measurement results thereon. As will be understood from FIG. 11B, the range of fluctuation in the output voltage of the intermediate-frequency signal $\Delta V_{IF}$ varies with the correction capacitance value $C_0$, and the value $\Delta V_{IF}$ is kept at a minimum when the correction capacitance value $C_0$ reaches 11 to 12 nF, that is, the values close to 10 nF which was determined by calculation according to the equation (1).

Hence, by connecting the capacitor 35 having an appropriate correction capacitance value $C_0$ in parallel with the signal selector switch 34 in such a way that the influence of the parasitic capacitance existing within the signal selector switch 34, which is one of main factors responsible for distortion of the pulse modulation signal, is minimized, the parasitic capacitance is corrected so that the range of fluctuation in the output voltage of the intermediate-frequency signal $\Delta V_{IF}$ may be suppressed. As a result, radar detection can be resumed immediately after the pulsed millimeter-wave signal for transmission is sent out.

As described heretofore, according to the invention, in the millimeter-wave radar having a switching device capable of preventing a pulse-modulated millimeter-wave signal for transmission from being outputted to the reception system due to inner reflection or other causes, a self-monitoring circuit can be realized in a simple manner by exploiting switching noise occurring in the switching device. This makes it possible to enhance the radar detection performance and impart an advanced self-monitoring function to the radar system. Moreover, by disposing the signal selector switch for switching input of pulse modulation signals and DC signals different from the pulse modulation signals to the pulse modulator, it is possible to perform self-monitoring on the transmission circuit and a part of the reception circuit ranging from the transmitting/receiving antenna 24 to the mixer 25. Further, by connecting a capacitor having an appropriate correction capacitance value in parallel with the signal selector switch, it is possible to suppress distortion of the pulse modulation signal caused by the parasitic capacitance existing within the signal selector switch. As a result, radar detection can be resumed immediately after the pulsed millimeter-wave signal for transmission is sent out.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A high-frequency transmitting/receiving apparatus comprising:
   a high-frequency oscillator for generating a high-frequency signal;
   a branching device connected to the high-frequency oscillator, for branching the high-frequency signal into high-frequency branch signals so that the high-frequency branch signals are outputted to one output end and another output end of the branching device, respectively;

a modulator connected to the one output end of the branching device, for modulating the high-frequency branch signal branched to the one output end so as to output a high-frequency signal for transmission;

a circulator formed of a magnetic substance, and having a first terminal, a second terminal, and a third terminal that are arranged about a periphery of the magnetic substance, of which the first terminal receives an output from the modulator, wherein a high-frequency signal inputted from one of the terminals is outputted from the other adjoining terminal in turn, in order from the first through third terminals;

a transmitting/receiving antenna connected to the second terminal of the circulator;

a mixer connected between the other output end of the branching device and the third terminal of the circulator, for mixing the high-frequency branch signal branched to the other output end and a high-frequency signal received by the transmitting/receiving antenna so as to generate an intermediate-frequency signal; and a switching device connected to an output end of the mixer, which interrupts the intermediate-frequency signal in an opened state, and, when the high-frequency signal for transmission from the modulator is in a non-output state and the condition is stabilized, changes from the opened state to a closed state to allow passage of the intermediate-frequency signal.

2. The high-frequency transmitting/receiving apparatus of claim 1, wherein the switching device, now kept in a closed state, changes from the closed state to an opened state before the modulator outputs the following high-frequency signal for transmission.

3. The high-frequency transmitting/receiving apparatus of claim 1, wherein the modulator is composed of a semiconductor device made of a material including a III-V compound semiconductor element.

4. The high-frequency transmitting/receiving apparatus of claim 1, wherein on the downstream side of the switching device is disposed a filter for blocking intrusion of noise into the intermediate-frequency signal during switching of the switching device, while allowing passage of the intermediate-frequency signal.

5. The high-frequency transmitting/receiving apparatus of claim 4, wherein between the output end of the mixer and the switching device is inputted a test signal having a frequency lower than a 3 dB cutoff frequency of the filter.

6. The high-frequency transmitting/receiving apparatus of claim 4, wherein the switching device receives a test switching signal for generating switching noise, and, between the switching device and the filter is disposed a switching noise detection terminal.

7. The high-frequency transmitting/receiving apparatus of claim 1, wherein the modulator is provided with a signal selector switch for switching input of modulation signals and DC signals different from the modulation signals.

8. The high-frequency transmitting/receiving apparatus of claim 7, wherein a capacitor is connected in parallel with the signal selector switch.

9. A high-frequency transmitting/receiving apparatus comprising:

a high-frequency oscillator for generating a high-frequency signal;

a branching device connected to the high-frequency oscillator, for branching the high-frequency signal into high-frequency branch signals so that the high-frequency branch signals are outputted to one output end and another output end of the branching device, respectively;

a modulator connected to the one output end of the branching device, for modulating the high-frequency branch signal branched to the one output end so as to output a high-frequency signal for transmission;

an isolator having its one end connected to an output end of the modulator, for passing the high-frequency signal for transmission from the one end to the other end thereof;

a transmitting antenna connected to the isolator;

a receiving antenna connected to the other output end of the branching device;

a mixer connected between the other output end of the branching device and the receiving antenna, for mixing the high-frequency branch signal branched to the other output end and a high-frequency signal received by the receiving antenna so as to generate an intermediate-frequency signal; and a switching device connected to an output end of the mixer, which interrupts the intermediate-frequency signal in an opened state, and, when the high-frequency signal for transmission from the modulator is in a non-output state and the condition is stabilized, changes from the opened state to a closed state to allow passage of the intermediate-frequency signal.

10. The high-frequency transmitting/receiving apparatus of claim 9, wherein the switching device, now kept in a closed state, changes from the closed state to an opened state before the modulator outputs the following high-frequency signal for transmission.

11. The high-frequency transmitting/receiving apparatus of claim 9, wherein the modulator is composed of a semiconductor device made of a material including a III-V compound semiconductor element.

12. The high-frequency transmitting/receiving apparatus of claim 9, wherein on the downstream side of the switching device is disposed a filter for blocking intrusion of noise into the intermediate-frequency signal during switching of the switching device, while allowing passage of the intermediate-frequency signal.

13. The high-frequency transmitting/receiving apparatus of claim 12, wherein between the output end of the mixer and the switching device is inputted a test signal having a frequency lower than a 3 dB cutoff frequency of the filter.

14. The high-frequency transmitting/receiving apparatus of claim 12, wherein the switching device receives a test switching signal for generating switching noise, and, between the switching device and the filter is disposed a switching noise detection terminal.

15. The high-frequency transmitting/receiving apparatus of claim 9, wherein the modulator is provided with a signal selector switch for switching input of modulation signals and DC signals different from the modulation signals.

16. The high-frequency transmitting/receiving apparatus of claim 15, wherein a capacitor is connected in parallel with the signal selector switch.

17. A high-frequency transmitting/receiving apparatus comprising:

a high-frequency oscillator for generating a high-frequency signal;

a branching device connected to the high-frequency oscillator, for branching the high-frequency signal into high-frequency branch signals so that the high-frequency branch signals are outputted to one output end and another output end of the branching device, respectively;

a modulator connected to the one output end of the branching device, for modulating the high-frequency branch signal branched to the one output end so as to output a high-frequency signal for transmission;

a circulator formed of a magnetic substance, and having a first terminal, a second terminal, and a third terminal that are arranged about a periphery of the magnetic substance, of which the first terminal receives an output from the modulator, wherein a high-frequency signal inputted from one of the terminals is outputted from the other adjoining terminal in turn, in order from the first through third terminals;

a transmitting/receiving antenna connected to the second terminal of the circulator;

a mixer connected between the other output end of the branching device and the third terminal of the circulator, for mixing the high-frequency branch signal branched to the other output end and a high-frequency signal received by the transmitting/receiving antenna so as to generate an intermediate-frequency signal; and a switch connected to an output end of the mixer, for switching back and forth between a first system which outputs the intermediate-frequency signal to a downstream side and a second system to which a termination circuit for terminating the intermediate-frequency signal is connected.

18. The high-frequency transmitting/receiving apparatus of claim 17, wherein impedance matching is achieved between the output end of the mixer and the termination circuit.

19. The high-frequency transmitting/receiving apparatus of claim 17, wherein a resistance is connected between the output end of the mixer and the first system, and in parallel with the switch.

20. A high-frequency transmitting/receiving apparatus comprising:

a high-frequency oscillator for generating a high-frequency signal;

a branching device connected to the high-frequency oscillator, for branching the high-frequency signal into high-frequency branch signals so that the high-frequency branch signals are outputted to one output end and another output end of the branching device, respectively;

a modulator connected to the one output end of the branching device, for modulating the high-frequency branch signal branched to the one output end so as to output a high-frequency signal for transmission;

an isolator having its one end connected to an output end of the modulator, for passing the high-frequency signal for transmission from one end to the other end there of;

a transmitting antenna connected to the isolator;

a receiving antenna connected to the other output end of the branching device;

a mixer connected between the other output end of the branching device and the receiving antenna, for mixing the high-frequency branch signal branched to the other output end and a high-frequency signal received by the receiving antenna so as to generate an intermediate-frequency signal; and a switch connected to an output end of the mixer, for switching back and forth between a first system which outputs the intermediate-frequency signal to a downstream side and a second system to which a termination circuit for terminating the intermediate-frequency signal is connected.

21. The high-frequency transmitting/receiving apparatus of claim 20, wherein impedance matching is achieved between the output end of the mixer and the termination circuit.

22. The high-frequency transmitting/receiving apparatus of claim 20, wherein a resistance is connected between the output end of the mixer and the first system, and in parallel with the switch.

23. A high-frequency transmitting/receiving apparatus comprising:

a pair of parallel plate conductors disposed at an interval equal to or less than one half of a wavelength of a millimeter-wave signal;

a first dielectric line provided between the parallel plate conductors;

a millimeter-wave signal oscillator provided between the parallel plate conductors and attached to the first dielectric line, for converting a high-frequency signal outputted from a high-frequency diode to a frequency-modulated millimeter-wave signal, and allowing the millimeter-wave signal to propagate through the first dielectric line;

a pulse modulator provided between the parallel plate conductors and disposed at a midway position of the first dielectric line, for outputting the millimeter-wave signal from the first dielectric line as a pulsed millimeter-wave signal for transmission;

a second dielectric line provided between the parallel plate conductors and disposed in proximity to the first dielectric line in such a way that one end thereof is electromagnetically coupled with the first dielectric line, or coupled at one end thereof with the first dielectric line;

a circulator provided between the parallel plate conductors and formed of a ferrite plate disposed in parallel with the parallel plate conductors, the circulator having a first connection portion, a second connection portion, and a third connection portion that are arranged at predetermined intervals about a periphery of the ferrite plate and respectively act as millimeter-wave signal input and output ends, of which the first connection portion is connected to a millimeter-wave signal output end of the first dielectric line, wherein the millimeter-wave signal inputted from one of the connection portions is outputted from the other connection portion adjoining in a clockwise or counterclockwise direction within a plane of the ferrite plate;

a third dielectric line, provided between the parallel plate conductors and connected to the second connection portion of the circulator, for allowing the millimeter-wave signal to propagate therethrough, the third dielectric line having a transmitting/receiving antenna at its front end;

a fourth dielectric line provided between the parallel plate conductors and connected to the third connection portion of the circulator, for allowing a reception wave, which has been received by the transmitting/receiving antenna, propagated through the third dielectric line, and outputted from the third connection portion, to propagate therethrough;

a mixer provided between the parallel plate conductors and constructed by proximately placing or coupling a mid-portion of the second dielectric line and a mid-portion of the fourth dielectric line so as to achieve electromagnetic coupling therebetween, for mixing a part of the millimeter-wave signal propagated from the second dielectric line and the reception wave propagated from the fourth dielectric line to generate an intermediate-frequency signal; and a switching device disposed at an output end of the mixer, the switching device interrupting the intermediate-frequency signal in an opened state, and, when the high-frequency signal for transmission, from the pulse modulator is in a non-output state and the condition is stabilized, changing from the opened state to a closed state to allow passage of the intermediate-frequency signal.

24. The high-frequency transmitting/receiving apparatus of claim 23, wherein the switching device, now kept in a closed state, changes from the closed state to an opened state before the pulse modulator outputs the following millimeter-wave signal for transmission.

25. The high-frequency transmitting/receiving apparatus of claim 23, wherein the pulse modulator is composed of a Schottky-barrier diode.

26. A high-frequency transmitting/receiving apparatus comprising:

a pair of parallel plate conductors disposed at an interval equal to or less than one half of a wavelength of a millimeter-wave signal;

a first dielectric line provided between the parallel plate conductors;

a millimeter-wave signal oscillator provided between the parallel plate conductors and attached to the first dielectric line, for converting a high-frequency signal outputted from a high-frequency diode to a frequency-modulated millimeter-wave signal, and allowing the millimeter-wave signal to propagate through the first dielectric line;

a pulse modulator provided between the parallel plate conductors and disposed at a midway position of the first dielectric line, for outputting the millimeter-wave signal from the first dielectric line as a pulsed millimeter-wave signal for transmission;

a second dielectric line provided between the parallel plate conductors and disposed in proximity to the first dielectric line in such a way that one end thereof is electromagnetically coupled with the first dielectric line, or coupled at one end thereof with the first dielectric line;

a circulator provided between the parallel plate conductors and formed of a ferrite plate disposed in parallel with the parallel plate conductors, the circulator having a first connection portion, a second connection portion, and a third connection portion that are arranged at predetermined intervals about a periphery of the ferrite plate and respectively act as millimeter-wave signal input and output ends, of which the first connection portion is connected to a millimeter-wave signal output end of the first dielectric line, wherein the millimeter-wave signal inputted from one of the connection portions is outputted from the other connection portion adjoining in a clockwise or counterclockwise direction within a plane of the ferrite plate;

a third dielectric line, provided between the parallel plate conductors and connected to the second connection portion of the circulator, for allowing the millimeter-wave signal to propagate therethrough, the third dielectric line having a transmitting antenna at its front end;

a fourth dielectric line provided between the parallel plate conductors and having a receiving antenna at its front end;

a fifth dielectric line, provided between the parallel plate conductors and connected to the third connection portion of the circulator, for allowing a millimeter-wave signal which has been intrusively received at the transmitting antenna, to propagate therethrough, the fifth dielectric line having a reflectionless terminator disposed at its front end, for attenuating the millimeter-wave signal;

a mixer provided between the parallel plate conductors and at the other ends of the fourth dielectric line, and constructed by proximately placing or coupling a mid-portion of the second dielectric line and a mid-portion of the fourth dielectric line so as to achieve electromagnetic coupling therebetween, for mixing a part of the millimeter-wave signal propagated from the second dielectric line and the reception wave propagated from the fourth dielectric line to generate an intermediate-frequency signal; and a switching device disposed at an output end of the mixer, the switching device interrupting the intermediate-frequency signal in an opened state, and, when the millimeter-wave signal for transmission from the pulse modulator is in a non-output state and the condition is stabilized, changing from the opened state to a closed state to allow passage of the intermediate-frequency signal.

27. The high-frequency transmitting/receiving apparatus of claim 26, wherein the switching device, now kept in a closed state, changes from the closed state to an opened state before the pulse modulator outputs the following millimeter-wave signal for transmission.

28. The high-frequency transmitting/receiving apparatus of claim 26, wherein the pulse modulator is composed of a Schottky-barrier diode.

29. A high-frequency transmitting/receiving apparatus comprising:

a pair of parallel plate conductors disposed at an interval equal to or less than one half of a wavelength of a millimeter-wave signal;

a first dielectric line provided between the parallel plate conductors;

a millimeter-wave signal oscillator provided between the parallel plate conductors and attached to the first dielectric line, for converting a high-frequency signal outputted from a high-frequency diode to a frequency-modulated millimeter-wave signal, and allowing the millimeter-wave signal to propagate through the first dielectric line;

a pulse modulator provided between the parallel plate conductors and disposed at a midway position of the first dielectric line, for outputting the millimeter-wave signal from the first dielectric line as a pulsed millimeter-wave signal for transmission;

a second dielectric line provided between the parallel plate conductors and disposed in proximity to the first dielectric line in such a way that one end thereof is electromagnetically coupled with the first dielectric line, or coupled at one end thereof with the first dielectric line;

a circulator provided between the parallel plate conductors and formed of a ferrite plate disposed in parallel with the parallel plate conductors, the circulator having a first connection portion, a second connection portion, and a third connection portion that are arranged at predetermined intervals about a periphery of the ferrite plate and respectively act as millimeter-wave signal input and output ends, of which the first connection portion is connected to a millimeter-wave signal output end of the first dielectric line, wherein the millimeter-wave signal inputted from one of the connection portions is outputted from the other connection portion adjoining in a clockwise or counterclockwise direction within a plane of the ferrite plate;

a third dielectric line, provided between the parallel plate conductors and connected to the second connection portion of the circulator, for allowing the millimeter-wave signal to propagate therethrough, the third dielectric line having a transmitting/receiving antenna at its front end;

a fourth dielectric line provided between the parallel plate conductors and connected to the third connection portion of the circulator, for allowing a reception wave, which has been received by the transmitting/receiving antenna, propagated through the third dielectric line, and outputted from the third connection portion, to propagate therethrough;

a mixer provided between the parallel plate conductors and constructed by proximately placing or coupling a mid-portion of the second dielectric line and a mid-portion of the fourth dielectric line so as to achieve electromagnetic coupling therebetween, for mixing a part of the millimeter-wave signal propagated from the second dielectric line and the reception wave propagated from the fourth dielectric line to generate an intermediate-frequency signal;

a switching device, disposed at an output end of the mixer, for allowing and interrupting passage of the intermediate-frequency signal; and a filter, disposed on a downstream side of the switching device, for blocking such noise as finds its way into the intermediate-frequency signal in accompaniment with switching of the switching device, while passing the intermediate-frequency signal.

30. The high-frequency transmitting/receiving apparatus of claim 29, wherein between the output end of the mixer and the switching device is inputted a test signal having a frequency lower than a 3 dB cutoff frequency of the filter.

31. The high-frequency transmitting/receiving apparatus of claim 29, wherein the switching device receives a test switching signal for generating switching noise, and, between the switching device and the filter is disposed a switching noise detection terminal.

32. The high-frequency transmitting/receiving apparatus of claim 29, wherein the pulse modulator is provided with a signal selector switch for switching input of pulse modulation signals and DC signals different from the pulse modulation signals.

33. The high-frequency transmitting/receiving apparatus of claim 32, wherein a capacitor is connected in parallel with the signal selector switch.

34. A high-frequency transmitting/receiving apparatus comprising:

a pair of parallel plate conductors disposed at an interval equal to or less than one half of a wavelength of a millimeter-wave signal;

a first dielectric line provided between the parallel plate conductors;

a millimeter-wave signal oscillator provided between the parallel plate conductors and attached to the first dielectric line, for converting a high-frequency signal outputted from a high-frequency diode to a frequency-modulated millimeter-wave signal, and allowing the millimeter-wave signal to propagate through the first dielectric line;

a pulse modulator provided between the parallel plate conductors and disposed at a midway position of the first dielectric line, for outputting the millimeter-wave signal from the first dielectric line as a pulsed millimeter-wave signal for transmission;

a second dielectric line provided between the parallel plate conductors and disposed in proximity to the first dielectric line in such a way that one end thereof is electromagnetically coupled with the first dielectric line, or coupled at one end thereof with the first dielectric line;

a circulator provided between the parallel plate conductors and formed of a ferrite plate disposed in parallel with the parallel plate conductors, the circulator having a first connection portion, a second connection portion, and a third connection portion that are arranged at predetermined intervals about a periphery of the ferrite plate and respectively act as millimeter-wave signal input and output ends, of which the first connection portion is connected to a millimeter-wave signal output end of the first dielectric line, wherein the millimeter-wave signal inputted from one of the connection portions is outputted from the other connection portion adjoining in a clockwise or counterclockwise direction within a plane of the ferrite plate;

a third dielectric line, provided between the parallel plate conductors and connected to the second connection portion of the circulator, for allowing the millimeter-wave signal to propagate therethrough, the third dielectric line having a transmitting antenna at its front end;

a fourth dielectric line provided between the parallel plate conductors and having a receiving antenna at its front end;

a fifth dielectric line, provided between the parallel plate conductors and connected to the third connection portion of the circulator, for allowing a millimeter-wave signal which has been intrusively received at the transmitting antenna, to propagate therethrough, the fifth dielectric line having a reflectionless terminator disposed at its front end, for attenuating the millimeter-wave signal;

a mixer provided between the parallel plate conductors and constructed by proximately placing or coupling a mid-portion of the second dielectric line and a mid-portion of the fourth dielectric line so as to achieve electromagnetic coupling therebetween, for mixing a part of the millimeter-wave signal propagated from the second dielectric line and the reception wave propagated from the fourth dielectric line to generate an intermediate-frequency signal;

a switching device disposed at an output end of the mixer, for allowing and interrupting passage of the intermediate-frequency signal; and a filter disposed on a downstream side of the switching device, for blocking such noise as finds its way into the intermediate-frequency signal in accompaniment with switching of the switching device, while passing the intermediate-frequency signal.

35. The high-frequency transmitting/receiving apparatus of claim 34, wherein between the output end of the mixer and the switching device is inputted a test signal having a frequency Lower than a 3 dB cutoff frequency of the filter.

36. The high-frequency transmitting/receiving apparatus of claim 34, wherein the switching device receives a test switching signal for generating switching noise, and, between the switching device and the filter is disposed a switching noise detection terminal.

37. The high-frequency transmitting/receiving apparatus of claim 34, wherein the pulse modulator is provided with a signal selector switch for switching input of pulse modulation signals and DC signals different from the pulse modulation signals.

38. The high-frequency transmitting/receiving apparatus of claim 37, wherein a capacitor is connected in parallel with the signal selector switch.

39. A high-frequency transmitting/receiving apparatus comprising:
   a pair of parallel plate conductors disposed at an interval equal to or less than one half of a wavelength of a millimeter-wave signal;
   a first dielectric line provided between the parallel plate conductors;
   a millimeter-wave signal oscillator provided between the parallel plate conductors and attached to the first dielectric line, for converting a high-frequency signal outputted from a high-frequency diode to a frequency-modulated millimeter-wave signal, and allowing the millimeter-wave signal to propagate through the first dielectric line;
   a pulse modulator provided between the parallel plate conductors and disposed at a midway position of the first dielectric line, for outputting the millimeter-wave signal from the first dielectric line as a pulsed millimeter-wave signal for transmission;
   a second dielectric line provided between the parallel plate conductors and disposed in proximity to the first dielectric line in such a way that one end thereof is electromagnetically coupled with the first dielectric line, or coupled at one end thereof with the first dielectric line;
   a circulator provided between the parallel plate conductors and formed of a ferrite plate disposed in parallel with the parallel plate conductors, the circulator having a first connection portion, a second connection portion, and a third connection portion that are arranged at predetermined intervals about a periphery of the ferrite plate and respectively act as millimeter-wave signal input and output ends, of which the first connection portion is connected to a millimeter-wave signal output end of the first dielectric line, wherein the millimeter-wave signal inputted from one of the connection portions is outputted from the other connection portion adjoining in a clockwise or counterclockwise direction within a plane of the ferrite plate;
   a third dielectric line, provided between the parallel plate conductors and connected to the second connection portion of the circulator, for allowing the millimeter-wave signal to propagate therethrough, the third dielectric line having a transmitting/receiving antenna at its front end;
   a fourth dielectric line provided between the parallel plate conductors and connected to the third connection portion of the circulator, for allowing a reception wave, which has been received by the transmitting/receiving antenna, propagated through the third dielectric line, and outputted from the third connection portion, to propagate therethrough;
   a mixer provided between the parallel plate conductors and constructed by proximately placing or coupling a mid-portion of the second dielectric line and a mid-portion of the fourth dielectric line so as to achieve electromagnetic coupling therebetween, for mixing a part of the millimeter-wave signal propagated from the second dielectric line and the reception wave propagated from the fourth dielectric line to generate an intermediate-frequency signal; and
   a switch disposed at an output end of the mixer, for switching back and forth between a first system which outputs the intermediate-frequency signal to a downstream side and a second system to which a termination circuit for terminating the intermediate-frequency signal is connected.

40. The high-frequency transmitting/receiving apparatus of claim 39, wherein impedance matching is achieved between the output end of the mixer and the termination circuit.

41. The high-frequency transmitting/receiving apparatus of claim 39, wherein a resistance is connected between the output end of the mixer and the first system, and in parallel with the switch.

42. A high-frequency transmitting/receiving apparatus comprising:
   a pair of parallel plate conductors disposed at an interval equal to or less than one half of a wavelength of a millimeter-wave signal;
   a first dielectric line provided between the parallel plate conductors;
   a millimeter-wave signal oscillator provided between the parallel plate conductors and attached to the first dielectric line, for converting a high-frequency signal outputted from a high-frequency diode to a frequency-modulated millimeter-wave signal, and allowing the millimeter-wave signal to propagate through the first dielectric line;
   a pulse modulator provided between the parallel plate conductors and disposed at a midway position of the first dielectric line, for outputting the millimeter-wave signal from the first dielectric line as a pulsed millimeter-wave signal for transmission;
   a second dielectric line provided between the parallel plate conductors and disposed in proximity to the first dielectric line in such a way that one end thereof is electromagnetically coupled with the first dielectric line, or coupled at one end thereof with the first dielectric line;
   a circulator provided between the parallel plate conductors and formed of a ferrite plate disposed in parallel with the parallel plate conductors, the circulator having a first connection portion, a second connection portion, and a third connection portion that are arranged at predetermined intervals about a periphery of the ferrite plate and respectively act as millimeter-wave signal input and output ends, of which the first connection portion is connected to a millimeter-wave signal output end of the first dielectric line, wherein the millimeter-wave signal inputted from one of the connection portions is outputted from the other connection portion adjoining in a clockwise or counterclockwise direction within a plane of the ferrite plate;
   a third dielectric line, provided between the parallel plate conductors and connected to the second connection portion of the circulators, for allowing the millimeter-wave signal to propagate therethrough, the third dielectric line having a transmitting antenna at its front end;
   a fourth dielectric line provided between the parallel plate conductors and having a receiving antenna at its front end;

a fifth dielectric line, provided between the parallel plate conductors and connected to the third connection portion of the circulator, for allowing a millimeter-wave signal which has been intrusively received at the transmitting antenna, to propagate therethrough, the fifth dielectric line having a reflectionless terminator disposed at its front end, for attenuating the millimeter-wave signal;

a mixer provided between the parallel plate conductors and constructed by proximately placing or coupling a mid-portion of the second dielectric line and a mid-portion of the fourth dielectric line so as to achieve electromagnetic coupling therebetween, for mixing a part of the millimeter-wave signal propagated from the second dielectric line and the reception wave propagated from the fourth dielectric line to generate an intermediate-frequency signal; and a switch disposed at an output end of the mixer, for switching back and forth between a first system which outputs the intermediate-frequency signal to a downstream side and a second system to which a termination circuit for terminating the intermediate-frequency signal is connected.

43. The high-frequency transmitting/receiving apparatus of claim 42, wherein impedance matching is achieved between the output end of the mixer and the termination circuit.

44. The high-frequency transmitting/receiving apparatus of claim 42, wherein a resistance is connected between the output end of the mixer and the first system, and in parallel with the switch.

45. A high-frequency transmitting/receiving apparatus comprising:

a high-frequency oscillator for generating a high-frequency signal;

a branching device connected to the high-frequency oscillator, for branching the high-frequency signal into high-frequency branch signals so that the high-frequency branch signals are outputted to one output end and another output end of the branching device, respectively;

an RF switch connected to the one output end of the branching device, for outputting a high-frequency signal for transmission by allowing passage of the high-frequency branch signal branched to the one output end intermittently, in a cycle of T, for a duration of time t in a closed state, wherein T>t;

a circulator formed of a magnetic substance, and having a first terminal, a second terminal, and a third terminal that are arranged about a periphery of the magnetic substance, of which the first terminal receives an output from the RF switch, wherein a high-frequency signal inputted from one of the terminals is outputted from the other adjoining terminal in turn, in order from the first through third terminals;

a transmitting/receiving antenna connected to the second terminal of the circulator;

a mixer connected between the other output end of the branching device and the third terminal of the circulator, for mixing the high-frequency branch signal branched to the other output end and a high-frequency signal received by the transmitting/receiving antenna so as to generate an intermediate-frequency signal;

a switching device connected to an output end of the mixer, for allowing passage of the intermediate-frequency signal in a closed state, whereas interrupting the intermediate-frequency signal in an opened state;

switching control signal lines connected to the RF switch and the switching device, respectively, for inputting signals to the RF switch and the switching device, respectively, which signals control switching of the RF switch and the switching device; and a delay line or a delay circuit element connected to one of the switching control signal lines, for turning the switching device into an opened state in synchronization with unmaking of the RF switch, whereas turning the switching device into a closed state in synchronization with making of the RF switch.

46. A high-frequency transmitting/receiving apparatus comprising:

a high-frequency oscillator for generating a high-frequency signal;

a branching device connected to the high-frequency oscillator, for branching the high-frequency signal into high-frequency branch signals so that the high-frequency branch signals are outputted to one output end and another output end of the branching device, respectively;

an RF switch connected to the one output end of the branching device, for outputting a high-frequency signal for transmission by allowing passage of the high-frequency branch signal branched to the one output end intermittently, in a cycle of T, for a duration of time t in a closed state, wherein T>t;

an isolator having its one end connected to an output end of the RF switch, for passing the high-frequency signal for transmission from one end to the other end thereof;

a transmitting antenna connected to the isolator;

a receiving antenna connected to the other output end of the branching device;

a mixer connected between the other output end of the branching device and the receiving antenna, for mixing the high-frequency branch signal branched to the other output end and a high-frequency signal received by the receiving antenna so as to generate an intermediate-frequency signal;

a switching device connected to an output end of the mixer, for allowing passage of the intermediate-frequency signal in a closed state, whereas interrupting the intermediate-frequency signal in an opened state;

switching control signal lines connected to the RF switch and the switching device, respectively, for inputting signals to the RF switch and the switching device, respectively, which signals control switching of the RF switch and the switching device; and a delay line or a delay circuit element connected to one of the switching control signal lines, for turning the switching device into an opened state in synchronization with unmaking of the RF switch, whereas turning the switching device into a closed state in synchronization with making of the RF switch.

47. A radar system comprising a high-frequency transmitting/receiving apparatus for transmitting a high-frequency to a target object to be detected and for receiving a high-frequency from the target object; and a distance information detector for detecting data on a distance to the target object by processing an intermediate-frequency signal outputted from the high-frequency transmitting/receiving apparatus, wherein the high-frequency transmitting/receiving apparatus comprises:

a high-frequency oscillator for generating a high- frequency signal;

a branching device connected to the high frequency oscillator, for branching the high-frequency signal into high-frequency branch signals so that the high frequency branch signals are outputted to one output end and another output end of the branching device, respectively;

a modulator connected to the one output end of the branching device, for modulating the high-frequency branch signal branched to the one output end so as to output a high-frequency signal for transmission;

a circulator formed of a magnetic substance, and having a first terminal, a second terminal, and a third terminal that are arranged about a periphery of the magnetic substance, of which the first terminal receives an output from the modulator, wherein a high-frequency signal inputted from one of the terminals is outputted from the other adjoining terminal in turn, in order from the first through third terminals;

a transmitting/receiving antenna connected to the second terminal of the circulator;

a mixer connected between the other output end of the branching device and the third terminal of the circulator, for mixing the high-frequency branch signal branched to the other output end and a high-frequency signal received by the transmitting/receiving antenna so as to generate an intermediate-frequency signal; and a switching device connected to an output end of the mixer, which interrupts the intermediate-frequency signal in an opened state, and, when the high-frequency signal for transmission from the modulator is in a non-output state and the condition is stabilized, changes from the opened state to a closed state to allow passage of the intermediate-frequency signal.

48. A radar system comprising:

a high-frequency transmitting/receiving apparatus for transmitting a high-frequency to a target object to be detected and for receiving a high-frequency from the target object; and a distance information detector for detecting data on a distance to the target object to be detected by processing an intermediate-frequency signal outputted from the high-frequency transmitting/receiving apparatus, wherein the high-frequency transmitting/receiving apparatus comprises:

a high-frequency oscillator for generating a high-frequency signal;

a branching device connected to the high-frequency oscillator, for branching the high-frequency signal into high-frequency branch signals so that the high-frequency branch signals are outputted to one output end and another output end of the branching device, respectively;

a modulator connected to the one output end of the branching device, for modulating the high-frequency branch signal branched to the one output end so as to output a high-frequency signal for transmission;

an isolator having its one end connected to an output end of the modulator, for passing the high- frequency signal for transmission from the one end to the other end thereof a transmitting antenna connected to the isolator;

a receiving antenna connected to the other output end of the branching device;

a mixer connected between the other output end of the branching device and the receiving antenna, for mixing the high-frequency branch signal branched to the other output end and a high-frequency signal received by the receiving antenna so as to generate an intermediate-frequency signal; and a switching device connected to an output end of the mixer, which interrupts the intermediate-frequency signal in an opened state, and, when the high-frequency signal for transmission from the modulator is in a non-output state and the condition is stabilized, changes from the opened state to a closed state to allow passage of the intermediate-frequency signal.

49. A radar system comprising:

a high-frequency transmitting/receiving apparatus for transmitting a high-frequency to a target object to be detected and for receiving a high-frequency from the target object; and a distance information detector for detecting data on a distance to the target object by processing an intermediate-frequency signal outputted from the high-frequency transmitting/receiving apparatus, wherein the high-frequency transmitting/receiving apparatus comprises:

a high-frequency oscillator for generating a high- frequency signal;

a branching device connected to the high-frequency oscillator, for branching the high-frequency signal into high-frequency branch signals so that the high-frequency branch signals are outputted to one output end and another output end of the branching device, respectively;

a modulator connected to the one output end of the branching device, for modulating the high-frequency branch signal branched to the one output end so as to output a high-frequency signal for transmission;

a circulator formed of a magnetic substance, and having a first terminal, a second terminal, and a third terminal that are arranged about a periphery of the magnetic substance, of which the first terminal receives an output from the modulator, wherein a high-frequency signal inputted from one of the terminals is outputted from the other adjoining terminal in turn, in order from the first through third terminals;

a transmitting/receiving antenna connected to the second terminal of the circulator;

a mixer connected between the other output end of the branching device and the third terminal of the circulator, for mixing the high-frequency branch signal branched to the other output end and a high-frequency signal received by the transmitting/receiving antenna so as to generate an intermediate-frequency signal; and a switch connected to an output end of the mixer, for switching back and forth between a first system which outputs the intermediate-frequency signal to a downstream side and a second system to which a termination circuit for terminating the intermediate-frequency signal is connected.

50. A radar system comprising:

a high-frequency transmitting/receiving apparatus for transmitting a high-frequency to a target object to be detected and for receiving a high-frequency from the target object; and a distance information detector for detecting data on a distance to the target object by processing an intermediate-frequency signal outputted from the high-frequency transmitting/receiving apparatus, wherein the high-frequency transmitting/receiving apparatus comprises:

a high-frequency oscillator for generating a high-frequency signal;

a branching device connected to the high-frequency oscillator, for branching the high-frequency signal into high-frequency branch signals so that the high-frequency branch signals are outputted to one output end and another output end of the branching device, respectively;

a modulator connected to the one output end of the branching device, for modulating the high frequency branch signal branched to the one output end so as to output a high-frequency signal for transmission;

an isolator having its one end connected to an output end of the modulator, for passing the high frequency signal for transmission from one end to the other end there of;

a transmitting antenna connected to the isolator;

a receiving antenna connected to the other output end of the branching device;

a mixer connected between the other output end of the branching device and the receiving antenna for mixing the high-frequency branch signal branched to the other output end and a high-frequency signal received by the receiving antenna so as to generate an intermediate-frequency signal; and a switch connected to an output end of the mixer, for switching back and forth between a first system which outputs the intermediate frequency signal to a downstream side and a second system to which a termination circuit for terminating the intermediate-frequency signal is connected.

51. A radar system comprising:

a high-frequency transmitting/receiving apparatus for transmitting a high-frequency to a target object to be detected and for receiving a high-frequency from the target object; and a distance information detector for detecting data on a distance to the target object by processing an intermediate-frequency signal outputted from the high-frequency transmitting/receiving apparatus, wherein the high-frequency transmitting/receiving apparatus comprises:

a high-frequency oscillator for generating a high-frequency signal;

a branching device connected to the high-frequency oscillator, for branching the high frequency signal into high-frequency branch signals so that the high-frequency branch signals are outputted to one output end and another output end of the branching device, respectively;

an RF switch connected to the one output end of the branching device, for outputting a high-frequency signal for transmission by allowing passage of the high-frequency branch signal branched to the one output end intermittently, in a cycle of T, for a duration of time t in a closed state, wherein T>t;

a circulator formed of a magnetic substance, and having a first terminal, a second terminal, and a third terminal that are arranged about a periphery of the magnetic substance, of which the first terminal receives an output from the RF switch, wherein a high-frequency signal inputted from one of the terminals is outputted from the other adjoining terminal in turn, in order from the first through third terminals;

a transmitting/receiving antenna connected to the second terminal of the circulator;

a mixer connected between the other output end of the branching device and the third terminal of the circulator, for mixing the high frequency branch signal branched to the other output end and a high-frequency signal received by the transmitting/receiving antenna so as to generate an intermediate-frequency signal;

a switching device connected to an output end of the mixer, for allowing passage of the intermediate-frequency signal in a closed state, whereas interrupting the intermediate-frequency signal in an opened state;

switching control signal lines connected to the RF switch and the switching device, respectively, for inputting signals to the RF switch and the switching device, respectively, which signals control switching of the RF switch and the switching device; and a delay line or a delay circuit element connected to_ one of the switching control signal lines, for turning the switching device into an opened state in synchronization with unmaking of the RF switch, whereas turning the switching device into a closed state in synchronization with making of the RF switch.

52. A radar system comprising:

a high-frequency transmitting/receiving apparatus for transmitting a high-frequency to a target object to be detected and for receiving a high-frequency from the target object; and a distance information detector for detecting data on a distance to the target object by processing an intermediate-frequency signal outputted from the high-frequency transmitting/receiving apparatus, wherein the high-frequency transmitting/receiving apparatus comprises:

a high-frequency oscillator for generating a high-frequency signal;

a branching device connected to the high-frequency oscillator, for branching the high-frequency signal into high-frequency branch signals so that the high-frequency branch signals are outputted to one output end and another output end of the branching device, respectively;

an RF switch connected to the one output end of the branching device, for outputting a high-frequency signal for transmission by allowing passage of the high-frequency branch signal branched to the one output end intermittently, in a cycle of T, for a duration of time t in a closed state, wherein T>t; an isolator having its one end connected to an output end of the RF switch, for passing the high-frequency signal for transmission from one end to the other end there of;

a transmitting antenna connected to the isolator;

a receiving antenna connected to the other output end of the branching device;

a mixer connected between the other output end of the branching device and the receiving antenna, for mixing the high-frequency branch signal branched to the other output end and a high-frequency signal received by the receiving antenna so as to generate an intermediate-frequency signal;

a switching device connected to an output end of the mixer, for allowing passage of the intermediate-frequency signal in a closed state, whereas interrupting the intermediate-frequency signal in an opened state;

switching control signal lines connected to the RF switch and the switching device, respectively, for inputting signals to the RF switch and the switching device, respectively, which signals control switching of the RF switch and the switching device; and a delay line or a delay circuit element connected to one of the switching control signal lines, for turning the switching device into an opened state in synchronization with unmaking of the RF switch, whereas turning the switching device into a closed state in synchronization with making of the RF switch.

* * * * *